United States Patent
Gates, III et al.

(10) Patent No.: US 10,237,613 B2
(45) Date of Patent: Mar. 19, 2019

(54) METHODS AND SYSTEMS FOR VIEWING DYNAMICALLY CUSTOMIZED AUDIO-VISUAL CONTENT

(71) Applicant: Elwha LLC, Bellevue, WA (US)

(72) Inventors: William H. Gates, III, Medina, WA (US); Daniel A. Gerrity, Seattle, WA (US); Paul Holman, Seattle, WA (US); Roderick A. Hyde, Redmond, WA (US); Edward K. Y. Jung, Las Vegas, NV (US); Jordin T. Kare, Seattle, WA (US); Royce A. Levien, Lexington, MA (US); Robert W. Lord, Seattle, WA (US); Richard T. Lord, Tacoma, WA (US); Mark A. Malamud, Seattle, WA (US); Nathan P. Myhrvold, Bellevue, WA (US); John D. Rinaldo, Jr., Bellevue, WA (US); Keith D. Rosema, Olympia, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 178 days.

(21) Appl. No.: 13/708,632

(22) Filed: Dec. 7, 2012

(65) Prior Publication Data
US 2014/0040932 A1 Feb. 6, 2014

Related U.S. Application Data

(63) Continuation-in-part of application No. 13/689,488, filed on Nov. 29, 2012, now Pat. No. 9,300,994,
(Continued)

(51) Int. Cl.
*H04N 21/25* (2011.01)
*H04N 21/258* (2011.01)
(Continued)

(52) U.S. Cl.
CPC ..... *H04N 21/44218* (2013.01); *H04N 21/251* (2013.01); *H04N 21/258* (2013.01);
(Continued)

(58) Field of Classification Search
CPC ....... H04N 21/44218; H04N 21/44222; H04N 21/44213; H04N 21/45; H04N 21/258; H04N 21/25; H04N 21/251
See application file for complete search history.

(56) References Cited

U.S. PATENT DOCUMENTS 4,260,229 A 4/1981 Bloomstein
4,569,026 A 2/1986 Best
(Continued)

OTHER PUBLICATIONS

Young, Robert; "Google . . . the OS for Advertising," GIGAOM; Nov. 9, 2006; http://gigaom.com/2006/11/09/google-the-os-for-advertising/.
(Continued)

*Primary Examiner* — Robert J Hance
*Assistant Examiner* — Akshay Doshi

(57) ABSTRACT

Systems and methods for viewing dynamically customized audio-visual content are described. In some implementations, a process may include providing at least one selection signal indicative of a viewer preference, receiving a dynamically customized audio-visual content including an audio-visual core portion having at least one revised content portion customized in accordance with the at least one selection signal, displaying the dynamically-customized audio-visual content; and providing a consideration for the dynamically-customized audio-visual content.

41 Claims, 31 Drawing Sheets

Related U.S. Application Data which is a continuation-in-part of application No. 13/602,058, filed on Aug. 31, 2012, which is a continuation-in-part of application No. 13/566,723, filed on Aug. 3, 2012.

(51) Int. Cl.

| | | |
|---|---|---|
| H04N 21/422 | (2011.01) | |
| H04N 21/431 | (2011.01) | |
| H04N 21/442 | (2011.01) | |
| H04N 21/45  | (2011.01) | |
| H04N 21/475 | (2011.01) | |
| H04N 21/485 | (2011.01) | |

(52) U.S. Cl.
CPC ..... *H04N 21/4222* (2013.01); *H04N 21/4318* (2013.01); *H04N 21/44213* (2013.01); *H04N 21/44222* (2013.01); *H04N 21/4532* (2013.01); *H04N 21/4758* (2013.01); *H04N 21/485* (2013.01)

(56) References Cited

U.S. PATENT DOCUMENTS

| | | | |
|---|---|---|---|
| 4,600,281 | A | 7/1986 | Bloomstein |
| 4,827,532 | A | 5/1989 | Bloomstein |
| 4,884,972 | A | 12/1989 | Gasper |
| 5,111,409 | A | 5/1992 | Gasper et al. |
| 5,623,587 | A | 4/1997 | Bulman |
| 5,926,575 | A | 7/1999 | Ohzeki et al. |
| 6,054,999 | A | 4/2000 | Strandberg |
| 6,317,593 | B1 | 11/2001 | Vossler |
| 7,020,888 | B2 | 3/2006 | Reynolds et al. |
| 7,109,993 | B2 | 9/2006 | Peleg et al. |
| 7,631,327 | B2 | 12/2009 | Dempski et al. |
| 7,865,567 | B1 | 1/2011 | Hendricks et al. |
| 7,945,926 | B2 | 5/2011 | Dempski et al. |
| 8,016,653 | B2 | 9/2011 | Pendleton et al. |
| 8,059,201 | B2 | 11/2011 | Aarts et al. |
| 8,650,591 | B2 * | 2/2014 | Prieto ............... H04N 7/173 709/231 |
| 8,725,559 | B1 | 5/2014 | Kothari et al. |
| 8,726,312 | B1 | 5/2014 | Hewinson |
| 2002/0029384 | A1 | 3/2002 | Griggs |
| 2002/0063714 | A1 | 5/2002 | Haas et al. |
| 2002/0075318 | A1 | 6/2002 | Yang et al. |
| 2002/0077900 | A1 | 6/2002 | Thompson et al. |
| 2002/0120931 | A1 | 8/2002 | Huber et al. |
| 2002/0133397 | A1 | 9/2002 | Wilkins |
| 2003/0051256 | A1 | 3/2003 | Uesaki et al. |
| 2003/0163371 | A1 | 8/2003 | Beard |
| 2004/0181592 | A1 | 9/2004 | Samra et al. |
| 2005/0125718 | A1 | 6/2005 | Van Doorn |
| 2005/0138656 | A1 | 6/2005 | Moore et al. |
| 2006/0010240 | A1 | 1/2006 | Chuah |
| 2006/0037037 | A1 | 2/2006 | Miranz |
| 2006/0074550 | A1 | 4/2006 | Freer et al. |
| 2006/0116965 | A1 | 6/2006 | Kudo et al. |
| 2006/0174264 | A1 | 8/2006 | Candelore |
| 2007/0005795 | A1 | 1/2007 | Gonzalez |
| 2007/0099684 | A1 | 5/2007 | Butterworth |
| 2007/0122786 | A1 | 5/2007 | Relan et al. |
| 2007/0155307 | A1 | 7/2007 | Ng et al. |
| 2007/0162951 | A1 | 7/2007 | Rashkovskiy et al. |
| 2007/0165022 | A1 | 7/2007 | Peleg et al. |
| 2007/0214473 | A1 | 9/2007 | Barton et al. |
| 2007/0244750 | A1 | 10/2007 | Grannan et al. |
| 2007/0271580 | A1 | 11/2007 | Tischer et al. |
| 2007/0288978 | A1 | 12/2007 | Pizzurro et al. |
| 2007/0294740 | A1 | 12/2007 | Drake et al. |
| 2008/0028422 | A1 | 1/2008 | Cohen et al. |
| 2008/0065468 | A1 | 3/2008 | Berg et al. |
| 2008/0109843 | A1 | 5/2008 | Ullah |
| 2008/0126193 | A1 | 5/2008 | Robinson |
| 2008/0168489 | A1 | 7/2008 | Schraga |
| 2008/0215436 | A1 | 9/2008 | Roberts |
| 2008/0250468 | A1 | 10/2008 | Sullivan et al. |
| 2008/0266324 | A1 | 10/2008 | Lynch et al. |
| 2008/0320545 | A1 | 12/2008 | Schwartz |
| 2009/0048914 | A1 | 2/2009 | Shenfield et al. |
| 2009/0083814 | A1 | 3/2009 | Sekine et al. |
| 2009/0089249 | A1 | 4/2009 | Verosub et al. |
| 2009/0118016 | A1 | 5/2009 | Ben-Artzi et al. |
| 2009/0119704 | A1 | 5/2009 | Dimitrova et al. |
| 2009/0138332 | A1 | 5/2009 | Kanevsky et al. |
| 2009/0138805 | A1 | 5/2009 | Hildreth |
| 2009/0144772 | A1 | 6/2009 | Fink et al. |
| 2009/0172022 | A1 | 7/2009 | Bathiche et al. |
| 2009/0187944 | A1 | 7/2009 | White et al. |
| 2009/0210902 | A1 | 8/2009 | Slaney et al. |
| 2009/0222853 | A1 | 9/2009 | White et al. |
| 2009/0249409 | A1 | 10/2009 | Bhogal et al. |
| 2009/0254931 | A1 | 10/2009 | Pizzurro et al. |
| 2009/0265214 | A1 | 10/2009 | Jobs et al. |
| 2009/0282093 | A1 | 11/2009 | Allard et al. |
| 2010/0077314 | A1 | 3/2010 | Hushyar et al. |
| 2010/0083306 | A1 | 4/2010 | Dempski et al. |
| 2010/0088406 | A1 | 4/2010 | Yu et al. |
| 2010/0094841 | A1 | 4/2010 | Bardwil |
| 2010/0125544 | A1 | 5/2010 | Lee et al. |
| 2010/0188579 | A1 | 7/2010 | Friedman |
| 2010/0202750 | A1 | 8/2010 | Senftner et al. |
| 2010/0257551 | A1 | 10/2010 | Sweeney et al. |
| 2011/0010231 | A1 | 1/2011 | Price et al. |
| 2011/0029099 | A1 | 2/2011 | Benson |
| 2011/0064388 | A1 | 3/2011 | Brown et al. |
| 2011/0066730 | A1 | 3/2011 | Julia et al. |
| 2011/0106744 | A1 | 5/2011 | Becker et al. |
| 2011/0125777 | A1 | 5/2011 | Begeja et al. |
| 2011/0200303 | A1 | 8/2011 | Pujol Alcolado et al. |
| 2011/0122094 | A1 | 9/2011 | Schraga |
| 2011/0211094 | A1 | 9/2011 | Schraga |
| 2011/0271301 | A1 | 11/2011 | Kennedy |
| 2011/0321075 | A1 | 12/2011 | Brunkhorst et al. |
| 2011/0321082 | A1 | 12/2011 | Weerasinghe |
| 2012/0005595 | A1 | 1/2012 | Gavade et al. |
| 2012/0030699 | A1 | 2/2012 | Amin |
| 2012/0060176 | A1 | 3/2012 | Chai et al. |
| 2012/0072936 | A1 | 3/2012 | Small et al. |
| 2012/0072940 | A1 | 3/2012 | Fuhrer |
| 2012/0072944 | A1 | 3/2012 | Felt et al. |
| 2012/0089908 | A1 | 4/2012 | Miyaki |
| 2012/0094768 | A1 | 4/2012 | McCaddon et al. |
| 2012/0110027 | A1 | 5/2012 | Falcon |
| 2012/0112877 | A1 | 5/2012 | Gravino et al. |
| 2012/0124604 | A1 | 5/2012 | Small et al. |
| 2012/0135684 | A1 | 5/2012 | Shrum, Jr. et al. |
| 2012/0157197 | A1 | 6/2012 | Watkins, Jr. et al. |
| 2012/0223952 | A1 | 9/2012 | Kanemaru et al. |
| 2012/0246223 | A1 * | 9/2012 | Newhouse ............... G06F 3/01 709/203 |
| 2012/0317593 | A1 | 12/2012 | Myslinski |
| 2012/0324493 | A1 | 12/2012 | Holmdahl et al. |
| 2012/0327172 | A1 * | 12/2012 | El-Saban ........... G06K 9/00228 348/14.02 |
| 2013/0006754 | A1 | 1/2013 | Horvitz et al. |
| 2013/0014145 | A1 * | 1/2013 | Bhatia et al. ............. 725/13 |
| 2013/0024282 | A1 | 1/2013 | Kansal et al. |
| 2013/0046637 | A1 | 2/2013 | Slutsky et al. |
| 2013/0055087 | A1 | 2/2013 | Flint |
| 2013/0067052 | A1 * | 3/2013 | Reynolds ............... H04L 67/02 709/223 |
| 2013/0085805 | A1 | 4/2013 | Kursar et al. |
| 2013/0091243 | A1 | 4/2013 | Harnevo et al. |
| 2013/0132999 | A1 | 5/2013 | Pandey |
| 2013/0145240 | A1 | 6/2013 | Anderson et al. |
| 2013/0160051 | A1 | 6/2013 | Armstrong et al. |
| 2013/0205332 | A1 | 8/2013 | Martin et al. |
| 2013/0219417 | A1 * | 8/2013 | Gilson ............... H04N 21/258 725/12 |
| 2013/0283162 | A1 | 10/2013 | Aronsson et al. |
| 2013/0290233 | A1 | 10/2013 | Ferren et al. |
| 2013/0298180 | A1 | 11/2013 | Mountain |

(56) References Cited

U.S. PATENT DOCUMENTS

| | | |
|---|---|---|
| 2013/0312018 A1 | 11/2013 | Elliott et al. |
| 2014/0007148 A1 | 1/2014 | Ratliff et al. |
| 2014/0036152 A1 | 2/2014 | Jackson et al. |
| 2014/0136318 A1 | 5/2014 | Alberth, Jr. et al. |
| 2014/0195345 A1 | 7/2014 | Lyren |
| 2014/0223464 A1 | 8/2014 | Moran et al. |

OTHER PUBLICATIONS

PCT International Search Report; International App. No. PCT/US2013/053444; Jan. 17, 2014; pp. 1-2.

* cited by examiner

METHODS AND SYSTEMS FOR VIEWING DYNAMICALLY CUSTOMIZED AUDIO-VISUAL CONTENT

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/689,488, entitled Methods and Systems for Viewing Dynamically Customized Audio-Visual Content, naming William H. Gates, III, Daniel A. Gerrity, Pablos Holman, Roderick A. Hyde, Edward K. Y. Jung, Jordin T. Kare, Royce A. Levien, Robert W. Lord, Richard T. Lord, Mark A. Malamud, Nathan P. Myhrvold, John D. Rinaldo, Jr., Keith D. Rosema, Clarence T. Tegreene, and Lowell L. Wood, Jr. as inventors, filed 29 Nov. 2012, which is currently co-pending or is an application of which a currently co-pending application is entitled to the benefit of the filing date, and which is a continuation-in-part of U.S. patent application Ser. No. 13/602,058, entitled Dynamic Customization and Monetization of Audio-Visual Content, naming William H. Gates, III, Daniel A. Gerrity, Pablos Holman, Roderick A. Hyde, Edward K. Y. Jung, Jordin T. Kare, Royce A. Levien, Robert W. Lord, Richard T. Lord, Mark A. Malamud, Nathan P. Myhrvold, John D. Rinaldo, Jr., Keith D. Rosema, Clarence T. Tegreene, and Lowell L. Wood, Jr. as inventors, filed 31 Aug. 2012, which is currently co-pending or is an application of which a currently co-pending application is entitled to the benefit of the filing date, and which is a continuation of U.S. patent application Ser. No. 13/566,723, entitled Dynamic Customization and Monetization of Audio-Visual Content, naming William H. Gates, III, Daniel A. Gerrity, Pablos Holman, Roderick A. Hyde, Edward K. Y. Jung, Jordin T. Kare, Royce A. Levien, Robert W. Lord, Richard T. Lord, Mark A. Malamud, Nathan P. Myhrvold, John D. Rinaldo, Jr., Keith D. Rosema, Clarence T. Tegreene, and Lowell L. Wood, Jr. as inventors, filed 3 Aug. 2012.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

FIELD OF THE DISCLOSURE

The present disclosure relates generally to methods and systems for viewing dynamically customized audio-visual content (e.g. television broadcasts, data streams, etc.).

BACKGROUND

Conventional audio-visual content streams, including television broadcasts or the like, typically consist of either pre-recorded content or live events that do not allow viewers to interact with or control any of the audio-visual content that is displayed. Various concepts have recently been introduced that allow for television broadcasts to be modified to a limited degree to accommodate viewer choices, as disclosed by U.S. Pat. Nos. 7,945,926 and 7,631,327 entitled "Enhanced Custom Content Television" issued to Dempski et al. Such prior art systems and methods are relatively limited, however, in their ability to accommodate and assimilate viewer-related information to provide a dynamically tailored audio-visual content stream. Systems and methods for monetization of dynamically customized audio-visual broadcasts that provide an improved degree of accommodation or assimilation of viewer-related choices and characteristics would have considerable utility.

SUMMARY

The present disclosure teaches methods and systems for viewing dynamically customized audio-visual content, such as television broadcasts, internet streams, podcasts, audio broadcasts, and the like. For example, in at least some implementations, a process in accordance with the teachings of the present disclosure may include providing at least one selection signal indicative of a viewer preference; receiving a dynamically customized audio-visual content including an audio-visual core portion having at least one revised content portion customized in accordance with the at least one selection signal; and providing a consideration for the dynamically-customized audio-visual content.

This summary is intended to provide an introduction of a few exemplary aspects of implementations in accordance with the present disclosure. It is not intended to provide an exhaustive explanation of all possible implementations, and should thus be construed as merely introductory, rather than limiting, of the following disclosure.

DETAILED DESCRIPTION

Techniques for viewing dynamically customized audio-visual content, such as television broadcasts or other audio-visual content streams, will now be disclosed in the following detailed description. It will be appreciated that many specific details of certain implementations will be described and shown in FIGS. 1 through 33 to provide a thorough understanding of such implementations. One skilled in the art will understand, however, that the present disclosure may have other possible implementations, and that such other implementations may be practiced with or without some of the particular details set forth in the following description.

In the following discussion, exemplary systems or environments for implementing one or more of the teachings of the present disclosure are described first. Next, exemplary flow charts showing various embodiments of processes for dynamic customization and monetization of audio-visual content in accordance with one or more of the teachings of the present disclosure are described.

Exemplary Systems for Dynamic Customization and Monetization of Audio-Visual Content Embodiments of methods and systems in accordance with the present disclosure may be implemented in a variety of environments. Initially, methods and systems in accordance with the present disclosure will be described in terms of dynamic customization of broadcasts. It should be remembered, however, that inventive aspects of such methods and systems may be applied to other environments that involve audio-visual content streams, and are not necessarily limited to the specific audio-visual broadcast implementations shown herein.

Figure 1:
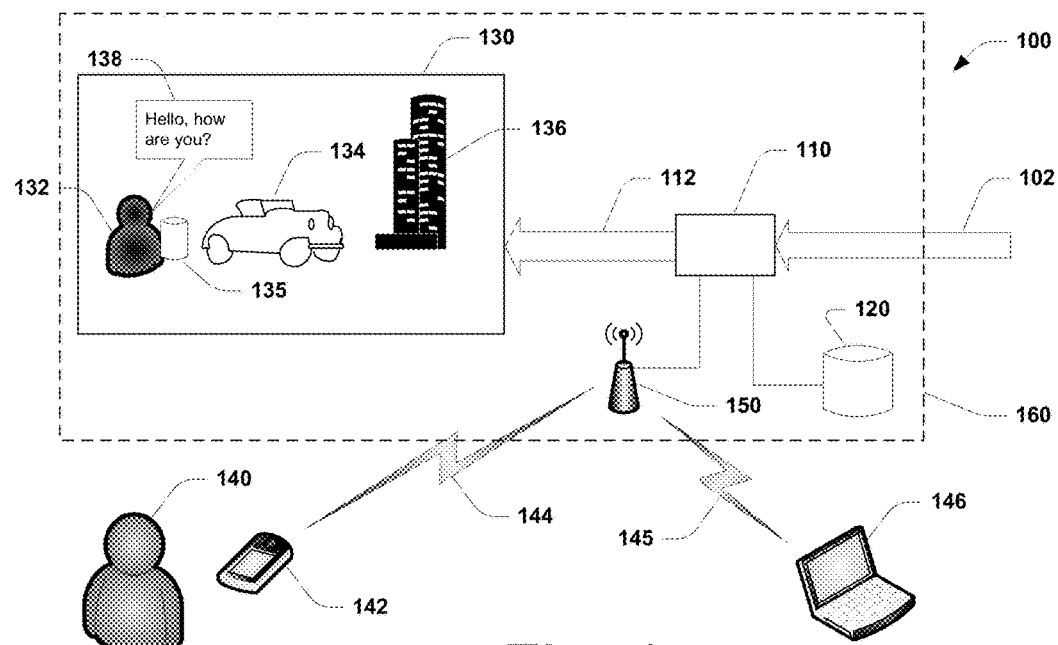
FIGS. 1-5 show schematic views of systems for dynamic customization and monetization of audio-visual content in accordance with possible implementations of the present disclosure.

FIG. 1 is a schematic view of a representative system 100 for dynamic customization and monetization of audio-visual content in accordance with an implementation of the present disclosure. In this implementation, the system 100 includes a processing component 110 that receives an audio-visual core portion 102, such as a television broadcast, and provides a dynamically customized audio-visual content 112 to a display 130. In some implementations, a viewer 140 uses a control device 142 to provide one or more selection signals 144 to a sensor 150 which, in turn, provides inputs corresponding to the selection signals 144 to the processing component 110. Alternately, the processing component 110 may operate without selection signals 144, such as by accessing default inputs stored within a memory. In some embodiments, the sensor 150 may receive further supplemental selection signals 145 from a processing device 146 (e.g. laptop, desktop, personal data assistant, cell phone, iPad, iPhone, etc.) associated with the viewer 140.

As described more fully below, based on the one or more selection signals 144 (or default inputs if specific inputs are not provided), the processing component 110 may modify one or more aspects of the incoming audio-visual core portion 102 to provide the dynamically customized audio-visual content 112 that is shown on the display 130. In at least some implementations, the processing component 110 may access a data store 120 having revised content portions stored therein to perform one or more aspects of the processes described below.

In at least some implementations, the processing component 110 may modify the core portion 102 by a rendering process. The rendering process is preferably a real-time (or approximately real-time) process. The rendering process may receive the core portion 102 as a digital signal stream, and may modify one or more aspects of the core portion 102, such as by replacing one or more portions of the core portion 102 with one or more revised content portions retrieved from the data store 120, in accordance with the selection signals 144 (and/or default inputs). It should be appreciated that, in some embodiments, the audio-visual core portion 102 may consist of solely an audio portion, or solely a visual (or video) portion, or may include a separate audio portion and a separate visual portion. In further embodiments, the audio-visual core portion 102 may include a plurality of audio portions or a plurality of visual portions, or any suitable combination thereof.

As used herein, the term "visual" in such phrases as "audio-visual portion," "audio-visual core portion," "visual portion," etc. is used broadly to refer to signals, data, information, or portions thereof that are associated with something which may eventually be viewed on a suitable display device by a viewer (e.g. video, photographs, images, etc.). It should be understood that a "visual portion" is not intended to mean that the signals, data, information, or portions thereof are themselves visible to a viewer. Similarly, as used herein, the term "audio" in such phrases as "audio-visual portion," "audio-visual core portion," "audio portion," etc. is used broadly to refer to signals, data, information, or portions thereof that are associated with something which may eventually produce sound on a suitable output device to a listener, and are not intended to mean that the signals, data, information, or portions thereof are themselves audible to a listener.

It will be appreciated that the components of the system 100 shown in FIG. 1 are merely exemplary, and represent one possible implementation of a system in accordance with the present disclosure. The various components of the system 100 may communicate and exchange information as needed to perform the functions and operations described herein. More specifically, in various implementations, each of the components of the system 100 may be implemented using software, hardware, firmware, or any suitable combinations thereof. Similarly, one or more of the components of the system 100 may be combined, or may be divided or separated into additional components, or additional components may be added, or one or more of the components may simply be eliminated, depending upon the particular requirements or specifications of the operating environment.

It will be appreciated that other suitable embodiments of systems for dynamic customization of audio-visual broadcasts may be conceived. For example, in some embodiments, the display 130 may be that associated with a conventional television or other conventional audio-visual display device, and the processing component 110 may be a separate component, such as a gaming device (e.g. Microsoft Xbox®, Sony Playstation®, Nintendo Wii®, etc.), a media player (e.g. DVD player, Blu Ray device, Tivo, etc.), or any other suitable component. Similarly, the sensor 150 may be a separate component or may alternately be integrated into the same component with the display 130 or the processing component 110. Similarly, the information store 120 may be a separate component or may alternately be integrated into the same component with the processing component 110, the display 130, or the sensor 150. Alternately, some or all of the components (e.g. the processing component 110, the information store 120, the display 130, the sensor 150, etc.) may be integrated into a common component 160.

Figure 2:
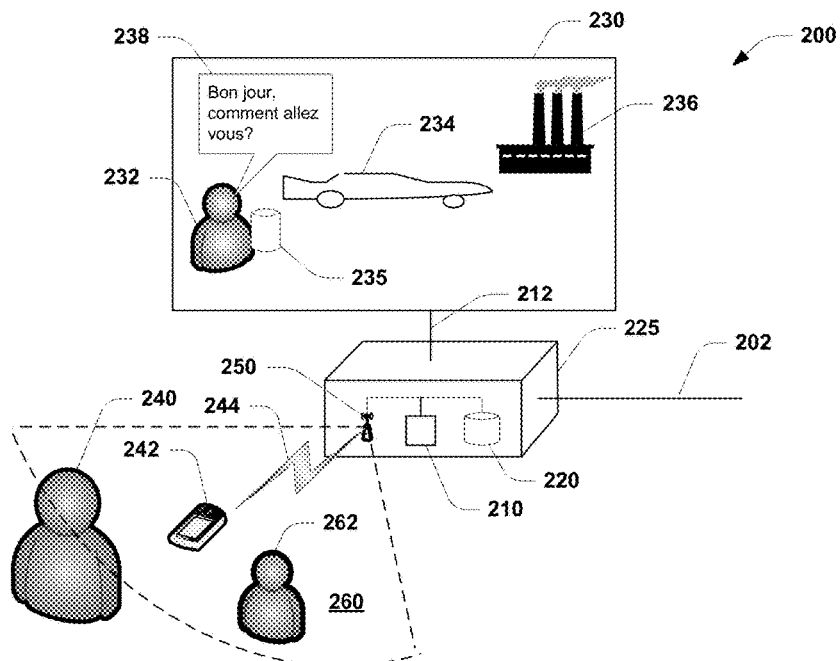

FIG. 2 is a schematic view of another representative system 200 for dynamic customization of television broadcasts in accordance with an implementation of the present disclosure. In this implementation, the system 200 includes a processing component 210 that receives an audio-visual core portion 202, and provides a dynamically customized audio-visual content 212 to a display 230. A viewer 240 uses a control device 242 to provide one or more selection signals 244 to a sensor 250 which, in turn, provides inputs corresponding to the selection signals 244 to the processing component 210. As described above, the processing component 210 may also operate without selection signals 244, such as by accessing default inputs stored within a memory 220. The sensor 250 may sense a field of view 260 to detect the viewer 240 or other one or more other persons 262. In the implementation shown in FIG. 2, the processing component 210, the memory 220, and the sensor 250 are housed within a single device 225.

As described more fully below, based on the one or more selection signals 244 (or default inputs if specific inputs are not provided), the processing component 210 may modify one or more aspects of the incoming audio-visual core portion 202 to provide the dynamically customized audio-visual content 212 that is shown on the display 230. The processing component 210 may also modify one or more aspects of the incoming audio-visual core portion 202 based on one or more persons (e.g. viewer 240, other person 262) sensed within the filed of view 260. In at least some implementations, the processing component 210 may retrieve revised content portions stored in the memory 220 to perform one or more aspects of the processes described below.

Figure 3:
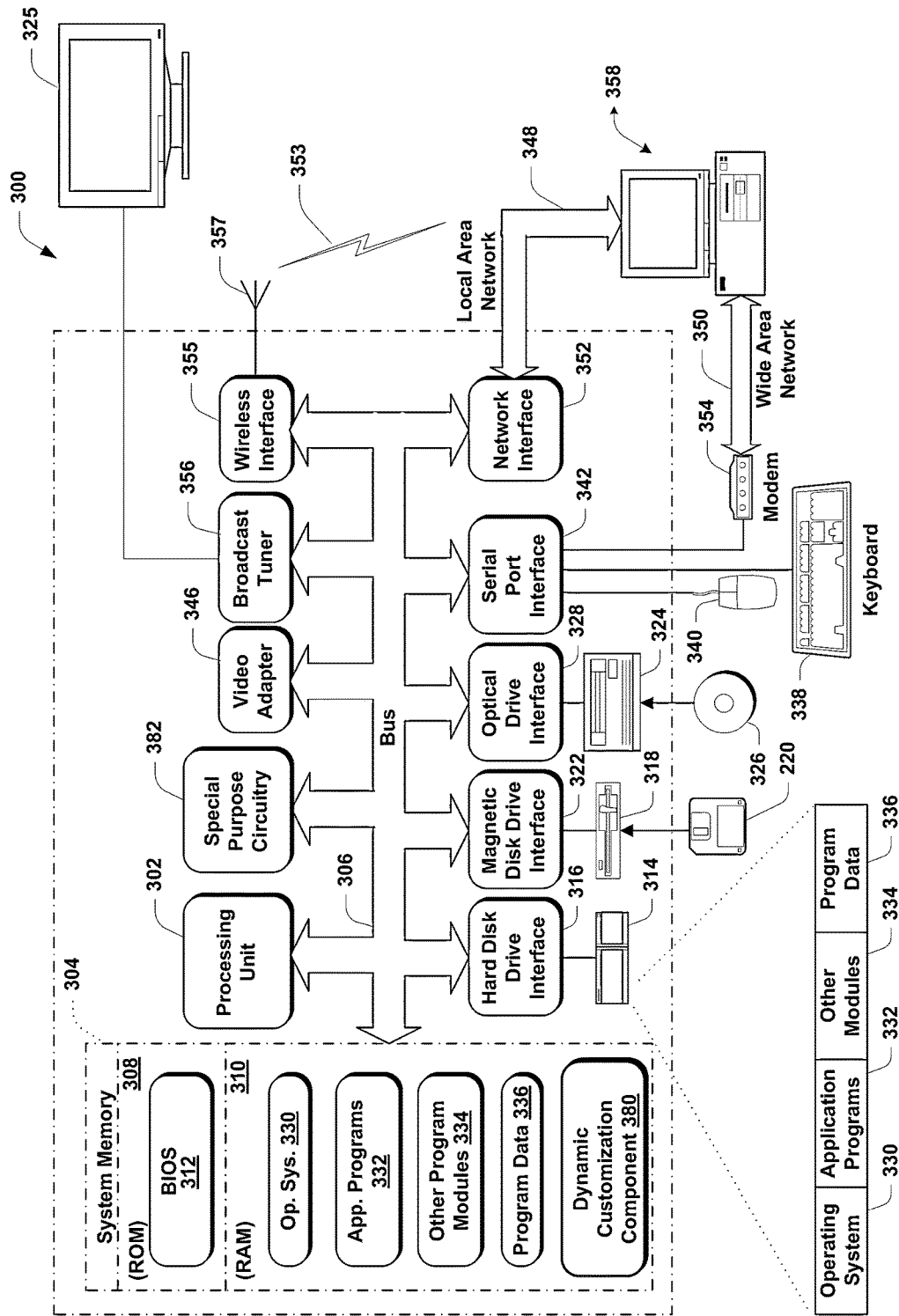

FIG. 3 shows another representative implementation of a system 300 for dynamic customization of audio-visual content in accordance with another possible embodiment. In this implementations the system 300 may include one or more processors (or processing units) 302, special purpose circuitry 382, a memory 304, and a bus 306 that couples various system components, including the memory 304, to the one or more processors 302 and special purpose circuitry 382 (e.g. ASIC, FPGA, etc.). The bus 306 represents one or more of any of several types of bus structures, including a memory bus or memory controller, a peripheral bus, an accelerated graphics port, and a processor or local bus using any of a variety of bus architectures. In this implementation, the memory 304 includes read only memory (ROM) 308 and random access memory (RAM) 310. A basic input/output system (BIOS) 312, containing the basic routines that help to transfer information between elements within the system 300, such as during start-up, is stored in ROM 308.

The exemplary system 300 further includes a hard disk drive 314 for reading from and writing to a hard disk (not shown), and is connected to the bus 306 via a hard disk driver interface 316 (e.g., a SCSI, ATA, or other type of interface). A magnetic disk drive 318 for reading from and writing to a removable magnetic disk 320, is connected to the system bus 306 via a magnetic disk drive interface 322. Similarly, an optical disk drive 324 for reading from or writing to a removable optical disk 326 such as a CD ROM, DVD, or other optical media, connected to the bus 306 via an optical drive interface 328. The drives and their associated computer-readable media provide nonvolatile storage of computer readable instructions, data structures, program modules and other data for the system 300. Although the exemplary system 300 described herein employs a hard disk, a removable magnetic disk 320 and a removable optical disk 326, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 3, a number of program modules may be stored on the memory 304 (e.g. the ROM 308 or the RAM 310) including an operating system 330, one or more application programs 332, other program modules 334, and program data 336 (e.g. the data store 320, image data, audio data, three dimensional object models, etc.). Alternately, these program modules may be stored on other computer-readable media, including the hard disk, the magnetic disk 320, or the optical disk 326. For purposes of illustration, programs and other executable program components, such as the operating system 330, are illustrated in FIG. 3 as discrete blocks, although it is recognized that such programs and components reside at various times in different storage components of the system 300, and may be executed by the processor(s) 302 or the special purpose circuitry 382 of the system 300.

A user may enter commands and information into the system 300 through input devices such as a keyboard 338 and a pointing device 340. Other input devices (not shown) may include a microphone, joystick, game pad, satellite dish, scanner, or the like. These and other input devices are connected to the processing unit 302 and special purpose circuitry 382 through an interface 342 that is coupled to the system bus 306. A monitor 325 (e.g. display 130, display 230, or any other display device) may be connected to the bus 306 via an interface, such as a video adapter 346. In addition, the system 300 may also include other peripheral output devices (not shown) such as speakers and printers.

The system 300 may operate in a networked environment using logical connections to one or more remote computers (or servers) 358. Such remote computers (or servers) 358 may be a personal computer, a server, a router, a network PC, a peer device or other common network node, and may include many or all of the elements described above relative to system 300. The logical connections depicted in FIG. 3 may include one or more of a local area network (LAN) 348 and a wide area network (WAN) 350. Such networking environments are commonplace in offices, enterprise-wide computer networks, intranets, and the Internet. In this embodiment, the system 300 also includes one or more broadcast tuners 356. The broadcast tuner 356 may receive broadcast signals directly (e.g., analog or digital cable transmissions fed directly into the tuner 356) or via a reception device (e.g., via sensor 150, sensor 250, an antenna, a satellite dish, etc.).

When used in a LAN networking environment, the system 300 may be connected to the local network 348 through a network interface (or adapter) 352. When used in a WAN networking environment, the system 300 typically includes a modem 354 or other means for establishing communications over the wide area network 350, such as the Internet. The modem 354, which may be internal or external, may be connected to the bus 306 via the serial port interface 342. Similarly, the system 300 may exchange (send or receive) wireless signals 353 (e.g. selection signals 144, signals 244, core portion 102, core portion 202, etc.) with one or more remote devices (e.g. remote 142, remote 242, computers 258, etc.), using a wireless interface 355 coupled to a wireless communicator 357 (e.g., sensor 150, sensor 250, an antenna, a satellite dish, a transmitter, a receiver, a transceiver, a photoreceptor, a photodiode, an emitter, a receptor, etc.).

In a networked environment, program modules depicted relative to the system 300, or portions thereof, may be stored in the memory 304, or in a remote memory storage device. More specifically, as further shown in FIG. 3, a dynamic customization component 380 may be stored in the memory 304 of the system 300. The dynamic customization component 380 may be implemented using software, hardware, firmware, or any suitable combination thereof. In cooperation with the other components of the system 300, such as the processing unit 302 or the special purpose circuitry 382, the dynamic customization component 380 may be operable to perform one or more implementations of processes for dynamic customization in accordance with the present disclosure.

It will be appreciated that while the system 300 shown in FIG. 3 is capable of receiving an audio-visual core portion (e.g. core portion 102, core portion 202, etc.) from an external source (e.g. via the wireless device 357, the LAN 348, the WAN 350, etc.), in further embodiments, the audio-visual core portion may itself be generated within the system 300, such as by playing media stored within the system memory 304, or stored within the hard disk drive 314, or played on the disk drive 318, the optical drive 328, or any other suitable component of the system 300. In some implementations, the audio-visual core portion may be generated by suitable software routines operating within the system 300.

Figure 4:
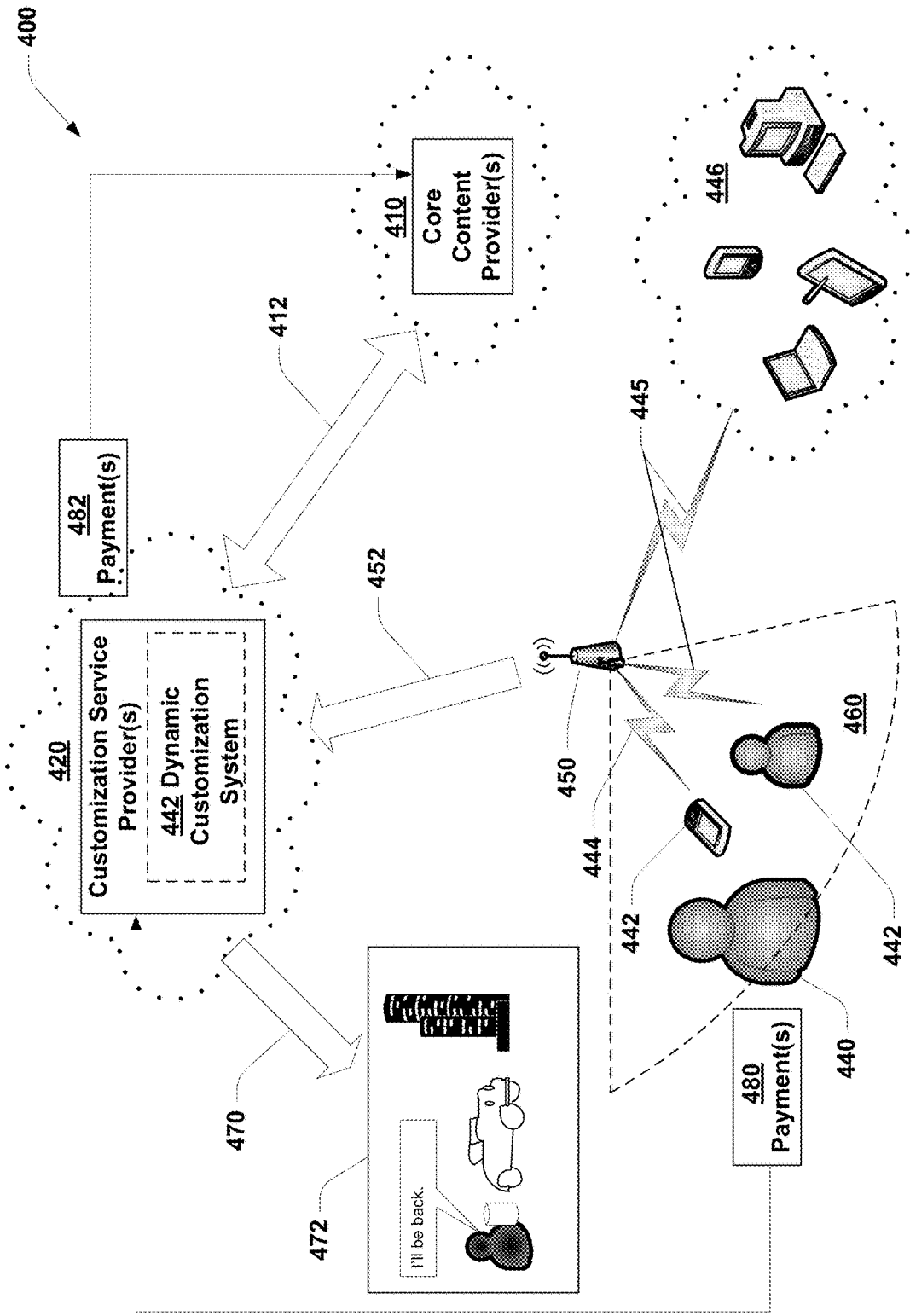

FIG. 4 is a schematic view of a representative system 400 for dynamic customization of audio-visual content in accordance with an alternate implementation of the present disclosure. In this implementation, the system 400 includes one or more core content providers 410 that provide one or more audio-visual core portions 412 to one or more customization service providers 420. The one or more customization service providers 420 include at least one dynamic customization system 422, which may include one or more of the components described above with respect to FIGS. 1-3.

It will be appreciated that, in at least some implementations, one or more of the core content providers 410, or one or more of the customization service providers 420, may be based or partially based in what is referred to as the "cloud" or "cloud computing," or may be provided using one or more "cloud services." For the purposes of this application, cloud computing is the delivery of computational capacity and/or storage capacity as a service. The "cloud" refers to one or more hardware and/or software components that deliver or assist in the delivery of computational and/or storage capacity, including, but not limited to, one or more of a client, an application, a platform, an infrastructure, and a server, and associated hardware and/or software. Cloud and cloud computing may refer to one or more of a computer, a processor, a storage medium, a router, a modem, a virtual machine (e.g., a virtual server), a data center, an operating system, a middleware, a hardware back-end, a software back-end, and a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., the Internet.

As used in this application, a cloud or cloud services may include one or more of infrastructure-as-a-service ("IaaS"), platform-as-a-service ("Paas"), software-as-a-service ("SaaS"), and desktop-as-a-service ("DaaS"). As a non-exclusive example, IaaS may include, e.g., one or more virtual server instantiations that may start, stop, access, and configure virtual servers and/or storage centers (e.g., providing one or more processors, storage space, and network resources on-demand, e.g., GoGrid and Rackspace). PaaS may include, e.g., one or more software and/or development tools hosted on an infrastructure (e.g., a computing platform and/or a solution stack from which the client can create software interfaces and applications, e.g., Microsoft Azure. SaaS may include, e.g., software hosted by a service provider and accessible over a network (e.g., the software for the application and the data associated with that software application are kept on the network, e.g., Google Apps, SalesForce). DaaS may include, e.g., providing desktop, applications, data, and services for the user over a network (e.g., providing a multi-application framework, the applications in the framework, the data associated with the applications, and services related to the applications and/or the data over the network, e.g., Citrix). The foregoing is intended to be exemplary of the types of systems referred to in this application as "cloud" or "cloud computing" and should not be considered complete or exhaustive.

As further shown in FIG. 4, a viewer 440 may provide one or more selection signals 444 using a manual input device 442. In some implementations, the one or more selections signals 444 may be provided to a sensor 450 which, in turn, provides selection inputs 452 corresponding to the selection signals 444 to the one or more dynamic customization service providers 420. Alternately, the sensor 450 may be eliminated, and the selection signals 444 may be communicated directly to the one or more dynamic customization service providers 420.

As further shown in FIG. 4, in some embodiments, the sensor 450 may receive one or more supplemental selection signals 445 from one or more electronic devices 446 (e.g. laptop, desktop, personal data assistant, cell phone, iPad, iPhone, etc.) associated with the viewer 440. As described above, the one or more supplemental selection signals 445 may be based on a variety of suitable information, including, for example, browsing histories, purchase records, call records, downloaded content, or any other suitable information or data. In some implementations, one or more supplemental selection signals 445 may be automatically determined from one or more characteristics of a viewing area 460, such as a presence of one or more additional viewers 442 (e.g. a child, spouse, friend, visitor, etc.).

In operation, the one or more customization service providers 420 receive the one or more selection inputs 452

(or default inputs if specific inputs are not provided), and the audio-visual core portion 412 from the one or more core content providers 610, and using the one or more dynamic customization systems 422, provide a dynamically customized audio-visual content 470 to a display 472 visible to the one or more viewers 440, 442 in the viewing area 460.

In at least some embodiments, one or more viewers 440, 442 may provide one or more payments (or other consideration) 480 to the one or more customization service providers 420 in exchange for the dynamically customized audio-visual content 470. Similarly, in at least some embodiments the one or more customization service providers 420 may provide one or more payments (or other consideration) 482 to the one or more core content providers 410 in exchange for the core audio-visual content 412. In some embodiments, the amounts of at least one of the one or more payments 480, or the one or more payments 482, may be at least partially determined using one or more processes in accordance with the teachings of the present disclosure, as described more fully below.

Again, it should be appreciated that, in some embodiments, the audio-visual core portion 412 may consist of solely an audio portion, or solely a visual (or video) portion, a separate audio portion, a separate visual portion, a plurality of audio portions, a plurality of visual portions, or any suitable combination thereof. Similarly, in various embodiments, the dynamically customized audio-visual core portion 470 may consist of solely an audio portion, or solely a visual (or video) portion, a separate audio portion, a separate visual portion, a plurality of audio portions, a plurality of visual portions, or any suitable combination thereof.

Figure 5:
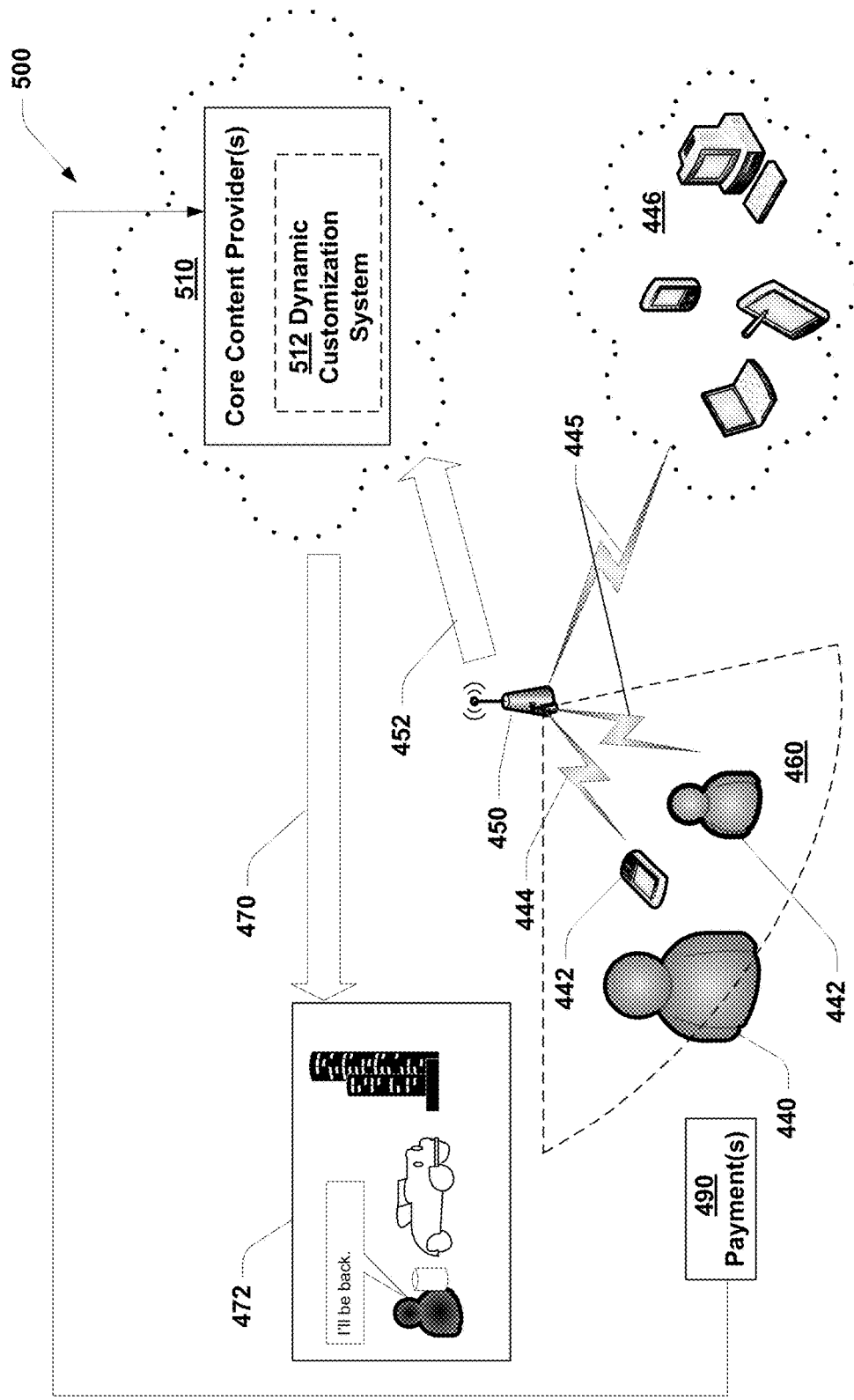

FIG. 5 shows a schematic view of another representative system 500 for dynamic customization of audio-visual broadcasts in accordance with an alternate implementation of the present disclosure. It will be appreciated that, in this implementation, the system 500 includes several of the same components as described above for the system 500 shown in FIG. 5, however, the one or more customization service providers 420 have been eliminated. For the sake of brevity, a description of the components described above with respect to FIG. 4 will not be repeated, but rather, the significant new aspects of the system 500 shown in FIG. 5 will be described.

As shown in FIG. 5, in some implementations, the one or more selection inputs 552 are provided to one or more core content providers 510. The one or more core content providers 510 have one or more dynamic customization systems 512. In operation, the one or more core content providers 510 receive the one or more selection inputs 512 (or default inputs if specific inputs are not provided), and modify an audio-visual core portion using the one or more dynamic customization systems 512 to provide a dynamically customized audio-visual content 470 to a display 472 visible to one or more viewers 440, 442 in a viewing area 460. Thus, in at least some implementations, the one or more customization service providers 420 shown in FIG. 4 may be eliminated, and the same one or more entities that normally provide an audio-visual core portion (e.g. normal television broadcasts, etc.) may perform the dynamic customization to provide the desired dynamically customized audio-visual content to viewers.

In at least some embodiments, the one or more viewers 440, 442 may provide one or more payments (or other consideration) 490 to the one or more core content providers 510 in exchange for the dynamically customized audio-visual content 470. In some embodiments, the amount of the one or more payments 490 may be defined using one or more processes in accordance with the teachings of the present disclosure, as described more fully below.

Of course, other environments may be implemented to perform the dynamic customization of audio-visual content in accordance with the present disclosure, and systems in accordance with the present disclosure are not necessarily limited to the specific implementations shown and described herein. Additional functions and operational aspects of systems in accordance with the teachings of the present disclosure are described more fully below.

Exemplary Processes for Viewing Dynamically Customized Audio-Visual Content

In the following description of exemplary processes for viewing dynamically customized audio-visual content, reference will be made to specific components of the exemplary systems described above and shown in FIGS. 1 through 5. It will be appreciated, however, that such references are merely exemplary, and that the inventive processes are not limited to being implemented on the specific systems described above, but rather, the processes described herein may be implemented on a wide variety of suitable systems and in a wide variety of suitable environments.

Figure 6:
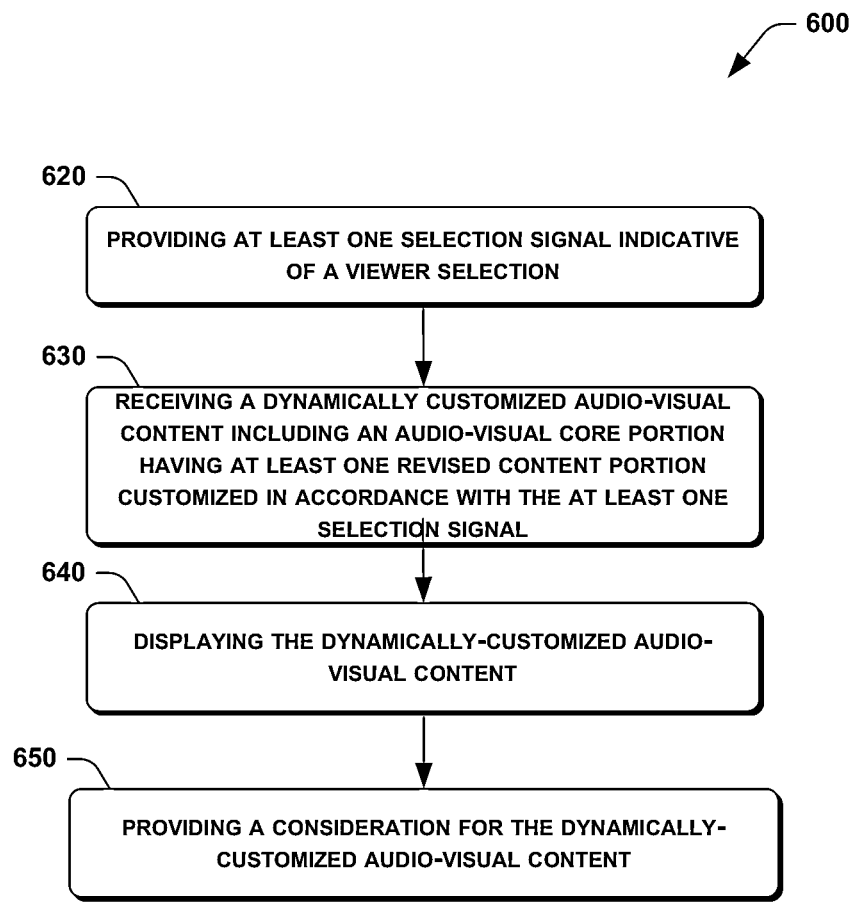
FIGS. 6 through 33 are flowcharts of processes for viewing dynamically customized audio-visual content in accordance with further possible implementations of the present disclosure.

FIG. 6 shows a flowchart of a process 600 for viewing dynamically customized audio-visual content in accordance with an implementation of the present disclosure. In this implementation, the process 600 includes providing at least one selection signal indicative of a viewer preference at 620, receiving a dynamically customized audio-visual content including an audio-visual core portion having at least one revised content portion customized in accordance with the at least one selection signal at 630, displaying the dynamically-customized audio-visual content at 640, and providing a consideration for the dynamically-customized audio-visual content at 650.

It will be appreciated that in accordance with the present disclosure, an audio-visual core portion may be dynamically customized in accordance with a viewer's preferences, thereby increasing the viewer's satisfaction. The viewer (e.g. viewer 140) may indicate preferences for actresses (and actors) 132, vehicles 134, depicted products (or props) 135, environmental aspects 136 (e.g. buildings, scenery, setting, background, lighting, etc.), language 138, or other suitable preferences. In further implementations, virtually any desired aspect of the incoming core portion 102 may be dynamically customized in accordance with the viewer's selections, preferences, or characteristics as implemented by the selection signals 144.

Figure 7:
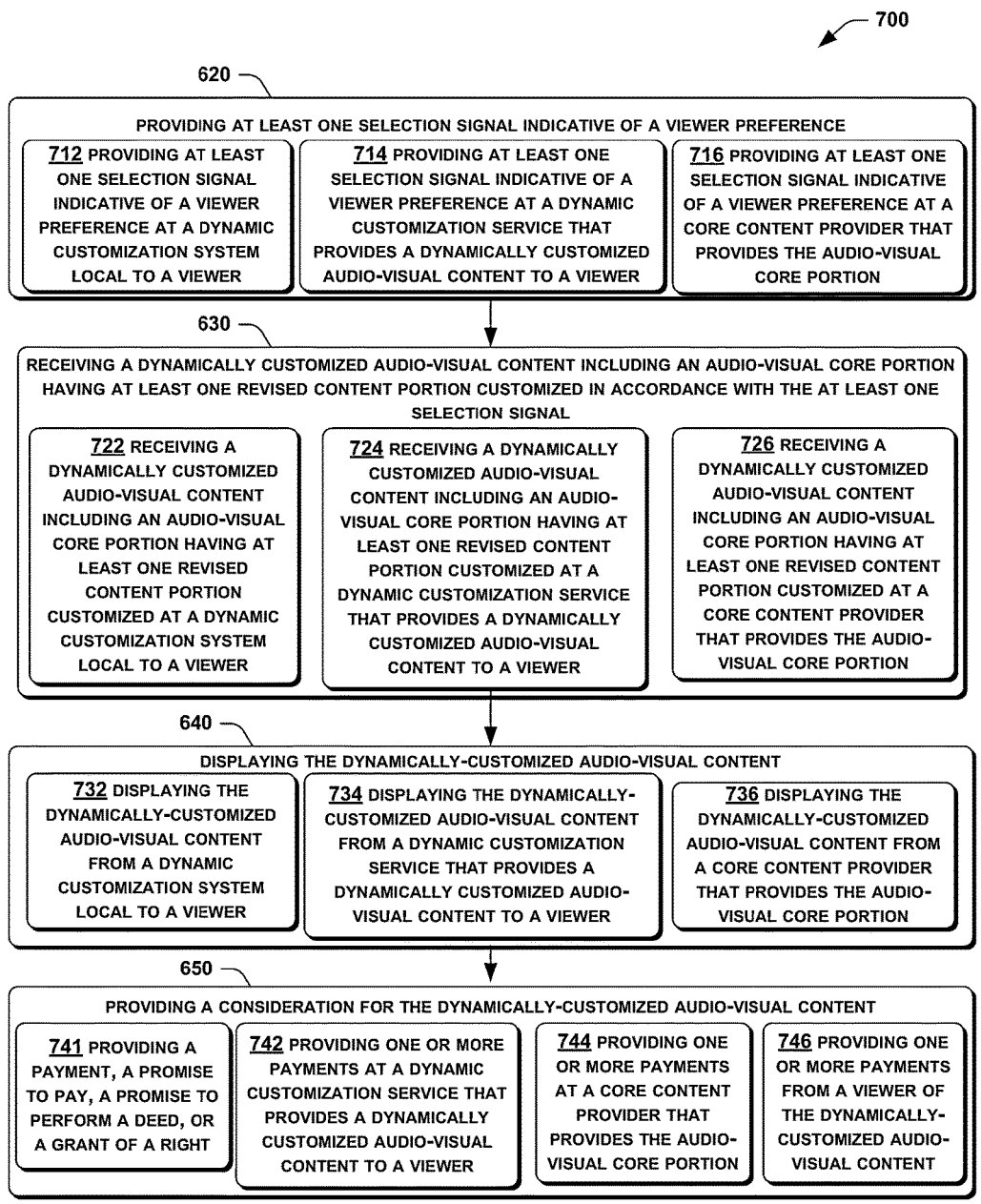

As shown in FIG. 7, in some implementations, providing at least one selection signal indicative of a viewer preference at 620 may include providing at least one selection signal indicative of a viewer preference at a dynamic customization system proximate to a viewer at 712 (e.g. dynamic customization system 100 shown in FIG. 1, an Xbox®, Playstation®, Wii®, personal computer, Mac®, or other suitable processing device located within a viewer's living space or sphere of influence, etc.). In further implementations, providing at least one selection signal indicative of a viewer preference at 620 may include providing at least one selection signal indicative of a viewer preference at a dynamic customization service that provides a dynamically customized audio-visual content to a viewer at 714 (e.g. customization service provider 420 shown in FIG. 4). In still further implementations, providing at least one selection signal indicative of a viewer preference at 620 may include providing at least one selection signal indicative of a viewer preference by a core content provider at 716 (e.g. core content provider 510 shown in FIG. 5).

As further shown in FIG. 7, in other implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one revised content portion customized at a dynamic customization system proximate to a viewer at 722 (e.g. dynamic customization system 100 shown in FIG. 1). In further implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one revised content portion customized at a dynamic customization service that provides a dynamically customized audio-visual content to a viewer at 724 (e.g. customization service provider 420 shown in FIG. 4). In still further implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one revised content portion customized at a core content provider that provides the audio-visual core portion at 726 (e.g. core content provider 510 shown in FIG. 5).

In additional implementations, displaying the dynamically-customized audio-visual content at 640 may include displaying the dynamically-customized audio-visual content customized by a dynamic customization system proximate to a viewer at 732 (e.g. dynamic customization system 100 shown in FIG. 1, at the viewer's television set, at the viewer's viewing room, within the viewer's dwelling, etc.). In further implementations, displaying the dynamically-customized audio-visual content at 640 may include displaying the dynamically-customized audio-visual content customized by a dynamic customization service that provides the dynamically-customized audio-visual content to a viewer at 734 (e.g. customization service provider 420 shown in FIG. 4). In still further implementations, displaying the dynamically-customized audio-visual content at 640 may include displaying the dynamically-customized audio-visual content customized by a core content provider that provides the audio-visual core portion at 736 (e.g. core content provider 510 shown in FIG. 5).

As further shown in FIG. 7, in alternate implementations, providing a consideration for the dynamically-customized audio-visual content at 650 may include providing at least one of a payment, a promise to pay, a promise to perform a deed, or a grant of a right at 741. For example, in some implementations, the payment may be a one-time payment, a monthly subscription payment, a use-based or on-demand type of payment, or any other suitable payment. Similarly, in some implementations, the promise to pay may be a contractual commitment to provide future payment (or payments) based on amount or frequency of usage, or any other suitable terms. Further, the promise to perform a deed may include a promise to send payment, a promise to enable access private information, a promise to allow data gathering regarding viewing habits or preferences, or any other suitable promises. And the grant of a right may include a grant of access to gather personal data, a grant to share data gathered, a grant to perform market testing or market analysis, or any other suitable grant of one or more rights. Of course, these examples are merely exemplary, and the consideration received at 650 may be any suitable consideration as that term is generally understood in accordance with the principles of contracts and contract law, and as described more fully below.

As further shown in FIG. 7, in some implementations, providing a consideration for the dynamically-customized audio-visual content at 650 may include providing one or more payments to a dynamic customization service that provides a dynamically customized audio-visual content to a viewer at 742 (e.g. customization service provider 420 shown in FIG. 4). In further alternate implementations, providing a consideration for the dynamically-customized audio-visual content at 650 may include providing one or more payments to a core content provider that provides the audio-visual core portion at 744 (e.g. core content provider 510 shown in FIG. 5). Finally, in additional embodiments, providing a consideration for the dynamically-customized audio-visual content at 650 may include providing one or more payments to a viewer of the dynamically-customized audio-visual content at 746 (e.g. viewer 132, viewer 1840, etc.).

Figure 8:
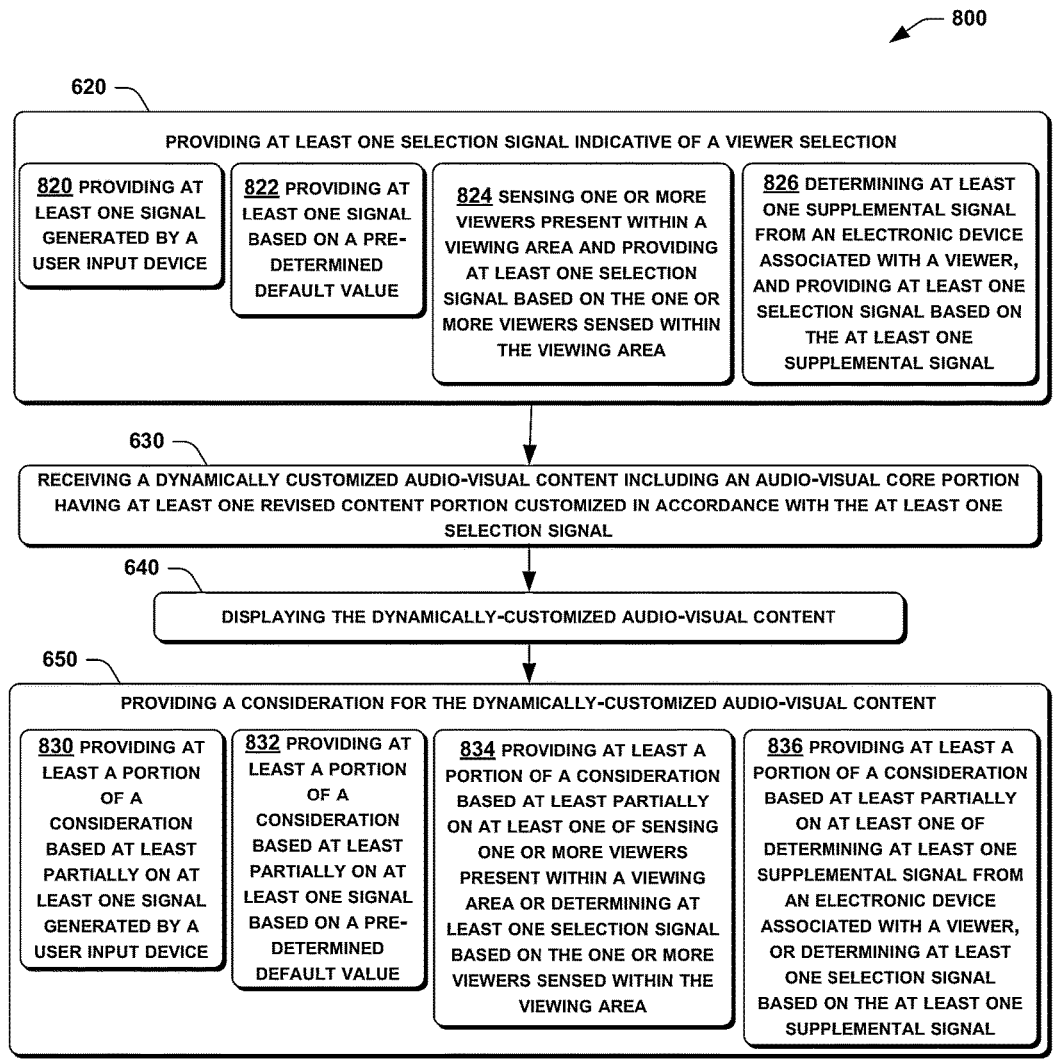

As shown in FIG. 8, a variety of different selection signals may be received in accordance with the present disclosure, and a variety of different payment schemes may be deviced based on the different selection signal varieties. For example, in some implementations, providing at least one selection signal indicative of a viewer preference at 620 may include providing at least one selection signal generated by a user input device at 820 (e.g. receiving a signal generated by a keyboard, a joystick, a microphone, a touch screen, etc). In further implementations, providing at least one selection signal indicative of a viewer preference at 620 may include providing at least one selection signal based on a pre-determined default value at 822 (e.g. receiving one or more signals based on a user's previous selections stored in memory, or a pre-defined profile for a user stored in memory, etc.).

In other implementations, providing at least one selection signal indicative of a viewer preference at 620 may include sensing one or more viewers present within a viewing area and providing at least one selection signal based on the one or more viewers sensed within the viewing area at 824 (e.g. sensing a parent and a child within a television viewing area, and providing a first selection signal based on the parent and a second selection signal based on the child, sensing a female and a male within a television viewing area, and determining a first selection signal based on the female and a second selection signal based on the male, etc.). In still other implementations, providing at least one selection signal indicative of a viewer preference at 620 may include determining at least one supplemental signal from an electronic device associated with a viewer (e.g. a cell phone, personal data assistant, laptop computer, desktop computer, smart phone, tablet, Apple iPhone, Apple iPad, Microsoft Surface, Kindle Fire, etc.) and providing at least one selection signal based on the at least one supplemental signal at 826.

It will be appreciated that various implementations of providing a consideration for the dynamically-customized audio-visual content at 650 may be implemented in accordance with the various implementations of providing at least one selection signal indicative of a viewer preference at 630. For example, as shown in FIG. 8, in some implementations, providing a consideration for the dynamically-customized audio-visual content at 650 may include providing at least a portion of a consideration based at least partially on providing at least one selection signal generated by the user input device at 830 (e.g. providing a payment at least partially based on receiving a signal generated by a keyboard, a joystick, a microphone, a touch screen, etc). In other implementations, providing a consideration for the dynamically-customized audio-visual content at 650 may include providing at least a portion of a consideration based at least partially on receiving at least one selection signal based on a pre-determined default value at 832 (e.g. providing a payment at least partially based on receiving one or more signals based on a user's previous selections stored in memory, or a pre-defined profile for a user stored in memory, etc.).

In other implementations, providing a consideration for the dynamically-customized audio-visual content at 650 may include providing at least a portion of a consideration based at least partially on at least one of sensing one or more viewers present within a viewing area or providing at least one selection signal based on the one or more viewers sensed within the viewing area at 834 (e.g. providing a payment at least partially based on sensing a parent and a child within a television viewing area and/or determining a first selection signal based on the parent and a second selection signal based on the child, receiving a payment at least partially based on sensing a female and a male within a television viewing area, and/or determining a first selection signal based on the female and a second selection signal based on the male, etc.). In still other implementations, providing a consideration for the dynamically-customized audio-visual content at 650 may include providing at least a portion of a consideration based at least partially on at least one of determining at least one supplemental signal from an electronic device associated with a viewer or providing at least one selection signal based on the at least one supplemental signal at 836 (e.g. providing a payment based at least partially on determining at least one supplemental signal from a cell phone, personal data assistant, laptop computer, desktop computer, smart phone, tablet, Apple iPhone, Apple iPad, Microsoft Surface, Kindle Fire, etc. associated with a viewer, and/or determine at least one selection signal based on such a supplemental signal).

Figure 9:
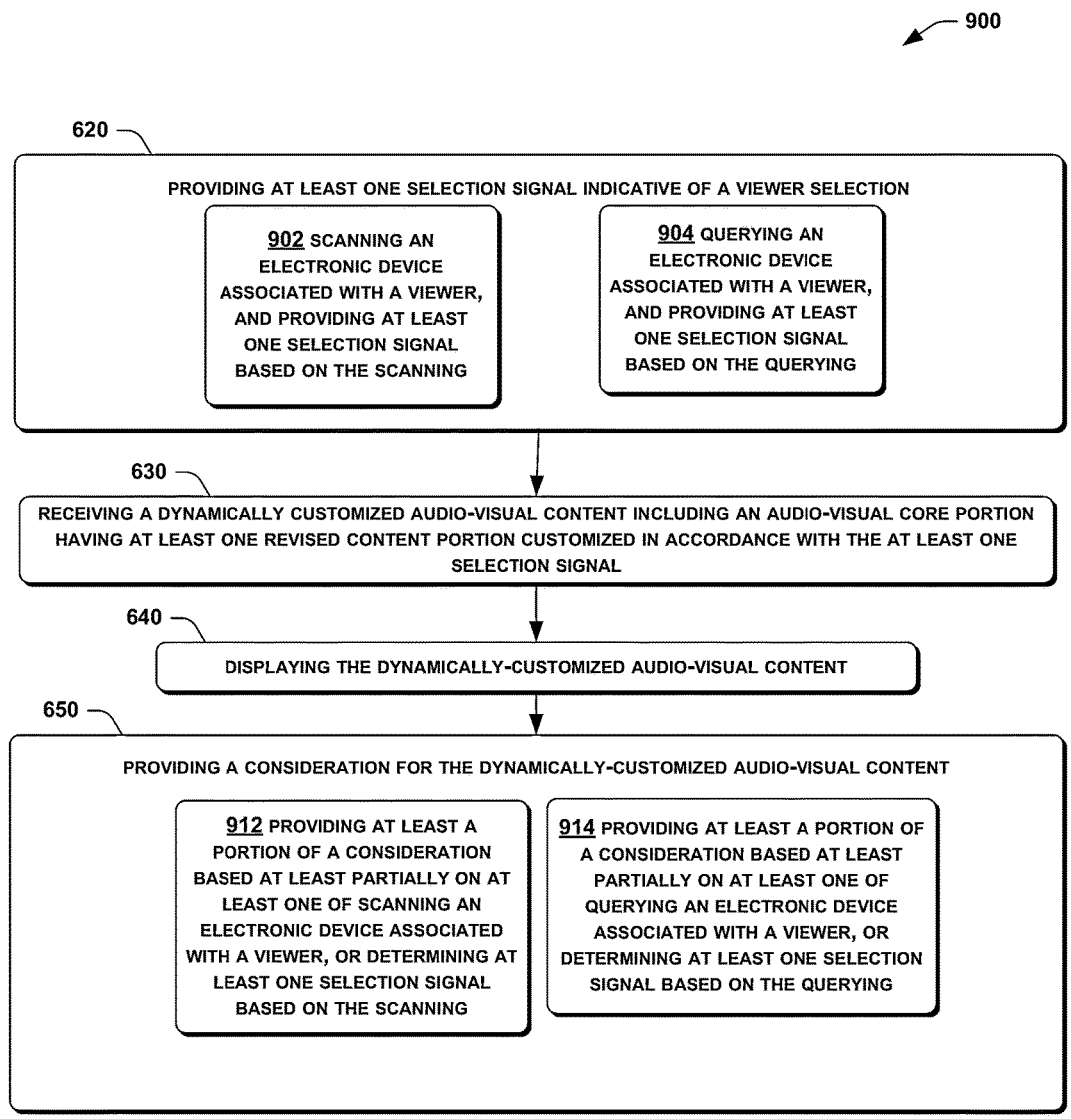

As shown in FIG. 9, in other implementations, providing at least one selection signal indicative of a viewer preference at 620 may include scanning an electronic device associated with a viewer (e.g. a cell phone, personal data assistant, laptop computer, desktop computer, smart phone, tablet, Apple iPhone®, Apple iPad®, Microsoft Surface®, Kindle Fire®, etc.) and providing at least one selection signal based on the scanning at 902. And in other implementations, providing at least one selection signal indicative of a viewer preference at 620 may include querying an electronic device associated with a viewer (e.g. a cell phone, personal data assistant, laptop computer, desktop computer, smart phone, tablet, Apple iPhone®, Apple iPad®, Microsoft Surface®, Kindle Fire®, etc.) and providing at least one selection signal based on the querying at 906.

As noted above, various implementations of providing a consideration for the dynamically-customized audio-visual content at 650 may be implemented in accordance with the various implementations of providing at least one selection signal indicative of a viewer preference at 630. For example, as shown in FIG. 9, in some implementations, providing a consideration for the dynamically-customized audio-visual content at 650 may include providing at least a portion of a consideration based at least partially on at least one of scanning an electronic device associated with a viewer or providing at least one selection signal based on the scanning at 912 (e.g. providing a payment based at least partially on scanning a viewer's cell phone, personal data assistant, laptop computer, desktop computer, smart phone, tablet, Apple iPhone®, Apple iPad®, Microsoft Surface®, Kindle Fire®, etc., and/or determining a selection signal based on the scanning). And in other implementations, providing a consideration for the dynamically-customized audio-visual content at 650 may include providing at least a portion of a consideration based at least partially on at least one of querying an electronic device associated with a viewer or providing at least one selection signal based on the querying at 914 (e.g. receiving a payment based at least partially on a querying of a viewer's cell phone, personal data assistant, laptop computer, desktop computer, smart phone, tablet, Apple iPhone®, Apple iPad®, Microsoft Surface®, Kindle Fire®, etc., and/or determining a selection signal based on the querying).

Figure 10:
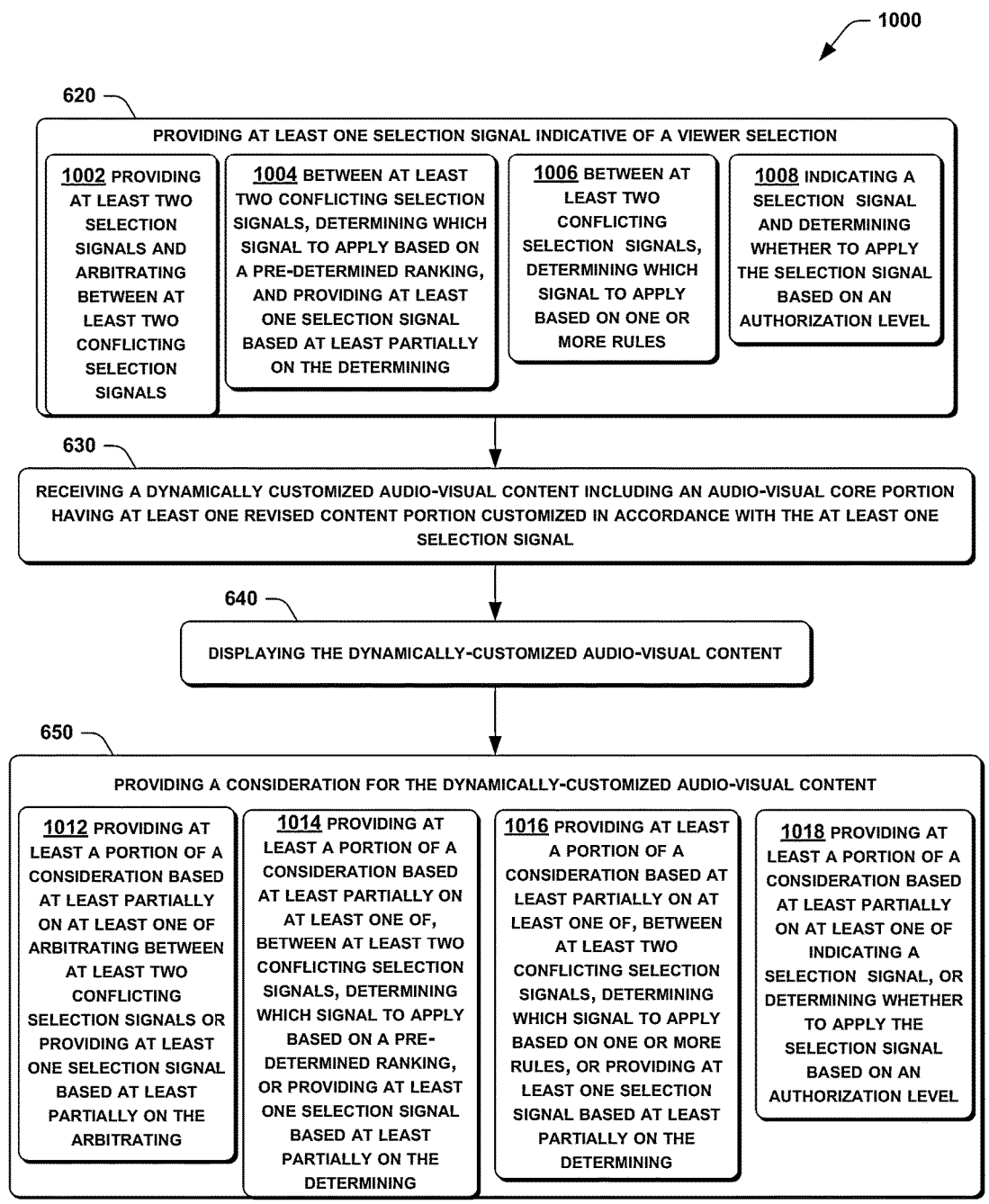

In some instances, one or more incoming signals may conflict with one or more other incoming signals. Such conflicts may be resolved in a variety of suitable ways. For example, as shown in FIG. 10, in some implementations, providing at least one selection signal indicative of a viewer preference at 620 may include arbitrating between at least two conflicting selection signals, and providing at least one selection signal based at least partially on the arbitrating at 1002 (e.g. providing a first selection signal indicating a desire to view R-rated subject matter, and a second selection signal indicating that a child is in the viewing area, and arbitrating between the first and second selection signals such that the R-rated subject matter is not shown). In at least some implementations, providing at least one selection signal indicative of a viewer preference at 620 may include between at least two conflicting selection signals, determining which signal to apply based on a pre-determined ranking, and providing at least one selection signal based at least partially on the determining at 1004 (e.g. providing a first selection signal from a manual input device to view a movie in English and a second selection signal from a scanning of a laptop computer indicating a preference for French, and determining to apply the first selection signal based on a pre-determined ranking that gives higher ranking to manually input signals over signals determined by scanning; providing a first selection signal from a parent's electronic device and a second selection signal from a child's electronic device, and determining to apply the first selection signal based on a ranking that gives priority to signals from the parent's electronic device over the child's electronic device, etc.).

In further implementations, providing at least one selection signal indicative of a viewer preference at 620 may include between at least two conflicting selection signals, determining which signal to apply based on one or more rules, and providing at least one selection signal based at least partially on the determining at 1006 (e.g. determining a first selection signal from a manual input device indicating a desire to view R-rated content, and a second selection signal from a scanning of a viewing area indicating a child in a viewing area, and determining not to display the R-rated content based on a rule that indicates that R-rated content will not be displayed when any child is present; providing a first selection signal from a manual input device indicating a desire to view a first actor, and a second selection signal from an Android phone indicating a desire to view a second actor, and determining to apply the first selection signal based on a rule that gives priority to a manual input over an input determined from querying an electronic device, etc.). In still other implementations, providing at least one selection signal indicative of a viewer preference at 620 may include indicating a selection signal, and determining whether to apply the selection signal based on an authorization level at 1008 (e.g. providing a selection signal from a scanning of a viewer's electronic device indicating a desire to view R-rated content, and determining not to display the R-rated content based on a lack of authorization by an owner of the electronic device).

Again, it will be appreciated that various implementations of providing a consideration for the dynamically-customized audio-visual content at 650 may be implemented in accordance with the various implementations of providing at least one selection signal indicative of a viewer preference at 630. For example, as further shown in FIG. 10, in some implementations, providing a consideration for the dynamically-customized audio-visual content at 650 may include providing at least a portion of a consideration based at least partially on at least one of arbitrating between at least two conflicting selection signals or providing at least one selection signal based at least partially on the arbitrating at 1012 (e.g. providing a payment based at least partially on receiving and/or arbitrating between the first and second selection signals that conflict with respect to a preferred maturity level of content, a preferred language of content, a preferred setting of content, etc.). In at least some implementations, providing a consideration for the dynamically-customized audio-visual content at 650 may include, providing at least a portion of a consideration based at least partially on at least one of between at least two conflicting selection signals, determining which signal to apply based on a pre-determined ranking or providing at least one selection signal based at least partially on the determining at 1014 (e.g. providing a payment based at least partially on receiving and/or determining which of two conflicting signals to apply based on a ranking heirarchy, etc.).

In further implementations, providing a consideration for the dynamically-customized audio-visual content at 650 may include providing at least a portion of a consideration based at least partially on at least one of between at least two conflicting selection signals, determining which signal to apply based on one or more rules, or providing at least one selection signal based at least partially on the determining at 1016 (e.g. providing a payment based at least partially on receiving first and second selection signals that conflict, and/or determining which to apply based on one or more rules regarding a content maturity level, a language preference, a content violence level, etc.). In still other implementations, providing a consideration for the dynamically-customized audio-visual content at 650 may include providing at least a portion of a consideration based at least partially on at least one of indicating a selection signal, or determining whether to apply the selection signal based on an authorization level at 1018 (e.g. providing a payment based at least partially on receiving a selection signal from a scanning of a viewer's electronic device indicating a desire to view R-rated content and determining not to display the R-rated content based on a lack of authorization by an owner of the electronic device, etc.).

As noted above, a wide variety of aspects of audio-visual core portions may be dynamically customized in accordance with the preferences of a viewer. For example, as shown in FIG. 11, in at least some implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one actor replaced with at least one replacement actor at 1102 (e.g. receiving a dynamically customized version of the movie Troy having the actor Brad Pitt replaced with the replacement actor Mel Gibson, receiving a dynamically customized version of the movie The Manchurian Candidate having the actor Meryl Streep replaced with the replacement actor Jessica Alba, the term "actor" being used herein a gender-neutral manner to include both males and females, etc.).

In further implementations, receiving a dynamically customized audio-visual content including an audio-visual core portion having at least one revised content portion customized in accordance with the at least one selection signal at 630 may include receiving a dynamically customized audio-visual content including an audio-visual core portion having one or more of a facial appearance, a voice, a body appearance, or an apparel replaced with a corresponding one or more of a replacement facial appearance, a replacement voice, a replacement body appearance, or a replacement apparel at 1104 (e.g. receiving a customized content having a facial appearance and a voice of the actor Brad Pitt in the movie Troy replaced with a replacement facial appearance of actor Mel Gibson and a replacement voice of actor Chris Rock, receiving a customized content having a body appearance and an apparel of actor Meryl Streep in the movie The Manchurian Candidate replaced with a replacement body appearance of actor Jessica Alba and a replacement apparel based on a browsing history of online clothing shopping recently viewed by the viewer as indicated by supplemental signals from the viewer's laptop computer, etc.).

Figure 11:
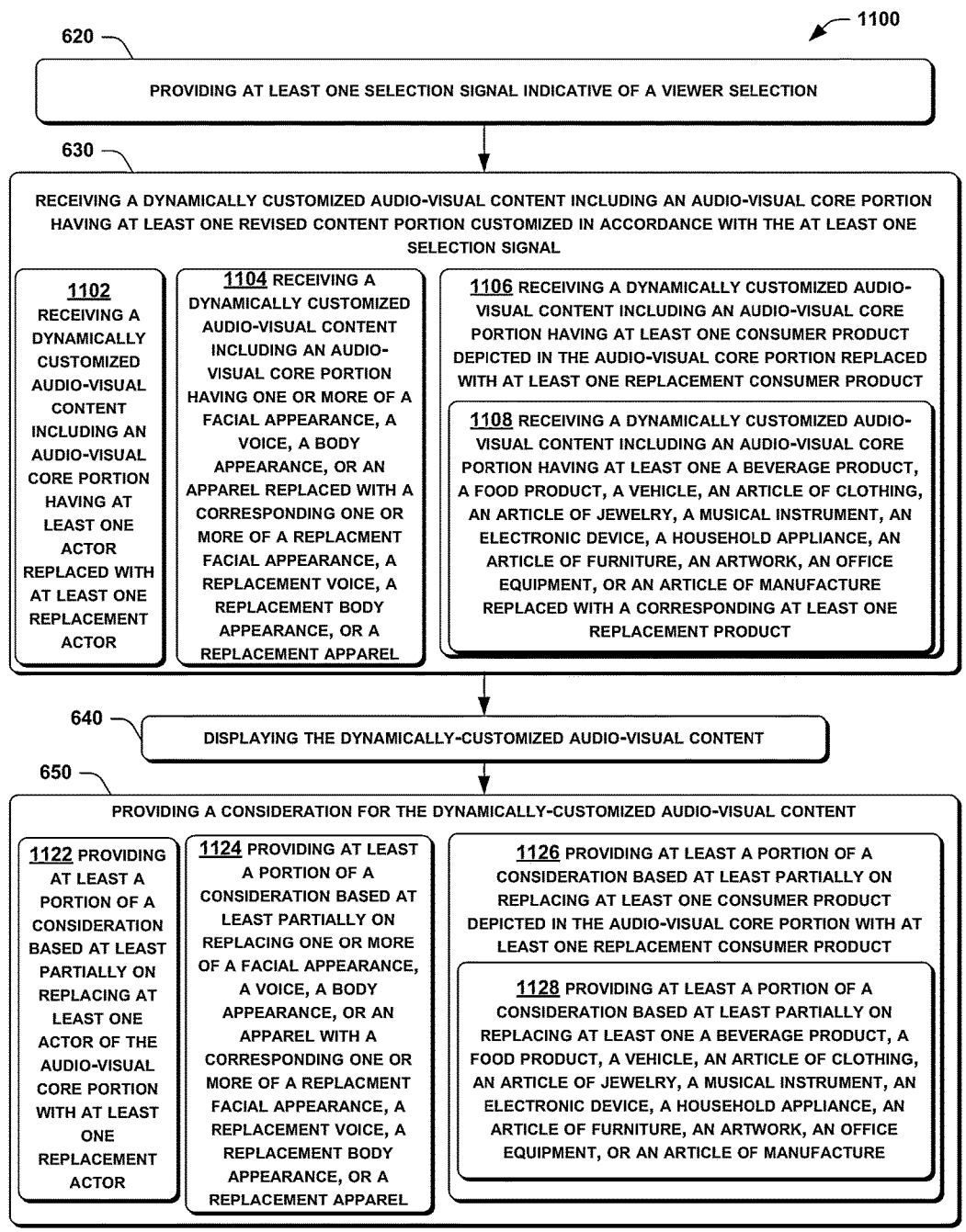

As further shown in FIG. 11, in still other implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one consumer product depicted in the audio-visual core portion replaced with at least one replacement consumer product at 1106 (e.g. receiving a customized content having a can of Coke® held by an actor in a television sitcom replaced with a can of Dr. Pepper®, receiving a customized content having a hamburger eaten by a character in a movie replaced with a taco, receiving a customized content having a Gibson® guitar played by a character in a podcast replaced with a Fender® guitar, etc.). In further implementations, receiving a dynamically customized audio-visual content including an audio-visual core portion having at least one consumer product depicted in the audio-visual core portion replaced with at least one replacement consumer product at 1106 may include receiving a dynamically customized audio-visual content including an audio-visual core portion having at least one of a beverage product, a food product, a vehicle, an article of clothing, an article of jewelry, a musical instrument, an electronic device, a household appliance, an article of furniture, an artwork, an office equipment, or an article of manufacture replaced with a corresponding at least one of a replacement beverage product, a replacement food product, a replacement vehicle, a replacement article of clothing, a replacement article of jewelry, a replacement musical instrument, a replacement electronic device, a replacement household appliance, a replacement article of furniture, a replacement artwork, a replacement office equipment, or a replacement article of manufacture at 1108.

It will be appreciated that various implementations of providing a consideration for the dynamically-customized audio-visual content at 650 may be implemented in accordance with the various implementations of receiving a dynamically customized audio-visual content including an audio-visual core portion having at least one revised content portion customized in accordance with the at least one selection signal at 630. For example, as further shown in FIG. 11, in some implementations, providing a consideration for the dynamically-customized audio-visual content at 650 may include providing at least a portion of a consideration based at least partially on receiving a dynamically customized audio-visual content including an audio-visual core portion having at least one actor replaced with at least one replacement actor at 1122 (e.g. providing a payment based at least partially on replacing an actor with a replacement actor, providing a relatively higher payment based on replacing a lower-popularity actor with a higher-popularity actor, etc.).

In further implementations, providing a consideration for the dynamically-customized audio-visual content at 650 may include providing at least a portion of a consideration based at least partially on receiving a dynamically customized audio-visual content including an audio-visual core portion having one or more of a facial appearance, a voice, a body appearance, or an apparel replaced with a corresponding one or more of a replacement facial appearance, a replacement voice, a replacement body appearance, or a replacement apparel at 1124 (e.g. providing a payment based on replacing a facial appearance and a voice of a first actor with a second actor, receiving a relatively higher payment based at least partially on replacing a first body appearance of a lower-popularity actress with a body appearance of a higher-popularity actress, etc.).

In yet other implementations, providing a consideration for the dynamically-customized audio-visual content at 650 may include providing at least a portion of a consideration based at least partially on receiving a dynamically customized audio-visual content including an audio-visual core portion having at least one consumer product depicted in the audio-visual core portion replaced with at least one replacement consumer product at 1126 (e.g. providing a payment based at least partially on replacing a can of Coke® held by an actor in a television sitcom with a can of Dr. Pepper®, providing a payment based at least partially on replacing a hamburger eaten by a character in a movie with a taco, or for replacing a Gibson® guitar played by a character in a podcast with a Fender® guitar, etc.). In further implementations, providing a consideration for the dynamically-customized audio-visual content at 650 may include providing at least a portion of a consideration based at least partially on receiving a dynamically customized audio-visual content including an audio-visual core portion having at least one of a beverage product, a food product, a vehicle, an article of clothing, an article of jewelry, a musical instrument, an electronic device, a household appliance, an article of furniture, an artwork, an office equipment, or an article of manufacture replaced with a corresponding at least one of a replacement beverage product, a replacement food product, a replacement vehicle, a replacement article of clothing, a replacement article of jewelry, a replacement musical instrument, a replacement electronic device, a replacement household appliance, a replacement article of furniture, a replacement artwork, a replacement office equipment, or a replacement article of manufacture at 1108.

Figure 12:
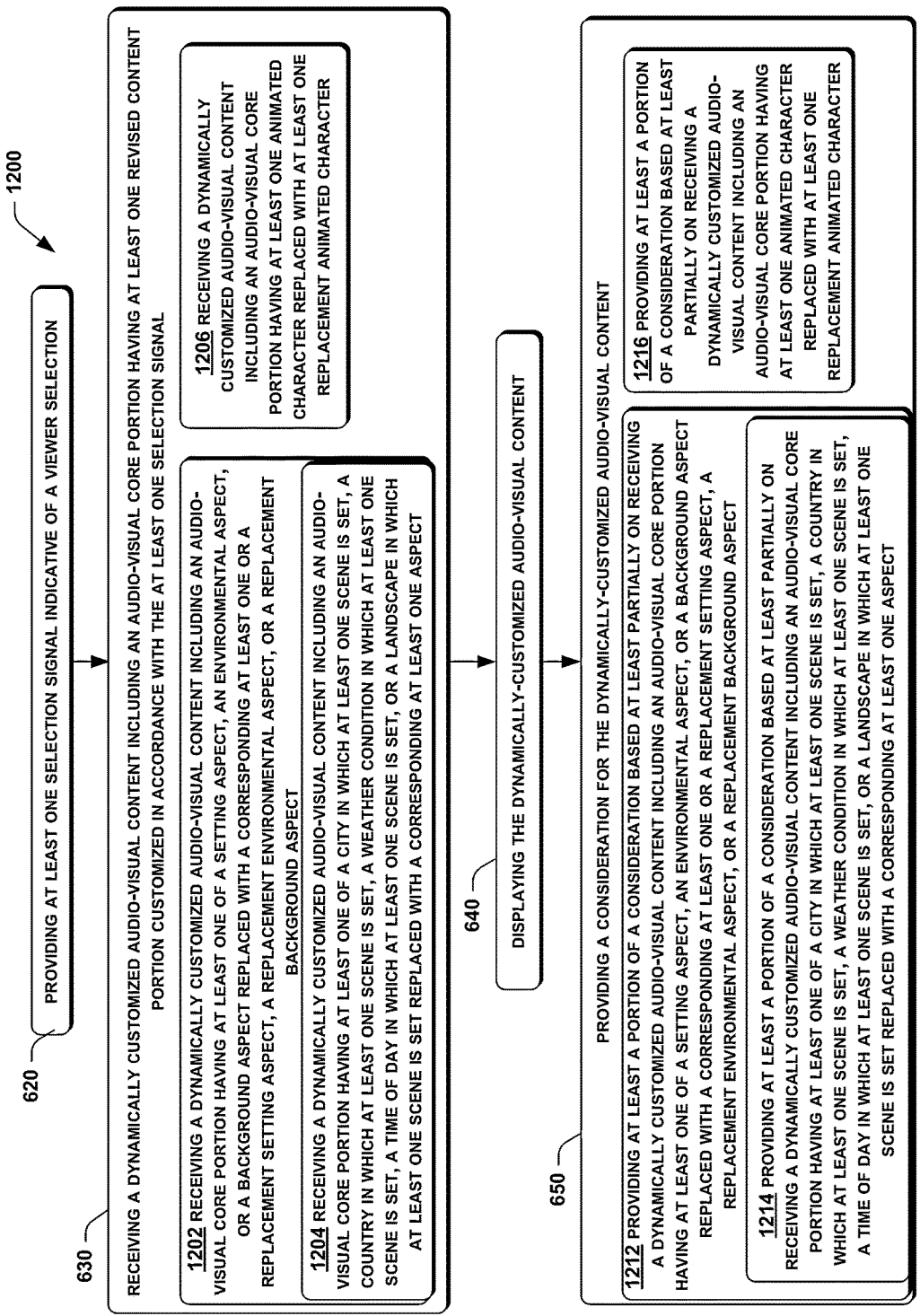

Referring now to FIG. 12, in additional implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one of a setting aspect, an environmental aspect, or a background aspect of the audio-visual core portion replaced with a corresponding at least one of a replacement setting aspect, a replacement environmental aspect, or a replacement background aspect at 1202. For example, one or more scenes from a movie may be set in a different location (e.g. scenes from Sleepless in Seattle may be set in Cleveland, or a background with the Golden Gate bridge may be replaced with the Tower Bridge over the Thames River, etc.). Alternately, a weather condition may be replaced with a different weather condition (e.g. a surfing scene from Baywatch may take place in a snowstorm instead of a sunny day, etc.), or buildings in a background may be replaced with mountains or open countryside.

In some implementations, receiving a dynamically customized audio-visual content including an audio-visual core portion having at least one of a setting aspect, an environmental aspect, or a background aspect of the audio-visual core portion replaced with a corresponding at least one of a replacement setting aspect, a replacement environmental aspect, or a replacement background aspect at 1202 may include receiving a dynamically customized audio-visual content including an audio-visual core portion having at least one of a city in which at least one scene is set, a country in which at least one scene is set, a weather condition in which at least one scene is set, a time of day in which at least one scene is set, or a landscape in which at least one scene is set replaced with a corresponding at least one of a replacement city in which at least one scene is set, a replacement country in which at least one scene is set, a replacement weather condition in which at least one scene is set, a replacement time of day in which at least one scene is set, or a replacement landscape in which at least one scene is set at 1204.

As further shown in FIG. 12, in other implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one animated character replaced with at least one replacement animated character at 1206 (e.g. receiving a customized content having a cartoon character Snow White from Snow White and the Seven Dwarfs replaced with a cartoon character Alice from Alice in Wonderland, or receiving a customized content having an animated elf replaced with an animated dwarf, etc.).

Again, various implementations of providing a consideration for the dynamically-customized audio-visual content at 650 may be implemented in accordance with the various implementations of receiving a dynamically customized audio-visual content including an audio-visual core portion having at least one revised content portion customized in accordance with the at least one selection signal at 630. For example, as further shown in FIG. 12, in some implementations, providing a consideration for the dynamically-customized audio-visual content at 650 may include providing at least a portion of a consideration based at least partially on receiving a dynamically customized audio-visual content including an audio-visual core portion having at least one of a setting aspect, an environmental aspect, or a background aspect of the audio-visual core portion replaced with a corresponding at least one of a replacement setting aspect, a replacement environmental aspect, or a replacement background aspect at 1212 (e.g. receiving a payment based at least partially on replacing scenes set in a first building setting with scenes set in a second building setting, etc.). In further implementations, providing a consideration for the dynamically-customized audio-visual content at 650 may include providing at least a portion of a consideration based at least partially on receiving a dynamically customized audio-visual content including an audio-visual core portion having at least one of a city in which at least one scene is set, a country in which at least one scene is set, a weather condition in which at least one scene is set, a time of day in which at least one scene is set, or a landscape in which at least one scene is set replaced with a corresponding at least one of a replacement city in which at least one scene is set, a replacement country in which at least one scene is set, a replacement weather condition in which at least one scene is set, a replacement time of day in which at least one scene is set, or a replacement landscape in which at least one scene is set at 1214.

In still other implementations, providing a consideration for the dynamically-customized audio-visual content at 650 may include providing at least a portion of a consideration based at least partially on receiving a dynamically customized audio-visual content including an audio-visual core portion having at least one animated character replaced with at least one replacement animated character at 1216 (e.g. providing a payment based at least partially on receiving a customized content having a cartoon Snow White replaced with a cartoon Alice, or based at least partially on receiving a customized content having a cartoon Cartman replaced with a cartoon Kenny, etc.).

Figure 13:
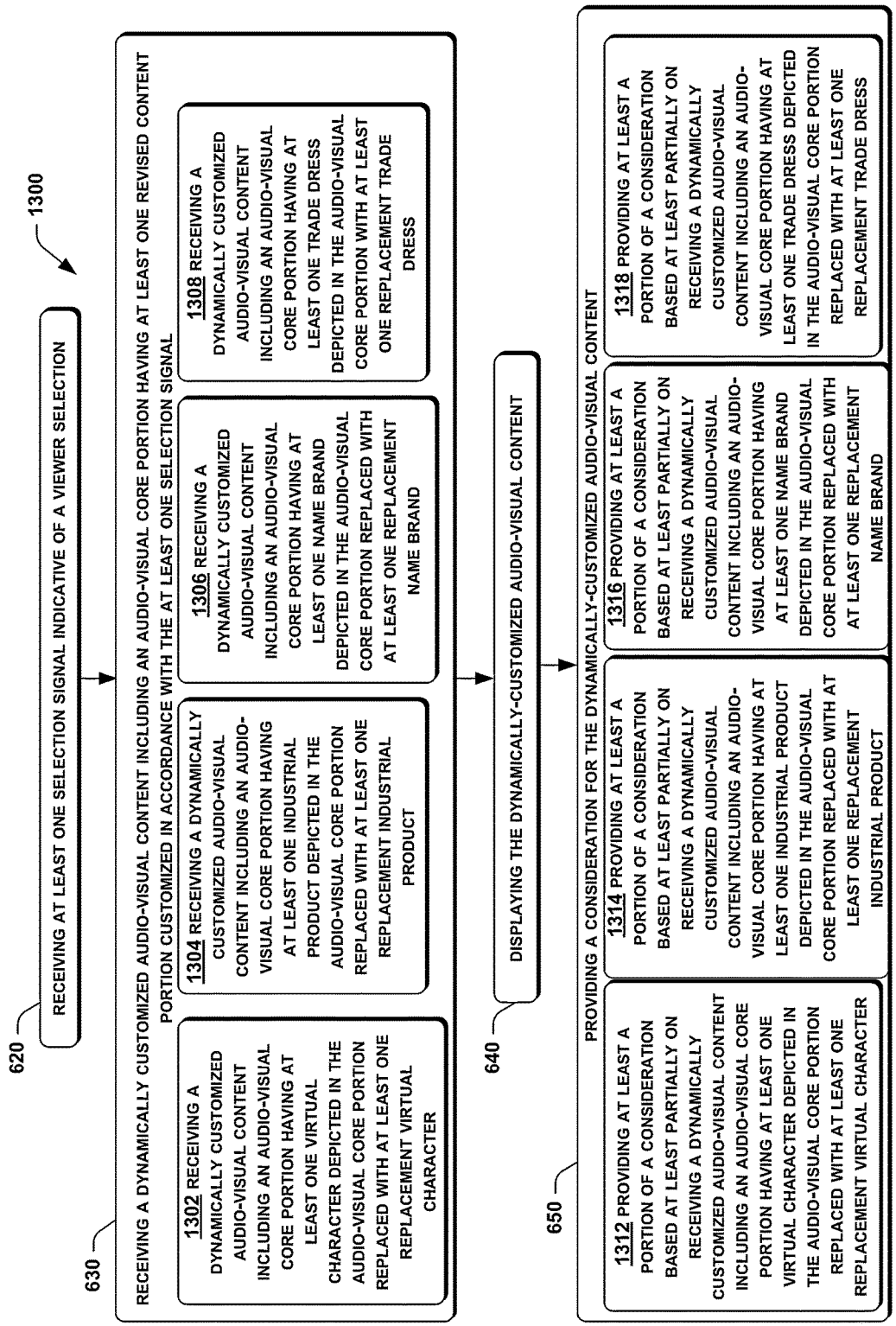

With reference to FIG. 13, in further implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one virtual character replaced with at least one replacement virtual character at 1302 (e.g. receiving a customized content having a virtual warrior replaced with a virtual wizard, etc.). In still other implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one industrial product replaced with at least one replacement industrial product at 1304 (e.g. receiving a customized content having a nameplace on a milling machine replaced from "Cincinnati" to "Bridgeport" in a factory scene, or having a name of a shipping line and/or the colors on a container ship replaced from "Maersk" to "Evergreen," etc.).

In still further implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one name brand replaced with at least one replacement name brand at 1306 (e.g. receiving a customized content having a leather label on character's pants changed from "Levis" to "J Brand," or having an Izod alligator on a character's shirt replaced with a Ralph Lauren horse logo, or having a shoe logo from "Gucci" changed to "Calvin Klein," etc.). In yet other implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one trade dress replaced with at least one replacement trade dress at 1308 (e.g. receiving a customized content having uniforms, packaging, colors, signs, logos, and any other items associated with a trade dress of "McDonald's" restaurant replaced with corresponding trade dress items associated with "Burger King" restaurant, or having brown trucks and uniforms associated with the "UPS" delivery company replaced with red and yellow trucks and uniforms associated with the "DHL Express" delivery company, or having helmets and jerseys associated with the Minnesota Vikings replaced with replacement helmets and jerseys associated with the Seattle Seahawks, etc.).

Again, various implementations of providing a consideration for the dynamically-customized audio-visual content at 650 may be implemented in accordance with the various implementations of receiving a dynamically customized audio-visual content including an audio-visual core portion having at least one revised content portion customized in accordance with the at least one selection signal at 630. For example, as further shown in FIG. 13, in some implementations, providing a consideration for the dynamically-customized audio-visual content at 650 may include providing at least a portion of a consideration based at least partially on receiving a dynamically customized audio-visual content including an audio-visual core portion having at least one virtual character replaced with at least one replacement virtual character at 1312 (e.g. providing a payment based on receiving a customized content having a virtual warrior replaced with a virtual wizard, etc.). In still other implementations, providing a consideration for the dynamically-customized audio-visual content at 650 may include providing at least a portion of a consideration based at least partially on receiving a dynamically customized audio-visual content including an audio-visual core portion having at least one industrial product replaced with at least one replacement industrial product at 1314 (e.g. providing a payment based on receiving a customized content having a nameplate on a milling machine changed from "Cincinnati" to "Bridgeport" in a factory scene, or having a name of a shipping line and/or the colors on a container ship changed from "Maersk" to "Evergreen," etc.).

In other implementations, providing a consideration for the dynamically-customized audio-visual content at 650 may include providing at least a portion of a consideration based at least partially on receiving a dynamically customized audio-visual content including an audio-visual core portion having at least one name brand replaced with at least one replacement name brand at 1316 (e.g. providing a payment based on receiving a customized content changing a leather label on character's pants, or replacing a trademark on a character's shirt, or replacing a logo on a character's computer, etc.). In yet other implementations, receiving a dynamically customized audio-visual content including an audio-visual core portion having at least one revised content portion customized in accordance with the at least one selection signal at 630 may include providing at least a portion of a consideration based at least partially on receiving a dynamically customized audio-visual content including an audio-visual core portion having at least one trade dress replaced with at least one replacement trade dress at 1318 (e.g. providing payment based at least partially on receiving a customized content having uniforms, packaging, colors, signs, logos, and any other items associated with a trade dress of "McDonald's" restaurant replaced with corresponding trade dress items associated with "Burger King" restaurant, providing a payment based on receiving a customized content having helmets and jerseys associated with the Dallas Cowboys replaced with those of the Detroit Lions so a viewer may watch a depiction of the Lions winning a Super Bowl, etc.).

Figure 14:
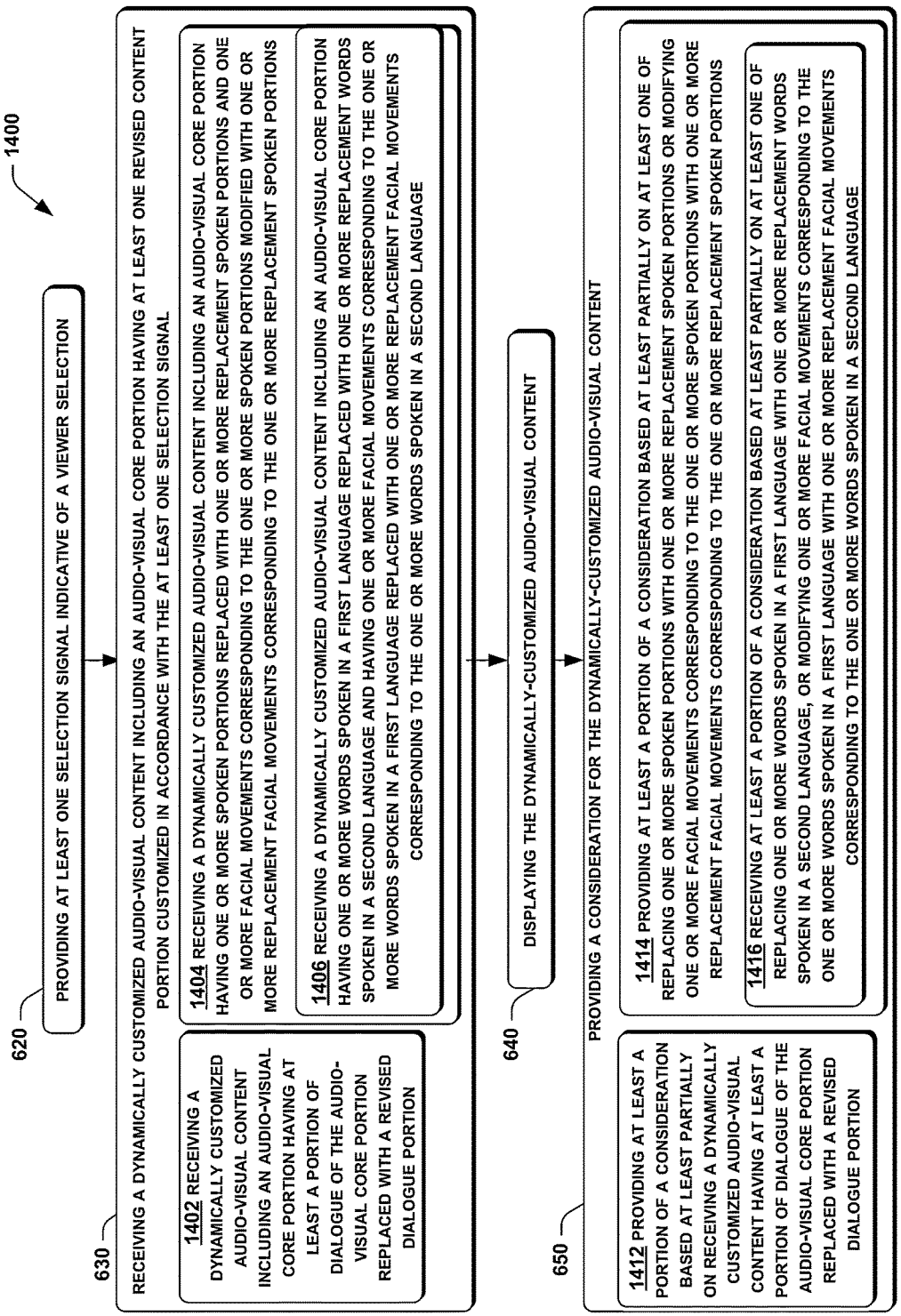

Additional possible implementations of receiving a dynamically customized audio-visual content including an audio-visual core portion having at least one revised content portion customized in accordance with the at least one selection signal at 630 are shown in FIG. 14. For example, in some implementations, receiving a dynamically customized audio-visual content including an audio-visual core portion having at least one revised content portion customized in accordance with the at least one selection signal at 630 may include receiving a dynamically customized audio-visual content including an audio-visual core portion having at least a portion of dialogue replaced with a revised dialogue portion at 1402. For example, based on the at least one selection signal indicative of a viewer selection (e.g. a viewer selection indicating a desire for no profanity, or based on automatic detection using a sensor of a child entering a viewing area, etc.) at 620, receiving a customized content having a portion of dialogue of a movie that contains profanity or that may otherwise be offensive to the viewer replaced with a replacement portion of dialogue that is not offensive to the viewer (e.g. a dialogue of a movie is modified from an R-rated dialogue to a lower-rated dialogue, such as PG-13-rated dialogue or a G-rated dialogue, such as "Frankly, my dear, I don't give a damn" being replaced with "Frankly, my dear, I don't really care", or receiving a customized content having a dialogue that is threatening or violent replaced with a less-threatening or less-violent dialogue, etc.).

In some implementations, receiving a dynamically customized audio-visual content including an audio-visual core portion having at least one revised content portion customized in accordance with the at least one selection signal at 630 may include receiving a dynamically customized audio-visual content including an audio-visual core portion having one or more spoken portions replaced with one or more replacement spoken portions (e.g. receiving a customized content having a profane word, such as "damn," with a non-profane word, such as "darn," replacing a first laughter, such as a "tee hee hee," with a second laugher, such as a "ha ha ha," etc.) and receiving a dynamically customized audio-visual content including an audio-visual core portion having one or more facial movements corresponding to the one or more spoken portions replaced with one or more replacement facial movements corresponding to the one or more replacement spoken portions (e.g. receiving a customized content having one or more lip movements corresponding with the profane word replaced with one or more replacement lip movements corresponding with the non-profane word, or having lip and eye movements corresponding with the first laughter replaced with replacement lip and eye movements corresponding with the second laughter, etc.) at 1404. Accordingly, unlike conventional editing practices that change spoken words but leave facial movements unchanged, in accordance with at least some implementations, by receiving customized content having both the audible portions and the corresponding facial movements, it is not apparent to a viewer that any changes have been made to the dialogue of the audio-visual core portion.

As further shown in FIG. 14, in further implementations, receiving a dynamically customized audio-visual content including an audio-visual core portion having one or more spoken portions replaced with one or more replacement spoken portions and receiving a dynamically customized audio-visual content including an audio-visual core portion having one or more facial movements corresponding to the one or more spoken portions replaced with one or more replacement facial movements corresponding to the one or more replacement spoken portions at 1404 may include receiving a dynamically customized audio-visual content including an audio-visual core portion having one or more words spoken in a first language replaced with one or more replacement words spoken in a second language (e.g. receiving a customized content having "no" replaced with "nyet," or having "yes" replaced with "oui," etc.), and receiving a dynamically customized audio-visual content including an audio-visual core portion having one or more facial movements corresponding to the one or more words spoken in the first language replaced with one or more replacement facial movements corresponding to the one or more words spoken in the second language (e.g. receiving a customized content having facial movements corresponding to "no" replaced with replacement facial movements corresponding to "nyet," or having facial movements corresponding to "yes" replaced with replacement facial movements corresponding to "oui," etc.) at 1406. Again, in this way, it will not be apparent to a viewer that an actor was originally speaking a first language but the movie has been dubbed with a second language, and instead, it will appear to the viewer that the actor was originally speaking the second language.

As previously noted, various implementations of providing a consideration for the dynamically-customized audio-visual content at 650 may be implemented in accordance with the various implementations of receiving a dynamically customized audio-visual content including an audio-visual core portion having at least one revised content portion customized in accordance with the at least one selection signal at 630. For example, as further shown in FIG. 14, in some implementations, providing a consideration for the dynamically-customized audio-visual content at 650 may include providing at least a portion of a consideration based at least partially on receiving a dynamically customized audio-visual content including an audio-visual core portion having at least a portion of dialogue replaced with a revised dialogue portion at 1412 (e.g. providing payment based on receiving a content customized to accommodate a viewer selection indicating a desire for no profanity, or based on automatic detection using a sensor of a child entering a viewing area, etc.).

In some implementations, providing a consideration for the dynamically-customized audio-visual content at 650 may include providing at least a portion of a consideration based at least partially on at least one of receiving a dynamically customized audio-visual content including an audio-visual core portion having one or more spoken portions replaced with one or more replacement spoken portions or receiving a dynamically customized audio-visual content including an audio-visual core portion having one or more facial movements corresponding to the one or more spoken portions replaced with one or more replacement facial movements corresponding to the one or more replacement spoken portions at 1414 (e.g. providing payment for receiving a customized content having a profane word replaced with a non-profane word, and/or having one or more lip movements corresponding with the profane word replaced with one or more replacement lip movements corresponding with the non-profane word, etc.). In further implementations, providing at least a portion of a consideration based at least partially on at least one of receiving a dynamically customized audio-visual content including an audio-visual core portion having one or more spoken portions replaced with one or more replacement spoken portions or receiving a dynamically customized audio-visual content including an audio-visual core portion having one or more facial movements corresponding to the one or more spoken portions replaced with one or more replacement facial movements corresponding to the one or more replacement spoken portions at 1414 may include providing at least a portion of a consideration based at least partially on at least one of receiving a dynamically customized audio-visual content including an audio-visual core portion having one or more words spoken in a first language replaced with one or more replacement words spoken in a second language, or receiving a dynamically customized audio-visual content including an audio-visual core portion having one or more facial movements corresponding to the one or more words spoken in the first language replaced with one or more replacement facial movements corresponding to the one or more words spoken in the second language at 1416 (e.g. providing payment for receiving a customized content having sounds and facial movements corresponding to Japanese speech replaced with those corresponding to English speech, or having sounds and facial movements corresponding to English speech replaced with those corresponding to Chinese speech, etc.).

Figure 15:
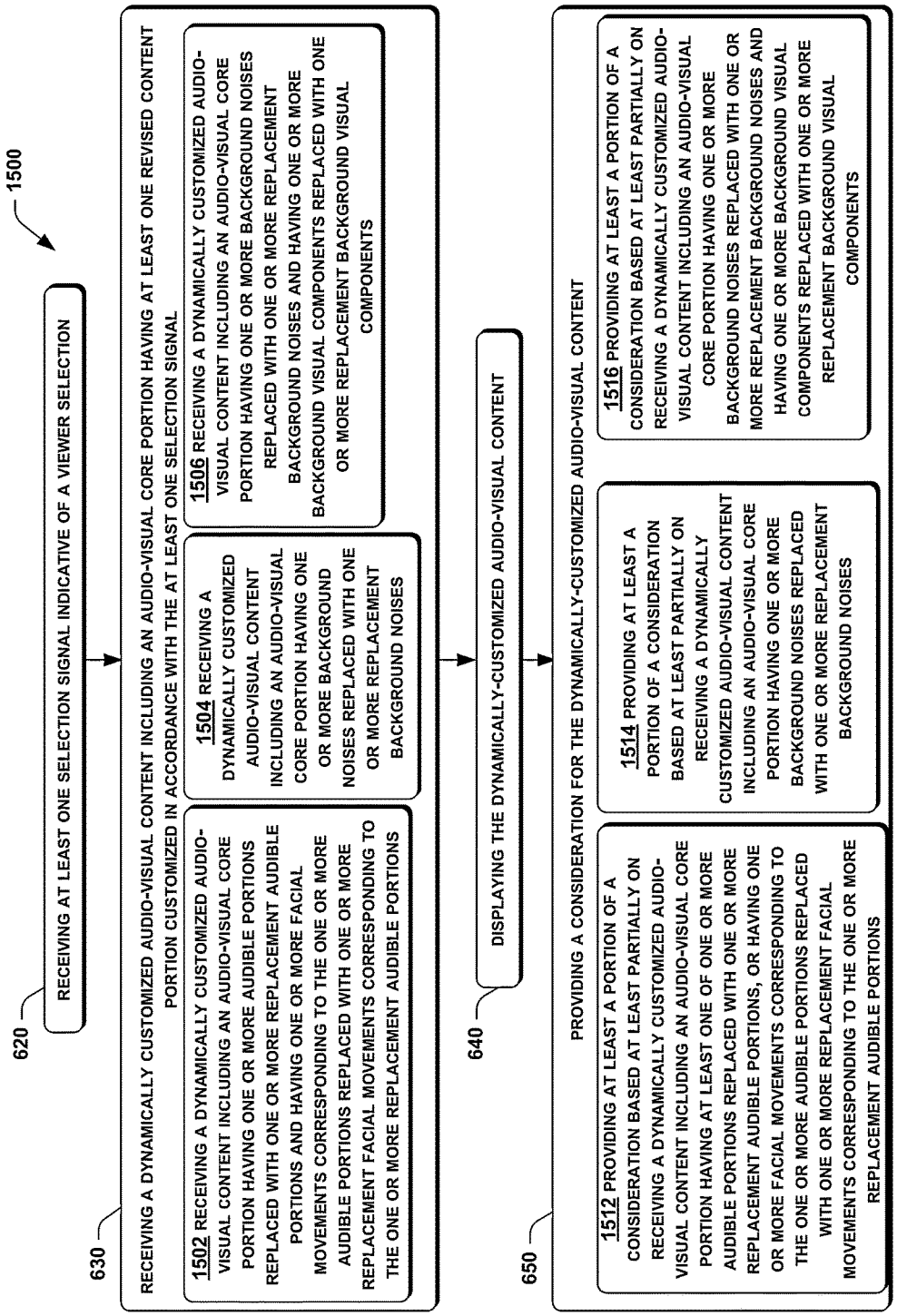

With reference to FIG. 15, in some implementations, receiving a dynamically customized audio-visual content including an audio-visual core portion having at least one revised content portion customized in accordance with the at least one selection signal at 630 may include receiving a dynamically customized audio-visual content including an audio-visual core portion having one or more audible portions replaced with one or more replacement audible portions (e.g. receiving a customized content having a sound of a hand clap replaced with a sound of snapping fingers, replacing a sound of a cough with a sound of a sneeze, or receiving a customized content having the sound of a piano replaced with the sound of a violin, etc.) and receiving a dynamically customized audio-visual content including an audio-visual core portion having one or more body movements corresponding to the one or more audible portions replaced with one or more replacement body movements corresponding to the one or more replacement audible portions (e.g. receiving a customized content having two hands striking replaced with two fingers snapping, or receiving a customized content having facial movements associated with a cough replaced with facial movements associated with a sneeze, or receiving a customized content having visual components associated with a piano being played replaced with replacement visual components associated with a violin being played, etc.) at 1502. Accordingly, by replacing both the audible and visual portions, it may not be apparent to the viewer that any changes have been made to the audio-visual core portion.

In other implementations, receiving a dynamically customized audio-visual content including an audio-visual core portion having at least one revised content portion customized in accordance with the at least one selection signal at 630 may include receiving a dynamically customized audio-visual content including an audio-visual core portion having one or more background noises replaced with one or more replacement background noises (e.g. receiving a customized content having a sound of a bird singing replaced with a sound of a dog barking, or receiving a customized content having a sound of an avalanche replaced with a sound of an erupting volcano, etc.) at 1504.

In further implementations, receiving a dynamically customized audio-visual content including an audio-visual core portion having at least one revised content portion customized in accordance with the at least one selection signal at 630 may include receiving a dynamically customized audio-visual content including an audio-visual core portion having one or more background noises replaced with one or more replacement background noises (e.g. receiving a customized content having a sound of a lion roaring replaced with a sound of an elephant trumpeting, or having a sound of an avalanche replaced with a sound of an erupting volcano, etc.), and receiving a dynamically customized audio-visual content including an audio-visual core portion having one or more background visual components replaced with one or more replacement background visual components (e.g. receiving a customized content having a visual image of a lion roaring replaced with a visual image of an elephant trumpeting, or having a visual depiction of an avalanche replaced with a visual depiction of an erupting volcano, etc.) at 1506.

With continued reference to FIG. 15, in some implementations, providing a consideration for the dynamically-customized audio-visual content at 650 may include providing at least a portion of a consideration based at least partially on at least one of receiving a dynamically customized audio-visual content including an audio-visual core portion having one or more audible portions replaced with one or more replacement audible portions, or receiving a dynamically customized audio-visual content including an audio-visual core portion having one or more body movements corresponding to the one or more audible portions replaced with one or more replacement body movements corresponding to the one or more replacement audible portions at 1512 (e.g. providing payment based on receiving a customized content having sounds and body movements associated with a hand clap replaced with replacement sounds and body movements associated with snapping fingers, receiving payment based on replacing sounds and body movements associated with a cough with replacement sounds and movements associated with a sneeze, etc.).

In other implementations, providing a consideration for the dynamically-customized audio-visual content at 650 may include providing at least a portion of a consideration based at least partially on receiving a dynamically customized audio-visual content including an audio-visual core portion having one or more background noises replaced with one or more replacement background noises at 1514 (e.g. providing payment based on receiving a customized content having jungle sounds replaced with urban sounds, or having crowd noise replaced with sounds of ocean surf, etc.). In further implementations, providing a consideration for the dynamically-customized audio-visual content at 650 may include providing at least a portion of a consideration based at least partially on at least one of receiving a dynamically customized audio-visual content including an audio-visual core portion having one or more background noises replaced with one or more replacement background noises, or receiving a dynamically customized audio-visual content including an audio-visual core portion having one or more background visual components replaced with one or more replacement background visual components at 1516 (e.g. providing payment based on receiving a customized content having sounds and images of a lion roaring replaced with replacement sounds and images of an elephant trumpeting, or having sounds and video of an avalanche replaced with replacement sounds and video of an erupting volcano, etc.).

It will be appreciated that systems and methods in accordance with the present disclosure may be utilized to adjust content to accommodate cultural differences. In some implementations, content that is categorized as being culturally inappropriate (e.g. vulgar, offensive, racist, derogatory, degrading, stereotypical, distasteful, etc.) may be either omitted (or deleted or removed), or may be replaced with alternate content that is categorized as being culturally appropriate, such as by retrieving replacement content from a library of lookup tables, or any other suitable source. For example, as shown in FIG. 16, in some implementations, receiving a dynamically customized audio-visual content including an audio-visual core portion having at least one revised content portion customized in accordance with the at least one selection signal at 630 may include receiving a dynamically customized audio-visual content including an audio-visual core portion having a culturally inappropriate portion at least one of replaced with a culturally appropriate portion, or omitted at 1602 (e.g. receiving a customized content having terminology that may be considered a racial slur in a particular culture replaced with replacement terminology that is not considered a racial slur in the particular culture, or having a content portion that includes a hand gesture that is insulting to a particular culture omitted; etc.).

In other implementations, providing at least one selection signal indicative of a viewer preference at 620 may include providing a selection signal indicative of a cultural heritage of at least one viewer at 1604, and receiving a dynamically customized audio-visual content including an audio-visual core portion having at least one revised content portion customized in accordance with the at least one selection signal at 630 may include receiving a dynamically customized audio-visual content including an audio-visual core portion having a portion considered inappropriate with respect to the cultural heritage of the at least one viewer at least one of replaced with a replacement portion considered appropriate with respect to the cultural heritage of the at least one viewer, or omitted at 1606 (e.g. providing a signal indicating that a viewer is Chinese, and receiving a customized content having a reference to "Taiwan" replaced with a reference to "Chinese Taipei;" providing an indication that a viewer is Islamic, and receiving a customized content having a reference to the Bible replaced with a reference to the Quran; etc.).

Figure 16:
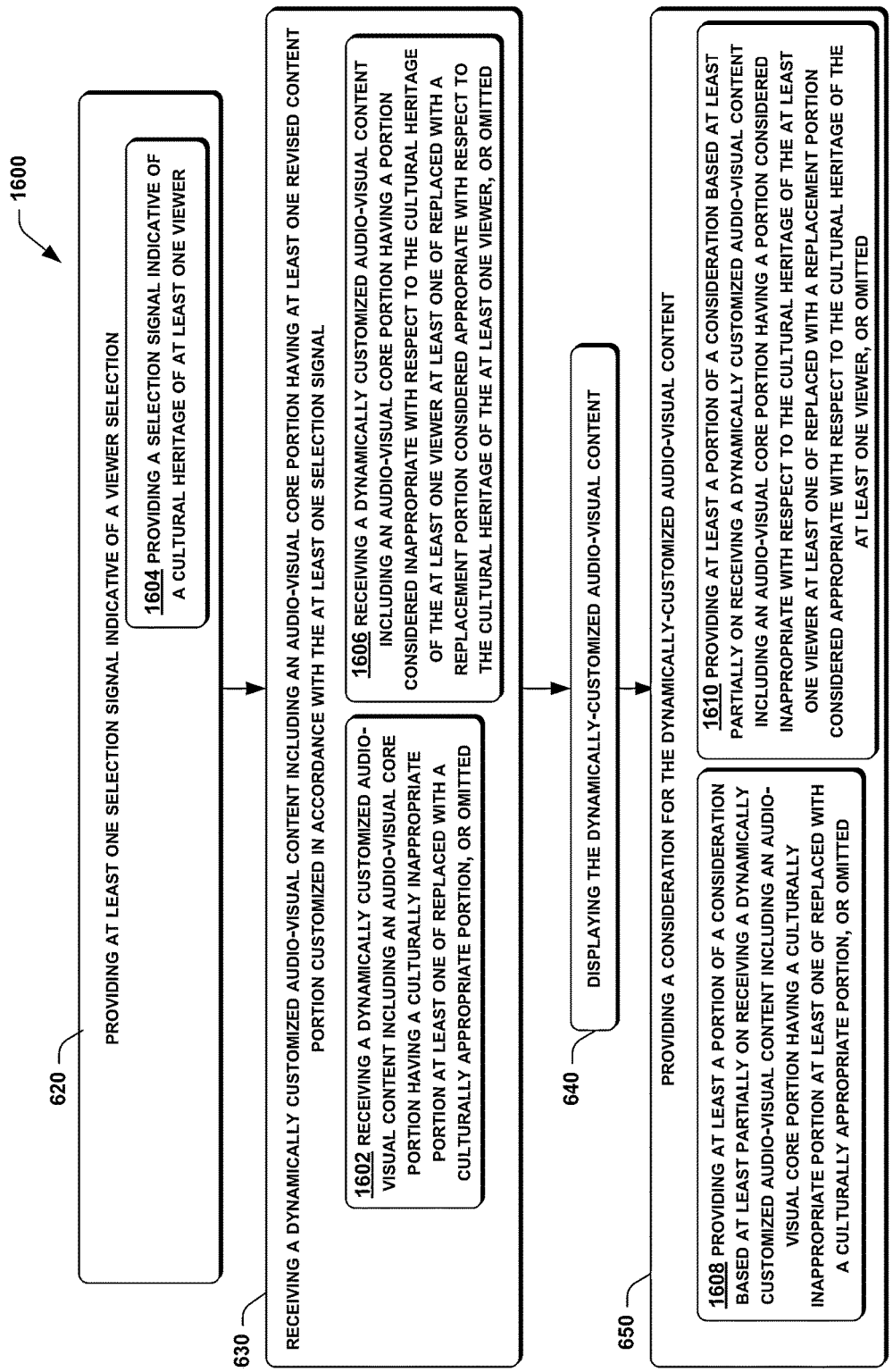

With continued reference to FIG. 16, in other implementations, providing a consideration for the dynamically-customized audio-visual content at 650 may include providing at least a portion of a consideration based at least partially on receiving a dynamically customized audio-visual content including an audio-visual core portion having a culturally inappropriate portion at least one of replaced with a culturally appropriate portion, or omitted at 1608 (e.g. providing payment based on receiving a customized content having a terminology that may be considered in poor taste in Iceland replaced with replacement terminology that is not considered in poor taste, etc.).

In other implementations, providing a consideration for the dynamically-customized audio-visual content at 650 may include providing at least a portion of a consideration based at least partially on at least one of receiving a dynamically customized audio-visual content including an audio-visual core portion having a portion considered inappropriate with respect to the cultural heritage of the at least one viewer at least one of replaced with a replacement portion considered appropriate with respect to the cultural heritage of the at least one viewer, or omitted at 1610 (e.g. providing payment based on receiving a customized content having a reference to "Taiwan" replaced with a reference to "Chinese Taipei;" providing payment based on receiving a customized content having a reference to the Bible replaced with a reference to the Quran; etc.).

Figure 17:
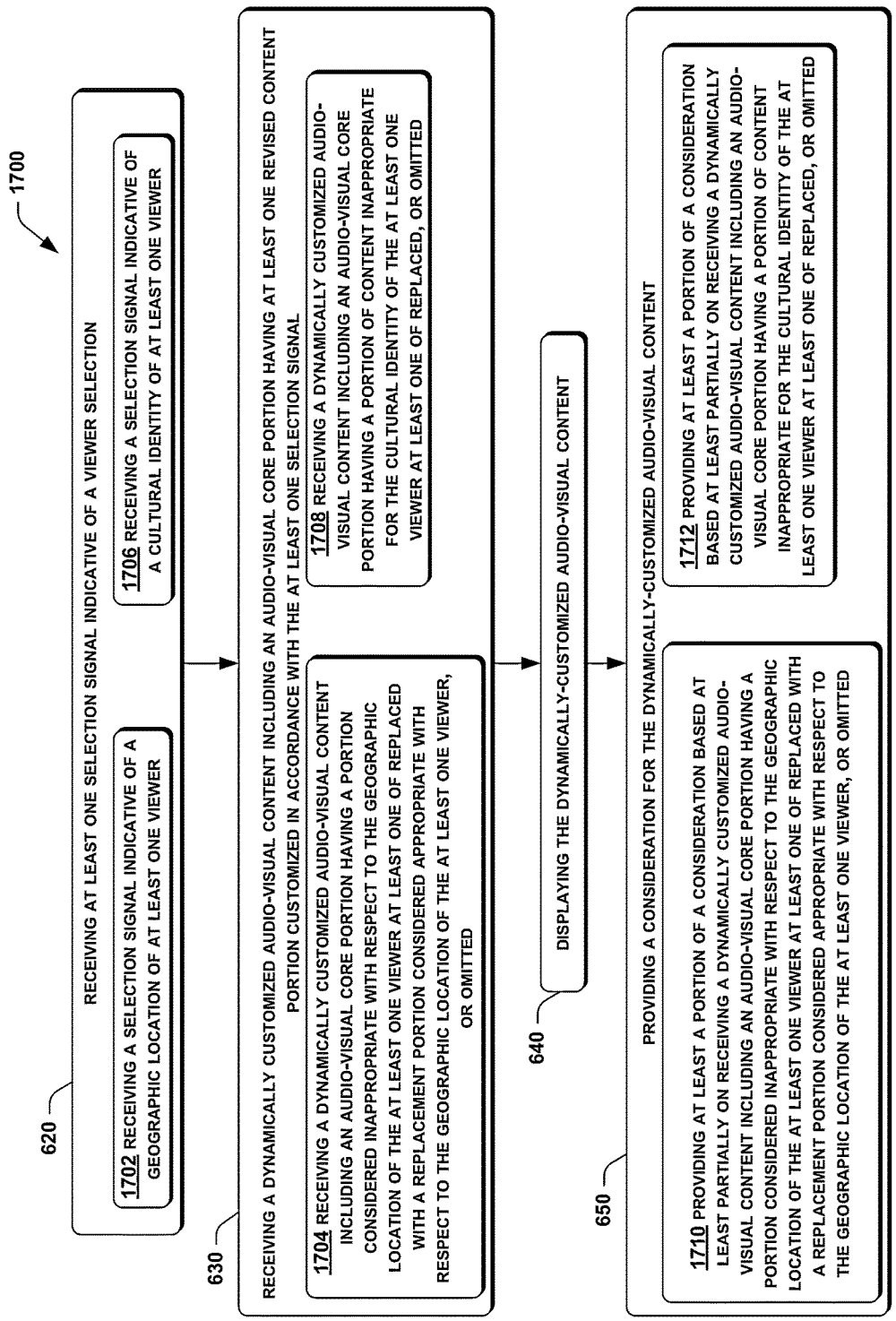

As shown in FIG. 17, in further implementations, providing at least one selection signal indicative of a viewer preference at 620 may include providing a selection signal indicative of a geographic location of at least one viewer at 1702, and receiving a dynamically customized audio-visual content including an audio-visual core portion having at least one revised content portion customized in accordance with the at least one selection signal at 630 may include receiving a dynamically customized audio-visual content including an audio-visual core portion having a portion considered inappropriate with respect to the geographic location of the at least one viewer at least one of replaced with a replacement portion considered appropriate with respect to the geographic location of the at least one viewer, or omitted at 1704 (e.g. providing a signal, such as a GPS signal from a viewer's cell phone, indicating that the viewer is located in Brazil, and receiving a customized content having a hand gesture that is offensive in Brazil, such as a Texas Longhorns "hook-em-horns" hand gesture, replaced with a benign hand gesture appropriate for the viewer located in Brazil; providing a signal, such as a location of an IP address of a local Internet service provider, that indicates that a viewer is located within a Native American reservation, and receiving a customized content having terminology offensive to Native Americans replaced with replacement content that includes non-offensive terminology; etc.).

And in other implementations, providing at least one selection signal indicative of a viewer preference at 620 may include providing a selection signal indicative of a cultural identity of at least one viewer at 1706, and receiving a dynamically customized audio-visual content including an audio-visual core portion having at least one revised content portion customized in accordance with the at least one selection signal at 630 may include receiving a dynamically customized audio-visual content including an audio-visual core portion having a portion of content inappropriate for the cultural identity of the at least one viewer at least one of replace with an appropriate portion of content, or omitted at 1708 (e.g. providing a signal, such as a language selection of a software installed on a viewer's electronic device, indicating that the viewer is Arabic, and receiving a customized content having a content portion that is inappropriate to the Arabic culture replaced or omitted; etc.).

With continued reference to FIG. 17, in some implementations, providing a consideration for the dynamically-customized audio-visual content at 650 may include providing at least a portion of a consideration based at least partially on receiving a dynamically customized audio-visual content including an audio-visual core portion having a portion considered inappropriate with respect to the geographic location of the at least one viewer at least one of replaced with a replacement portion considered appropriate with respect to the geographic location of the at least one viewer, or omitted at 1710 (e.g. providing payment based on receiving a customized content having a content portion that includes a hand gesture that is offensive in a viewer's location replaced with a benign hand gesture appropriate for the viewer's location, or omitted; etc.).

And in other implementations, providing a consideration for the dynamically-customized audio-visual content at 650 may include providing at least a portion of a consideration based at least partially on at least one of receiving a dynamically customized audio-visual content including an audio-visual core portion having a portion of content inappropriate for the cultural identity of the at least one viewer at least one of replace with an appropriate portion of content, or omitted at 1712 (e.g. based on a signal, such as a language selection of a software installed on a viewer's electronic device, indicating that the viewer is Arabic, and providing payment based at least partially on receiving a content that is customized to be more appropriate to the Arabic culture; etc.).

Figure 18:
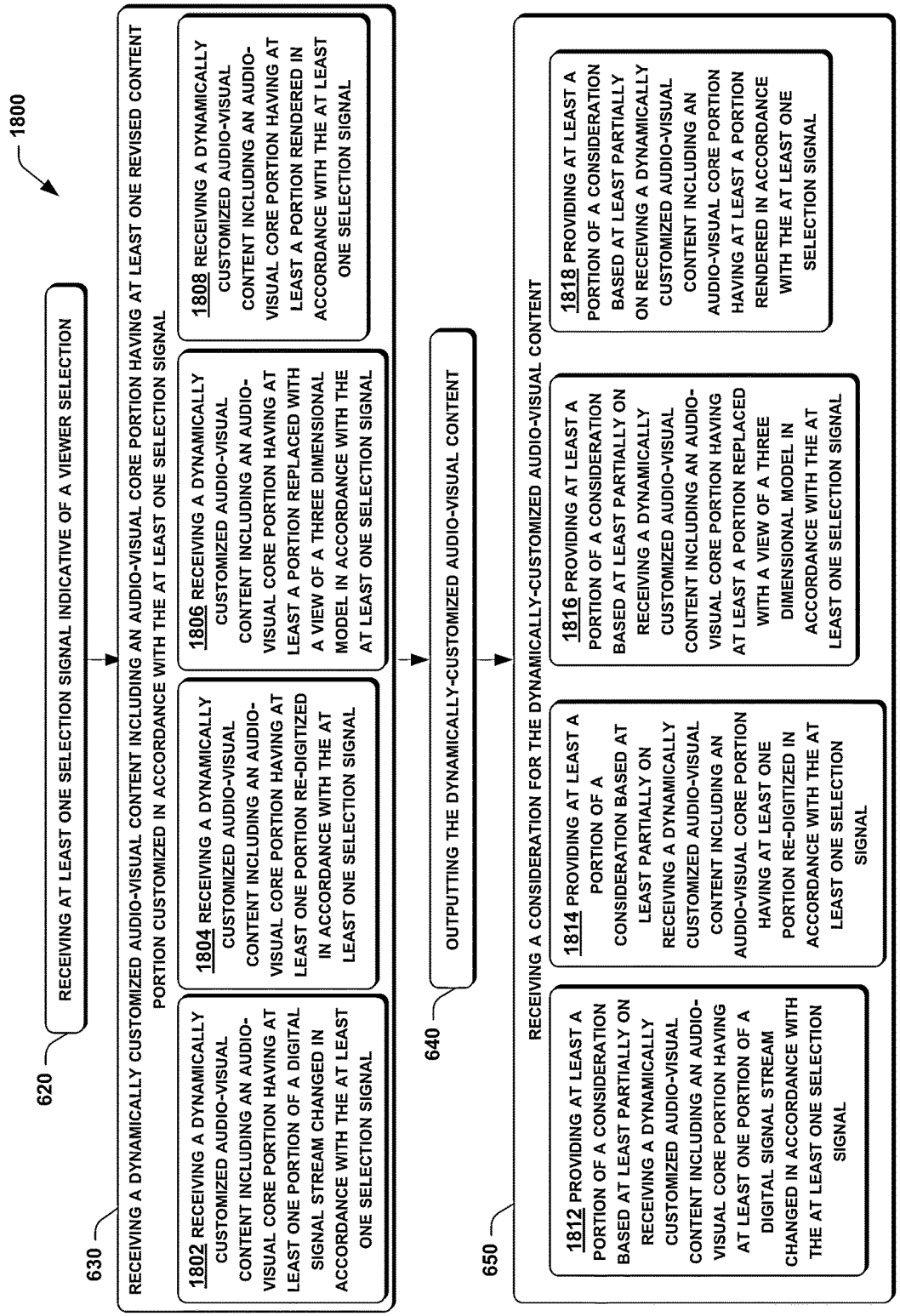

It will be appreciated that receiving a dynamically customized audio-visual content including an audio-visual core portion having at least one revised content portion customized in accordance with the at least one selection signal at 630 may be accomplished in various ways. For example, as shown in FIG. 18, in some implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one portion of a digital signal stream changed in accordance with the at least one selection signal (e.g. receiving a customized content having original digitized signals of the audio-visual core portion replaced with replacement digitized signals of the audio-visual core portion, or having original digitized signals of the audio-visual core portion supplemented with supplemental digitized signals, etc.) at 1802. In other implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one portion re-digitized in accordance with the at least one selection signal at 1804.

In further implementations, receiving a dynamically customized audio-visual content including an audio-visual core portion having at least one revised content portion customized in accordance with the at least one selection signal at 630 may include receiving a dynamically customized audio-visual content including an audio-visual core portion having at least a portion replaced with a view of a three dimensional model in accordance with the at least one selection signal at 1806. Thus, if the one or more selection signals 144 indicates that the user prefers to see a dynamically-customized movie (e.g. the movie Cleopatra) with a desired lead actress (or actor) (e.g. Angelina Joli) rather than an original lead actress (or actor) (e.g. Elizabeth Taylor), the processing component 110 may retrieve a digital model of the desired lead actress (or actor) and may substitute appropriate portions of the incoming core portion 102 with appropriate views of the digital model of the desired lead actress (or actor). In still further implementations, receiving a dynamically customized audio-visual content including an audio-visual core portion having at least one revised content portion customized in accordance with the at least one selection signal at 630 may include receiving a dynamically customized audio-visual content including an audio-visual core portion having at least a portion rendered in accordance with the at least one selection signal at 1808.

With continued reference to FIG. 18, in some implementations, providing a consideration for the dynamically-customized audio-visual content at 650 may include providing at least a portion of a consideration based at least partially on receiving a dynamically customized audio-visual content including an audio-visual core portion having at least one portion of a digital signal stream changed in accordance with the at least one selection signal at 1812 (e.g. providing a payment portion based on receiving a customized content having digitized signals replaced with replacement digitized signals, etc.). In other implementations, providing a consideration for the dynamically-customized audio-visual content at 650 may include providing at least a portion of a consideration based at least partially on receiving a dynamically customized audio-visual content including an audio-visual core portion having at least one portion re-digitized in accordance with the at least one selection signal at 1814.

In further implementations, providing a consideration for the dynamically-customized audio-visual content at 650 may include providing at least a portion of a consideration based at least partially on receiving a dynamically customized audio-visual content including an audio-visual core portion having at least a portion replaced with a view of a three dimensional model in accordance with the at least one selection signal at 1816. (e.g. providing payment based on receiving a customized content having a first actor replaced with a 3D model of a replacement actor). In still further implementations, providing a consideration for the dynamically-customized audio-visual content at 650 may include providing at least a portion of a consideration based at least partially on receiving a dynamically customized audio-visual content including an audio-visual core portion having at least a portion rendered in accordance with the at least one selection signal at 1818.

Figure 19:
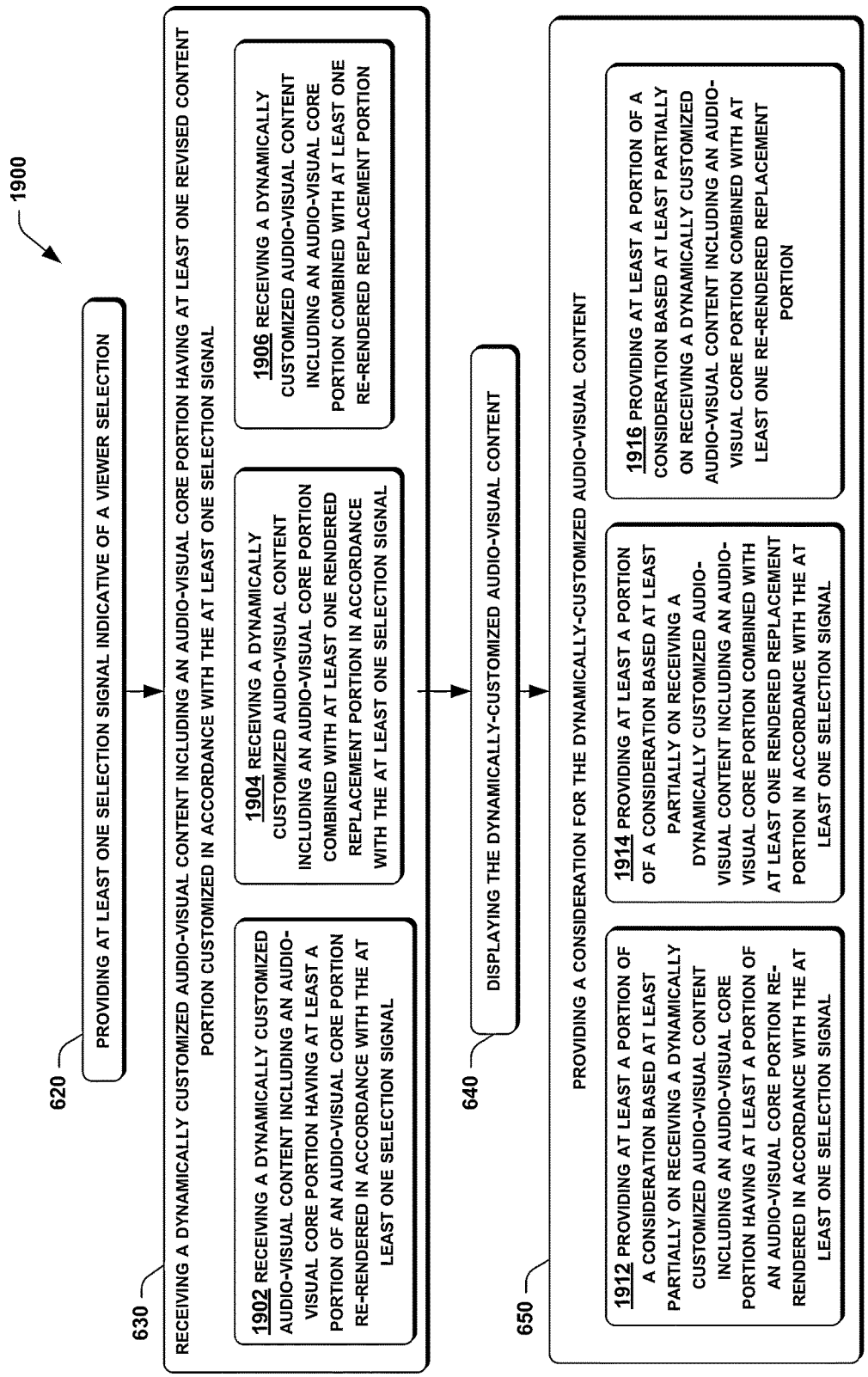

As shown in FIG. 19, in other implementations, receiving a dynamically customized audio-visual content including an audio-visual core portion having at least one revised content portion customized in accordance with the at least one selection signal at 630 may include receiving a dynamically customized audio-visual content including an audio-visual core portion having at least a portion of an audio-visual core portion re-rendered in accordance with the at least one selection signal at 1902. In additional implementations, receiving a dynamically customized audio-visual content including an audio-visual core portion having at least one revised content portion customized in accordance with the at least one selection signal at 630 may include receiving a dynamically customized audio-visual content including an audio-visual core portion combined with at least one rendered replacement portion in accordance with the at least one-selection signal at 1904. In further implementations, receiving a dynamically customized audio-visual content including an audio-visual core portion having at least one revised content portion customized in accordance with the at least one selection signal at 630 may include receiving a dynamically customized audio-visual content including an audio-visual core portion combined with at least one re-rendered replacement portion at 1906.

With continued reference to FIG. 19, in still other implementations, providing a consideration for the dynamically-customized audio-visual content at 650 may include providing at least a portion of a consideration based at least partially on receiving a dynamically customized audio-visual content including an audio-visual core portion having at least a portion of an audio-visual core portion re-rendered in accordance with the at least one selection signal at 1912. In additional implementations, providing a consideration for the dynamically-customized audio-visual content at 650 may include providing at least a portion of a consideration based at least partially on receiving a dynamically customized audio-visual content including an audio-visual core portion combined with at least one rendered replacement portion in accordance with the at least one-selection signal at 1914. In further implementations, providing a consideration for the dynamically-customized audio-visual content at 650 may include providing at least a portion of a consideration based at least partially on receiving a dynamically customized audio-visual content including an audio-visual core portion combined with at least one re-rendered replacement portion at 1916.

Figure 20:
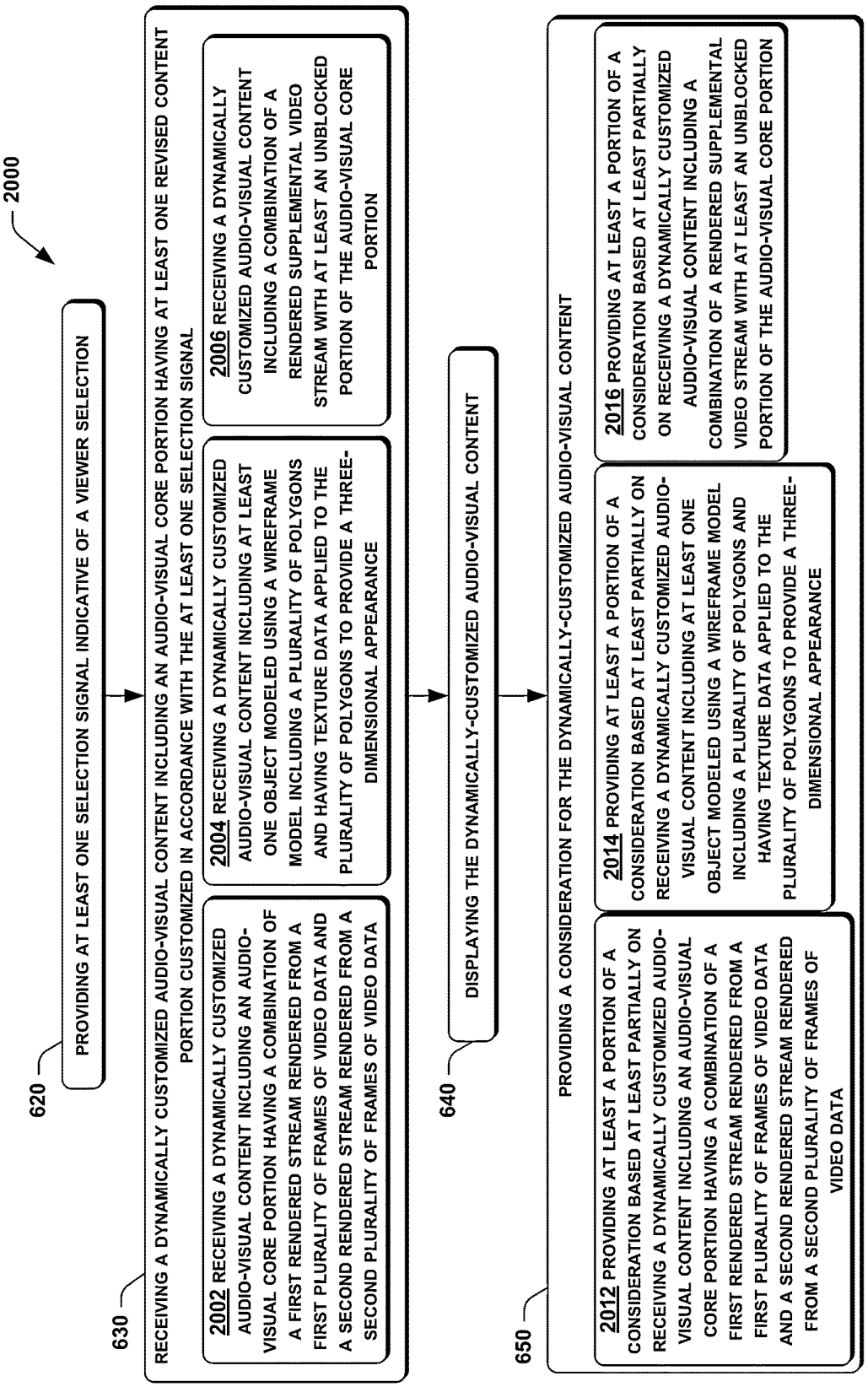

With reference to FIG. 20, in some implementations, receiving a dynamically customized audio-visual content including an audio-visual core portion having at least one revised content portion customized in accordance with the at least one selection signal at 630 may include receiving a dynamically customized audio-visual content including an audio-visual core portion having a combination of a first rendered stream rendered from a first plurality of frames of video data and a second rendered stream rendered from a second plurality of frames of video data (e.g. multiplexing the first and second rendered streams) at 2002. In at least some implementations, the operations at 2002 may include, for example, one or more techniques disclosed in U.S. Pat. No. 8,059,201 issued to Aarts et al. (disclosing techniques for real-time and non-real-time rendering of video data streams), which patent is incorporated herein by reference.

In other implementations, receiving a dynamically customized audio-visual content including an audio-visual core portion having at least one revised content portion customized in accordance with the at least one selection signal at 630 may include receiving a dynamically customized audio-visual content including at least one object modeled using a wireframe model including a plurality of polygons and having texture data applied to the plurality of polygons to provide a three-dimensional appearance at 2004. In at least some implementations, the operations at 2004 may include, for example, one or more techniques disclosed in U.S. Pat. No. 8,016,653 issued to Pendleton et al. (disclosing techniques for three dimensional rendering of live events), which patent is incorporated herein by reference.

In still other implementations, receiving a dynamically customized audio-visual content including an audio-visual core portion having at least one revised content portion customized in accordance with the at least one selection signal at 630 may include receiving a dynamically customized audio-visual content including a combination of a rendered supplemental video stream with at least an unblocked portion of the audio-visual core portion at 2006. In at least some implementations, the operations at 2006 may include, for example, one or more techniques disclosed in U.S. Pat. Nos. 7,945,926 and 7,631,327 issued to Dempski et al. (disclosing techniques for video animation and merging with television broadcasts and supplemental content sources), which patents are incorporated herein by reference.

With continued reference to FIG. 20, in some implementations, providing a consideration for the dynamically-customized audio-visual content at 650 may include providing at least a portion of a consideration based at least partially on receiving a dynamically customized audio-visual content including an audio-visual core portion having a combination of a first rendered stream rendered from a first plurality of frames of video data and a second rendered stream rendered from a second plurality of frames of video data at 2012 (e.g. receiving a payment based on multiplexing first and second rendered streams).

In other implementations, providing a consideration for the dynamically-customized audio-visual content at 650 may include providing at least a portion of a consideration based at least partially on receiving a dynamically customized audio-visual content including at least one object modeled using a wireframe model including a plurality of polygons and having texture data applied to the plurality of polygons to provide a three-dimensional appearance at 2014. In still other implementations, providing a consideration for the dynamically-customized audio-visual content at 650 may include receiving at least a portion of a consideration based at least partially on receiving a dynamically customized audio-visual content including a combination of a rendered supplemental video stream with at least an unblocked portion of the audio-visual core portion at 2016.

Figure 21:
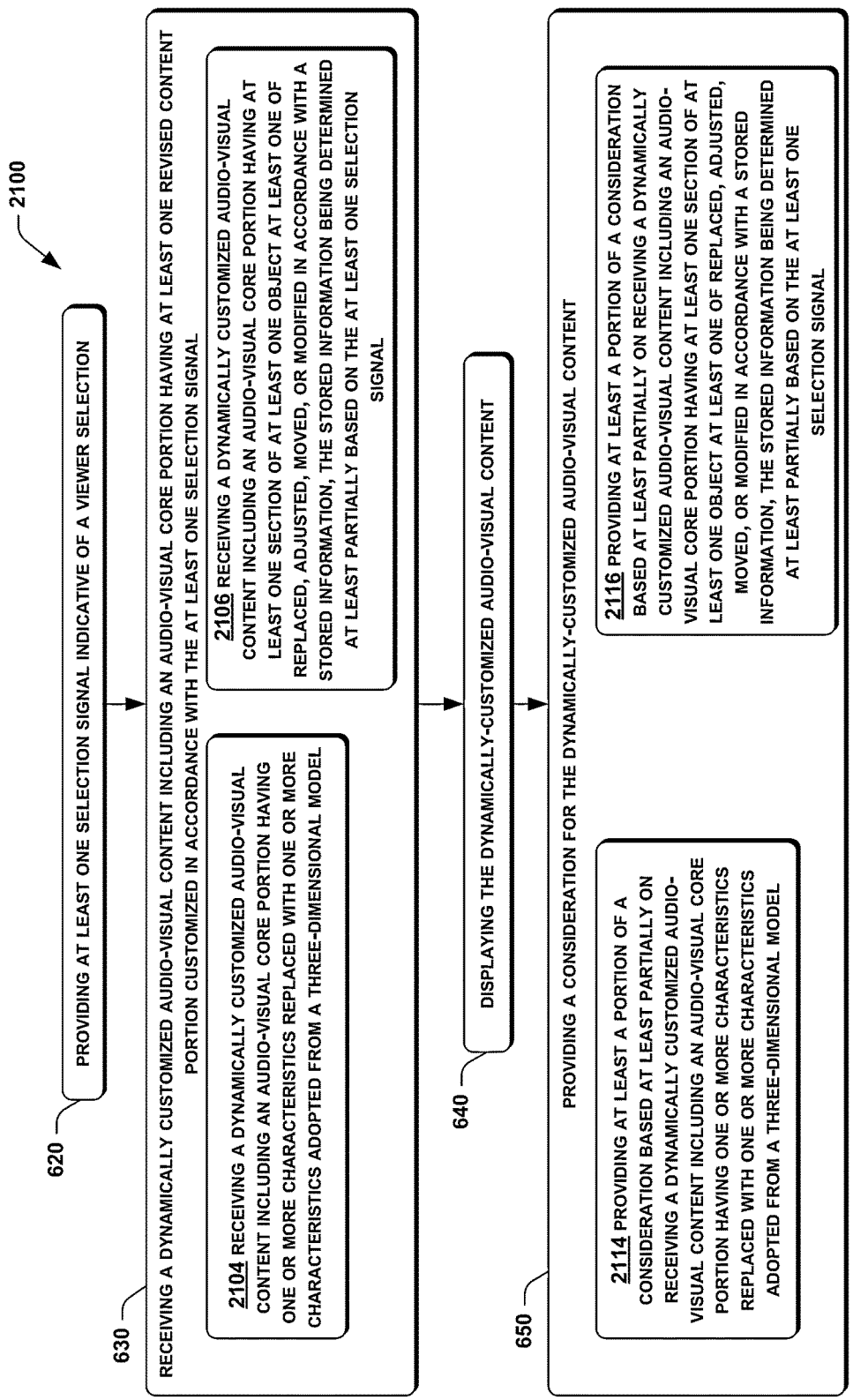

As shown in FIG. 21, in other implementations, receiving a dynamically customized audio-visual content including an audio-visual core portion having at least one revised content portion customized in accordance with the at least one selection signal at 630 may include receiving a dynamically customized audio-visual content including an audio-visual core portion having one or more characteristics replaced with one or more characteristics adopted from a three-dimensional model at 2104. For example, the "providing" operations at 2104 may, in at least some implementations, be accomplished by a dynamic customization system (e.g. system 160 of FIG. 1), and may include executing one or more instructions that create a three-dimensional (3D) model, or may involve operations similar to those commonly referred to as "drag and drop" in commercially-available software (e.g. Microsoft Visio, etc.) to select pre-formed objects from a series of graphical menus, databases, or other suitable storage structures, and may also include a capability for alteration, modification, or individualization by a viewer. In particular implementations, the "adopting" operations at 2104 may include one or more of reusing operations, copying operations, grafting operations, re-skinning operations, illuminating operations, or any other suitable operations. In at least some implementations, the operations at 2104 may include, for example, one or more techniques disclosed in U.S. Pat. No. 7,109,993 and U.S. Patent Publication No. 20070165022 by Peleg et al. (disclosing generating a head model and modifying portions of facial features), which patent and pending application are incorporated herein by reference.

In additional implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one section of at least one object at least one of replaced, adjusted, moved, or modified in accordance with a stored information, the stored information being determined at least partially based on the at least one selection signal at 2106. In at least some implementations, the operations at 2106 may include, for example, one or more techniques disclosed in U.S. Pat. No. 6,054,999 issued to Strandberg (disclosing producing graphic movement sequences from recordings of measured data from strategic parts of actors), which patent is incorporated herein by reference.

With continued reference to FIG. 21, in still other implementations, providing a consideration for the dynamically-customized audio-visual content at 650 may include receiving at least a portion of a consideration based at least partially on receiving a dynamically customized audio-visual content including an audio-visual core portion having one or more characteristics replaced with one or more characteristics adopted from a three-dimensional model at 2114. In additional implementations, providing a consideration for the dynamically-customized audio-visual content at 650 may include receiving at least a portion of a consideration based at least partially on receiving a dynamically customized audio-visual content including an audio-visual core portion having at least one section of at least one object at least one of replaced, adjusted, moved, or modified in accordance with a stored information, the stored information being determined at least partially based on the at least one selection signal at 2116.

Figure 22:
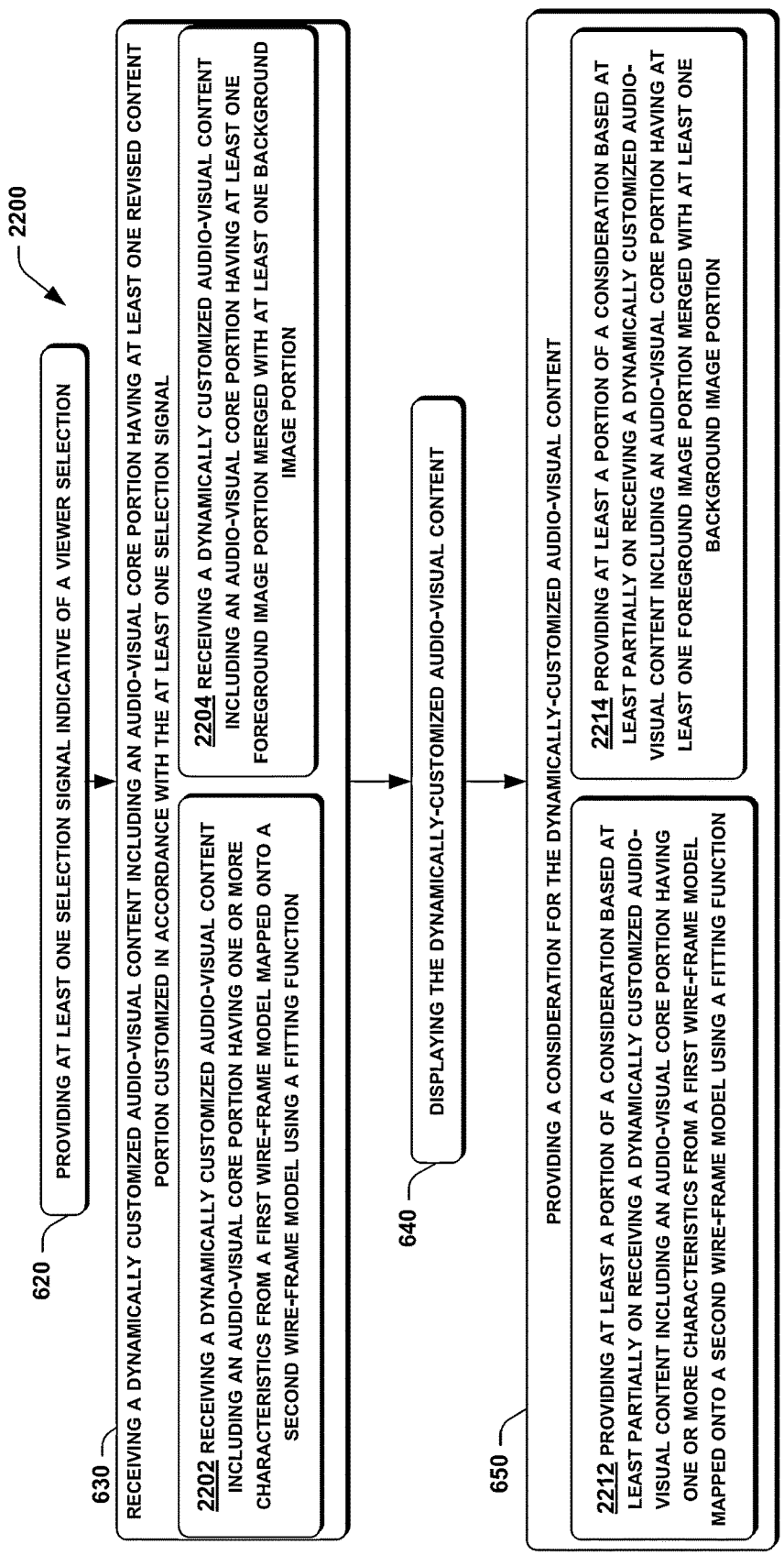

As shown in FIG. 22, in other implementations, receiving a dynamically customized audio-visual content including an audio-visual core portion having at least one revised content portion customized in accordance with the at least one selection signal at 630 may include receiving a dynamically customized audio-visual content including an audio-visual core portion having one or more characteristics from a first wire-frame model mapped onto a second wire-frame model using a fitting function at 2202. In at least some implementations, the operations at 2202 may include, for example, one or more techniques disclosed in U.S. Pat. No. 5,926,575 issued to Ohzeki et al. (disclosing techniques for image deformation or distortion based on correspondence to a reference image, wire-frame modeling of images and texture mapping), which patent is incorporated herein by reference.

In still other implementations, receiving a dynamically customized audio-visual content including an audio-visual core portion having at least one revised content portion customized in accordance with the at least one selection signal at 630 may include receiving a dynamically customized audio-visual content including an audio-visual core portion having at least one foreground image portion merged with the at least one background image portion at 2204. In at least some implementations, the operations at 2204 may include, for example, one or more techniques disclosed in U.S. Pat. No. 5,623,587 issued to Bulman (disclosing techniques for creation of composite electronic images from multiple individual images), which patent is incorporated herein by reference.

With continued reference to FIG. 22, in still other implementations, providing a consideration for the dynamically-customized audio-visual content at 650 may include providing at least a portion of a consideration based at least partially on receiving a dynamically customized audio-visual content including an audio-visual core portion having one or more characteristics from a first wire-frame model mapped onto a second wire-frame model using a fitting function at 2212. In still other implementations, providing a consideration for the dynamically-customized audio-visual content at 650 may include providing at least a portion of a consideration based at least partially on receiving a dynamically customized audio-visual content including an audio-visual core portion having at least one foreground image portion merged with the at least one background image portion at 2214.

Figure 23:
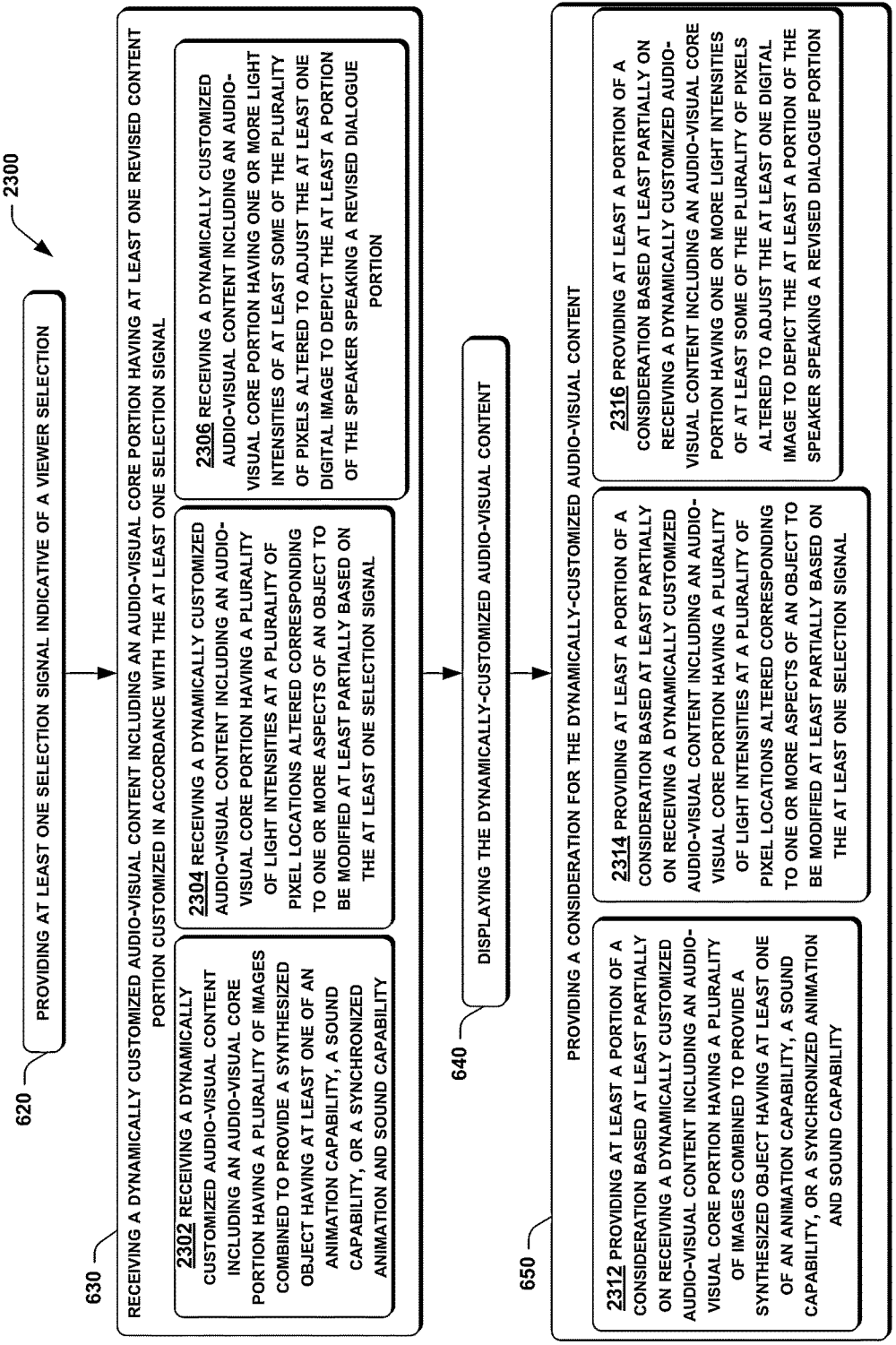

As shown in FIG. 23, in further implementations, receiving a dynamically customized audio-visual content including an audio-visual core portion having at least one revised content portion customized in accordance with the at least one selection signal at 630 may include receiving a dynamically customized audio-visual content including an audio-visual core portion having a plurality of images combined to provide a synthesized object having at least one of an animation capability, a sound capability, or a synchronized animation and sound capability at 2302. In at least some implementations, the operations at 2302 may include, for example, one or more techniques disclosed in U.S. Pat. No. 5,111,409 issued to Gasper et al. (disclosing techniques for synchronization of synthesized actors), and U.S. Pat. Nos. 4,884,972 and 4,884,972 issued to Gasper (disclosing techniques for synchronization of animated objects), which patents are incorporated herein by reference.

In other implementations, receiving a dynamically customized audio-visual content including an audio-visual core portion having at least one revised content portion customized in accordance with the at least one selection signal at 630 may include receiving a dynamically customized audio-visual content including an audio-visual core portion having a plurality of light intensities at a plurality of pixel locations altered corresponding to one or more aspects of an object to be modified at least partially based on the at least one selection signal at 2304. In further implementations, receiving a dynamically customized audio-visual content including an audio-visual core portion having at least one revised content portion customized in accordance with the at least one selection signal at 630 may include receiving a dynamically customized audio-visual content including an audio-visual core portion having one or more light intensities of at least some of the plurality of pixels altered to adjust the at least one digital image to depict the at least a portion of the speaker speaking a revised dialogue portion at 2306. In at least some implementations, the operations at 2304 and 2306 may include, for example, one or more techniques disclosed in U.S. Pat. Nos. 4,827,532 and 4,600,281 and 4,260,229 issued to Bloomstein (disclosing techniques for substitution of sound track language and corresponding lip movements), which patents are incorporated herein by reference.

With continued reference to FIG. 23, in further implementations, providing a consideration for the dynamically-customized audio-visual content at 650 may include providing at least a portion of a consideration based at least partially on receiving a dynamically customized audio-visual content including an audio-visual core portion having a plurality of images combined to provide a synthesized object having at least one of an animation capability, a sound capability, or a synchronized animation and sound capability at 2312. In other implementations, providing a consideration for the dynamically-customized audio-visual content at 650 may include providing at least a portion of a consideration based at least partially on receiving a dynamically customized audio-visual content including an audio-visual core portion having a plurality of light intensities at a plurality of pixel locations altered corresponding to one or more aspects of an object to be modified at least partially based on the at least one selection signal at 2314. In further implementations, providing a consideration for the dynamically-customized audio-visual content at 650 may include providing at least a portion of a consideration based at least partially on receiving a dynamically customized audio-visual content including an audio-visual core portion having one or more light intensities of at least some of the plurality of pixels altered to adjust the at least one digital image to depict the at least a portion of the speaker speaking a revised dialogue portion at 2316.

Figure 24:
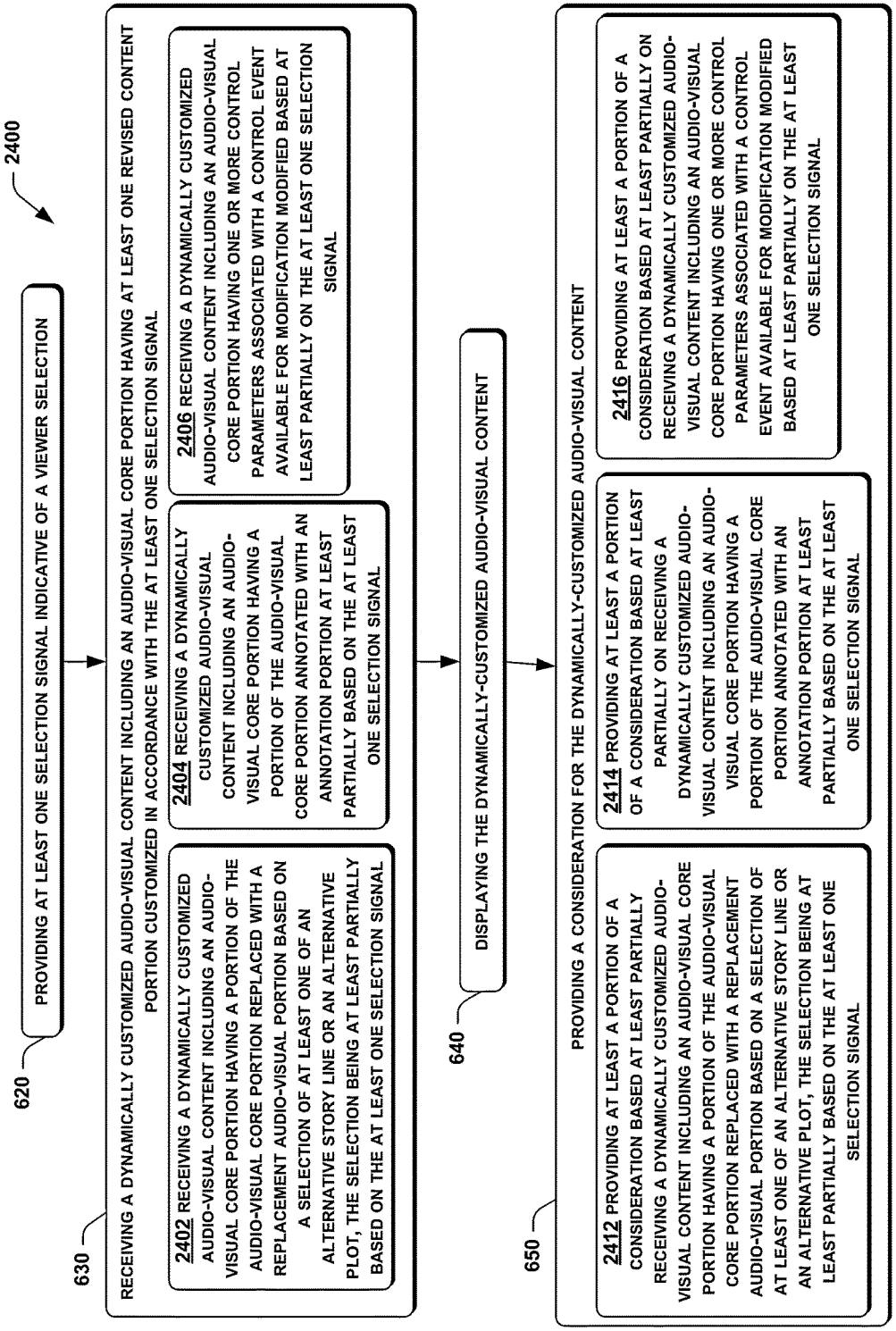

As shown in FIG. 24, in further implementations, receiving a dynamically customized audio-visual content including an audio-visual core portion having at least one revised content portion customized in accordance with the at least one selection signal at 630 may include receiving a dynamically customized audio-visual content including an audio-visual core portion having a portion of the audio-visual core portion replaced with a replacement audio-visual portion based on a selection of at least one of an alternative story line or an alternative plot, the selection being at least partially based on the at least one selection signal at 2402. In at least some implementations, the operations at 2402 may include, for example, one or more techniques disclosed in U.S. Pat. No. 4,569,026 issued to Best (disclosing techniques for interactive entertainment systems), which patent is incorporated herein by reference.

In still further implementations, receiving a dynamically customized audio-visual content including an audio-visual core portion having at least one revised content portion customized in accordance with the at least one selection signal at 630 may include receiving a dynamically customized audio-visual content including an audio-visual core portion having a portion of the audio-visual core portion annotated with an annotation portion at least partially based on the at least one selection signal at 2404. In at least some implementations, the operations at 2404 may include, for example, one or more techniques disclosed in U.S. Patent Publication No. 20040181592 by Samra et al. (disclosing techniques for annotating and versioning digital media), which pending patent application is incorporated herein by reference.

In yet other implementations, receiving a dynamically customized audio-visual content including an audio-visual core portion having at least one revised content portion customized in accordance with the at least one selection signal at 630 may include receiving a dynamically customized audio-visual content including an audio-visual core portion having one or more control parameters associated with a control event available for modification modified based at least partially on the at least one selection signal at 2406. In at least some implementations, the operations at 2406 may include, for example, one or more techniques disclosed in U.S. Patent Publication No. 20110029099 by Benson (disclosing techniques for providing audio visual content), which pending patent application is incorporated herein by reference.

With continued reference to FIG. 24, in other implementations, providing a consideration for the dynamically-customized audio-visual content at 650 may include providing at least a portion of a consideration based at least partially on receiving a dynamically customized audio-visual content including an audio-visual core portion having a portion of the audio-visual core portion replaced with a replacement audio-visual portion based on a selection of at least one of an alternative story line or an alternative plot, the selection being at least partially based on the at least one selection signal at 2412. In still further implementations, providing a consideration for the dynamically-customized audio-visual content at 650 may include providing at least a portion of a consideration based at least partially on receiving a dynamically customized audio-visual content including an audio-visual core portion having a portion of the audio-visual core portion annotated with an annotation portion at least partially based on the at least one selection signal at 2414. In yet other implementations, providing a consideration for the dynamically-customized audio-visual content at 650 may include providing at least a portion of a consideration based at least partially on receiving a dynamically customized audio portion and not a visual portion at 2416.

Figure 25:
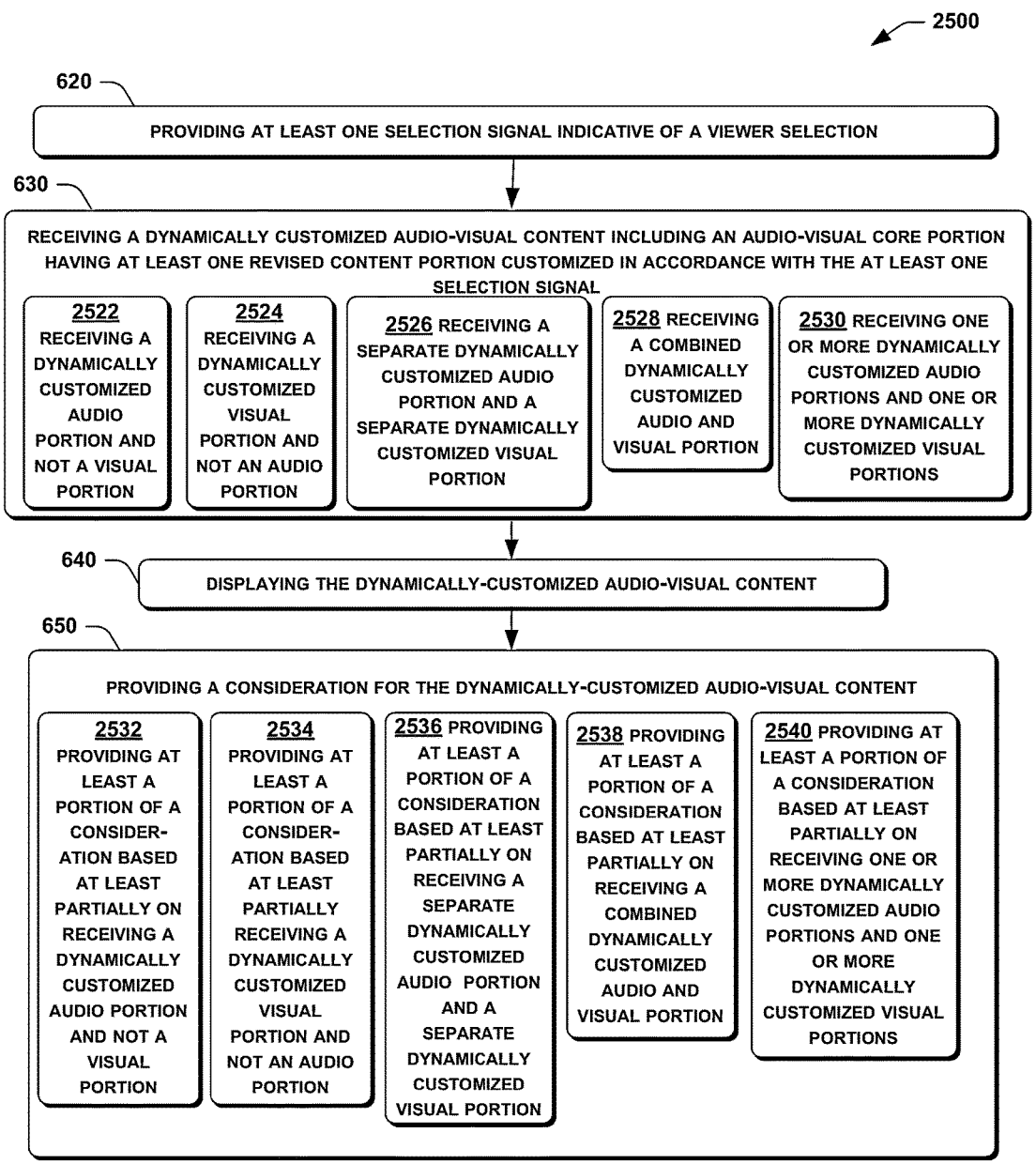

As shown in FIG. 25, receiving a dynamically customized audio-visual content including an audio-visual core portion having at least one revised content portion customized in accordance with the at least one selection signal at 630 may involve a variety of different ways and aspects. For example, in some implementations, receiving a dynamically customized audio-visual content including an audio-visual core portion having at least one revised content portion customized in accordance with the at least one selection signal at 630 may include receiving a dynamically customized audio portion and not a visual portion at 2522. In other implementations, receiving a dynamically customized audio-visual content including an audio-visual core portion having at least one revised content portion customized in accordance with the at least one selection signal at 630 may include receiving a dynamically customized visual portion and not an audio portion at 2524. In still other implementations, receiving a dynamically customized audio-visual content including an audio-visual core portion having at least one revised content portion customized in accordance with the at least one selection signal at 630 may include receiving a separate dynamically customized audio portion and a separate dynamically customized visual portion at 2526. In further implementations, receiving a dynamically customized audio-visual content including an audio-visual core portion having at least one revised content portion customized in accordance with the at least one selection signal at 630 may include receiving a combined dynamically customized audio and visual portion at 2528. In additional implementations, receiving a dynamically customized audio-visual content including an audio-visual core portion having at least one revised content portion customized in accordance with the at least one selection signal at 630 may include receiving one or more dynamically customized audio portions and one or more dynamically customized visual portions at 2510 (e.g. receiving a plurality of audio portions and a single video portion, receiving a single audio portion and a plurality of video portions, etc.).

With continued reference to FIG. 25, in some implementations, providing a consideration for the dynamically-customized audio-visual content at 650 may include providing at least a portion of a consideration based at least partially on receiving a dynamically customized audio portion and not a visual portion at 2532. In other implementations, providing a consideration for the dynamically-customized audio-visual content at 650 may include providing at least a portion of a consideration based at least partially on receiving a dynamically customized visual portion and not an audio portion at 2534. In still other implementations, providing a consideration for the dynamically-customized audio-visual content at 650 may include providing at least a portion of a consideration based at least partially on receiving a separate dynamically customized audio portion and a separate dynamically customized visual portion at 2536. In further implementations, providing a consideration for the dynamically-customized audio-visual content at 650 may include providing at least a portion of a consideration based at least partially on receiving a combined dynamically customized audio and visual portion at 2538. In additional implementations, providing a consideration for the dynamically-customized audio-visual content at 650 may include providing at least a portion of a consideration based at least partially on receiving one or more dynamically customized audio portions and one or more dynamically customized visual portions at 2530 (e.g. providing payment for receiving a customized content having a plurality of customized audio portions and a single video portion, providing payment for receiving a customized content having a single audio portion and a plurality of customized video portions, etc.).

Figure 26:
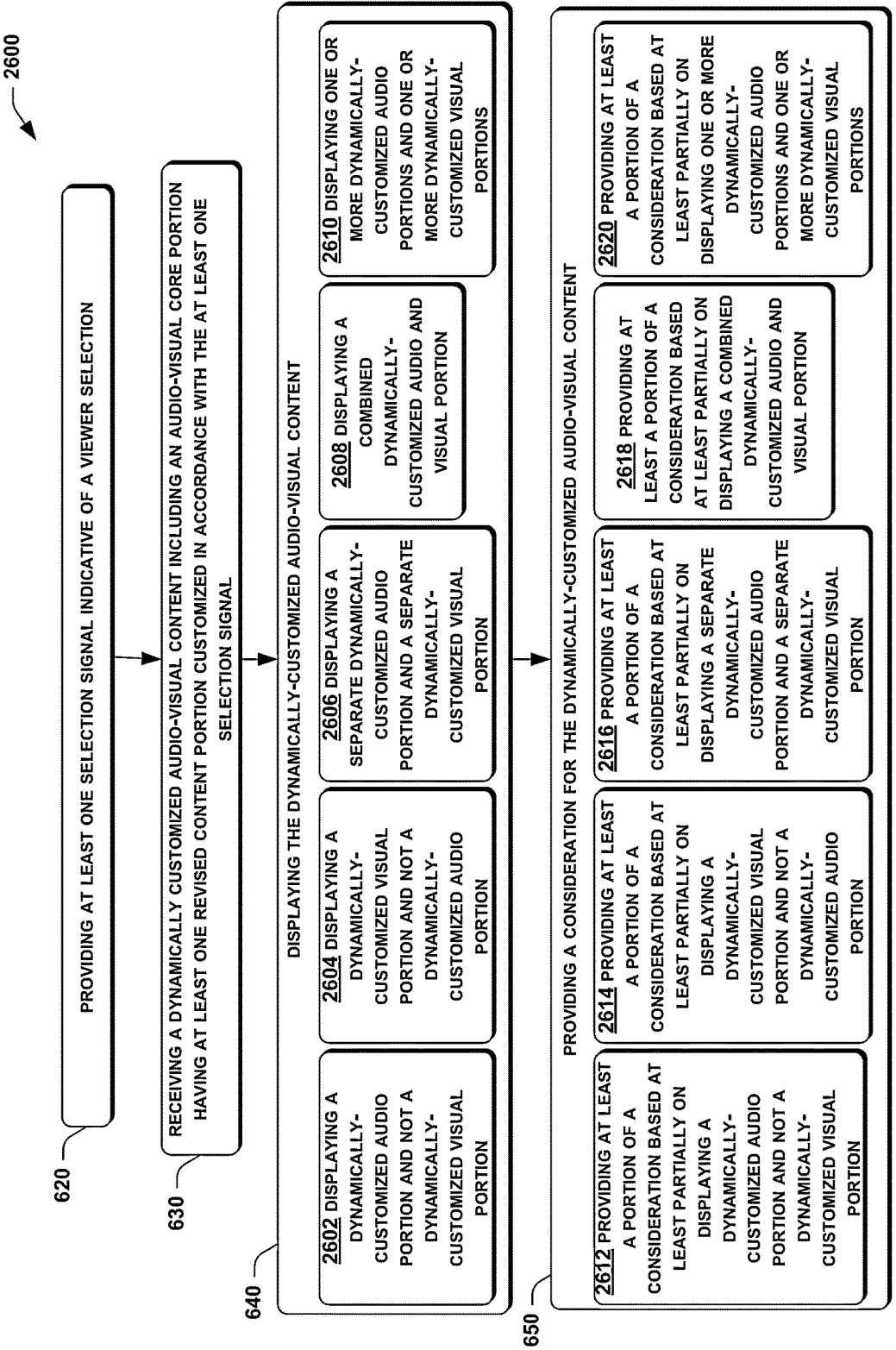

As shown in FIG. 26, displaying the dynamically-customized audio-visual content at 640 may involve a variety of different ways and aspects. For example, in some implementations, displaying the dynamically-customized audio-visual content at 640 may include displaying a dynamically-customized audio portion and not a dynamically-customized visual portion at 2602. In other implementations, displaying the dynamically-customized audio-visual content at 640 may include displaying a dynamically-customized visual portion and not a dynamically-customized audio portion at 2604. In still other implementations, displaying the dynamically-customized audio-visual content at 640 may include displaying a separate dynamically-customized audio portion and a separate dynamically-customized visual portion at 2606. In further implementations, displaying the dynamically-customized audio-visual content at 640 may include displaying a combined dynamically-customized audio and visual portion at 2608. In additional implementations, displaying the dynamically-customized audio-visual content at 640 may include displaying one or more dynamically-customized audio portions and one or more dynamically-customized visual portions at 2610 (e.g. displaying a plurality of audio portions and displaying a single video portion, displaying a single audio portion and displaying a plurality of video portions, etc.).

With continued reference to FIG. 26, in other implementations, providing a consideration for the dynamically-customized audio-visual content at 650 may include providing at least a portion of a consideration based at least partially on displaying a dynamically-customized audio portion and not a dynamically-customized visual portion at 2612. In other implementations, providing a consideration for the dynamically-customized audio-visual content at 650 may include providing at least a portion of a consideration based at least partially on displaying a dynamically-customized visual portion and not a dynamically-customized audio portion at 2614. In still other implementations, providing a consideration for the dynamically-customized audio-visual content at 640 may include providing at least a portion of a consideration based at least partially on displaying a separate dynamically-customized audio portion and a separate dynamically-customized visual portion at 2616. In further implementations, providing a consideration for the dynamically-customized audio-visual content at 650 may include providing at least a portion of a consideration based at least partially on displaying a combined dynamically-customized audio and visual portion at 2628. In additional implementations, providing a consideration for the dynamically-customized audio-visual content at 650 may include providing at least a portion of a consideration based at least partially on displaying one or more dynamically-customized audio portions and one or more dynamically-customized visual portions at 2630 (e.g. providing payment for displaying a plurality of audio portions and displaying a single video portion, or for displaying a single audio portion and displaying a plurality of video portions, etc.).

Figure 27:
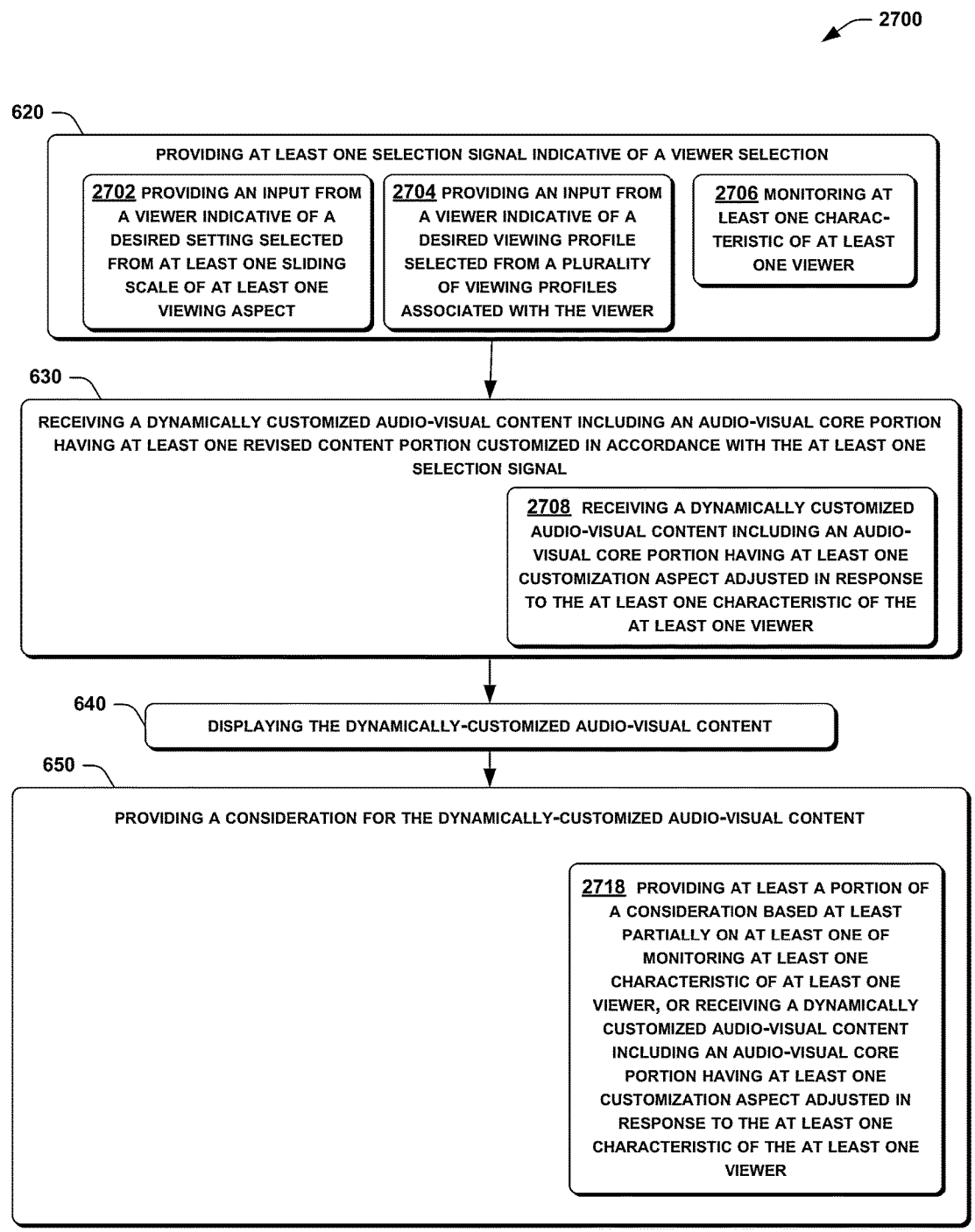
Figures 28, 29:
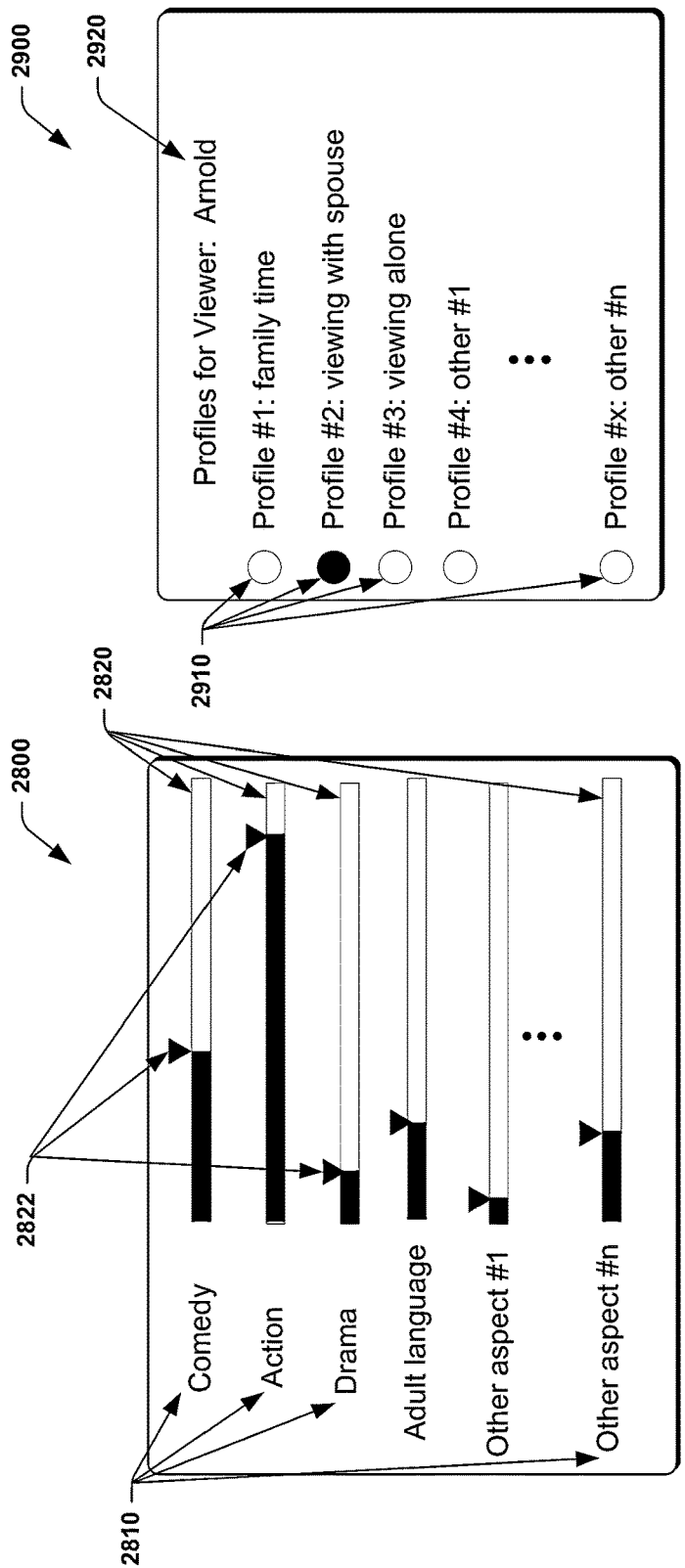

A variety of alternate embodiments of providing at least one selection signal indicative of a viewer preference for dynamic customization of audio-visual content in accordance with the present disclosure may be conceived. For example, as shown in FIG. 27, in some implementations, providing at least one selection signal indicative of a viewer preference at 620 may include providing an input from a viewer indicative of a desired setting selected from at least one sliding scale of at least one viewing aspect at 2702. FIG. 28 shows one possible implementation of a user interface 2800 in accordance with the teachings of the present disclosure. In this implementation, the user interface 2800 displays a plurality of customization aspects 2810 having a corresponding plurality of sliding scales 2820 (e.g. comedy scale, action scale, drama scale, etc.). In operation, a viewer may position each selector 2822 associated with each sliding scale 2820 to indicate their desired preferences associated with each customization aspect 2810, resulting in a suitably customized audio-visual content.

Referring again to FIG. 27, in further implementations, providing at least one selection signal indicative of a viewer preference at 620 may include providing an input from a viewer indicative of a desired viewing profile selected from a plurality of viewing profiles associated with the viewer at 2704. For example, FIG. 29 shows one possible implementation of a user interface 2900 in accordance with the teachings of the present disclosure. In this implementation, the user interface 2900 displays a plurality of customization profiles 2910 (e.g. family time, viewing with spouse, viewing alone, etc.) associated with a particular viewer 2920 (e.g. "Arnold"). In operation, the particular viewer 2220 may select the desired profile 2910 depending upon who else (if anyone) may be present in the viewing area with the particular viewer 2920, resulting in a suitably customized audio-visual content.

In still other implementations, providing at least one selection signal indicative of a viewer preference at 620 may include monitoring at least one characteristic of at least one viewer at 2706 (e.g. facial features, smile, frown, scowl, displeasure, interest, lack of interest, laughter, tears, fear, anxiety, sadness, disgust, shock, distaste, etc.), and receiving a dynamically customized audio-visual content including an audio-visual core portion having at least one revised content portion customized in accordance with the at least one selection signal at 630 may include receiving a dynamically customized audio-visual content including an audio-visual core portion having at least one customization aspect adjusted in response to the at least one characteristic of the at least one viewer (e.g. increasing comedy aspects, reducing horror aspects, increasing dramatic aspects, reducing profantify aspects, etc.) at 2708. For example, in some implementations, a monitoring device (e.g. the sensor 250, Microsoft Kinect®, Nintendo Wii®, etc.) may sense facial features associated with displeasure at particular occurences of profane dialogue, and the viewer may receive a customized content having the amount of profanity contained in the dialogue automatically adjusted. Alternately, the monitoring device may sense a higher-than-desired level of fear, and the viewer may receive a customized content having the horror aspects of the dynamically customized audio-visual content automatically adjusted so provide a desired level of fear to the viewer.

With continued reference to FIG. 27, in further implementations, providing a consideration for the dynamically-customized audio-visual content at 650 may include providing at least a portion of a consideration based at least partially on at least one of monitoring at least one characteristic of at least one viewer, or receiving a dynamically customized audio-visual content including an audio-visual core portion having at least one customization aspect adjusted in response to the at least one characteristic of the at least one viewer (e.g. providing payment for increasing comedy aspects, providing payment for reducing horror aspects, providing payment for increasing dramatic aspects, providing payment for reducing profantify aspects, etc.) at 2718.

Figure 30:
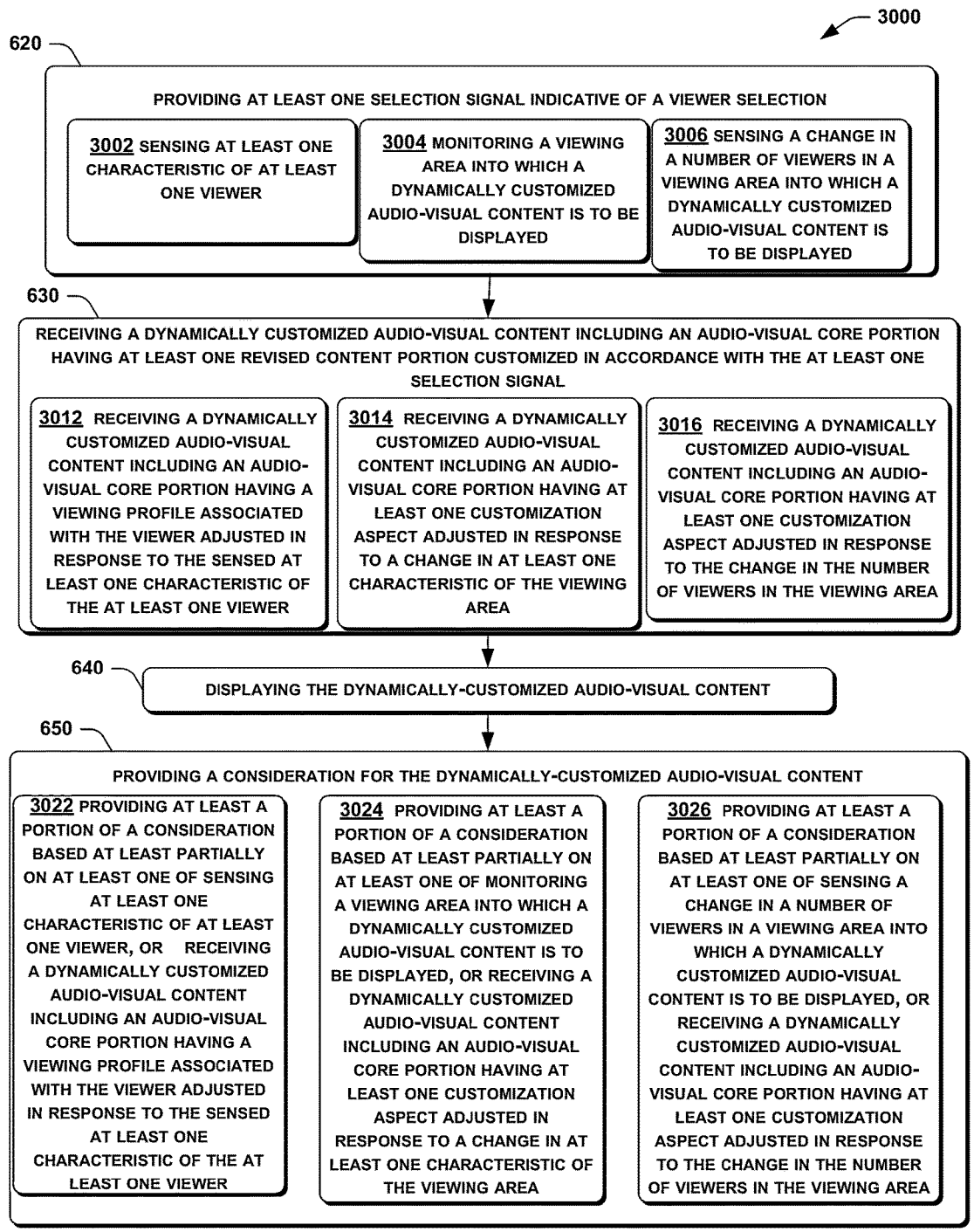

As shown in FIG. 30, in still further implementations, providing at least one selection signal indicative of a viewer preference at 620 may include sensing at least one characteristic of at least one viewer at 3002, and receiving a dynamically customized audio-visual content including an audio-visual core portion having at least one revised content portion customized in accordance with the at least one selection signal at 630 may include receiving a dynamically customized audio-visual content including an audio-visual core portion having a viewing profile associated with the viewer adjusted in response to the sensed at least one characteristic of the at least one viewer at 3012. For example, in some implementations, a sensing device (e.g. a Kinect® device, Nintendo Wii®, etc.) may sense interest from the viewer in particular occurences of content being displayed (e.g. history-related content), and the viewer may receive a customized content having a first viewing profile (e.g. a profile that has increased emphasis on comedy) changed to a second viewing profile (e.g. a profile that has increased emphasis on historical topics or documentary topics). Alternately, the monitoring device may sense a higher-than-desired level of fear, and the viewer may receive a customized content having the horror aspects reduced to provide a desired level of fear to the viewer.

With continued reference to FIG. 30, in other implementations, providing at least one selection signal indicative of a viewer preference at 620 may include monitoring a viewing area into which a dynamically-customized audio-visual content is to be displayed at 3004, and receiving a dynamically customized audio-visual content including an audio-visual core portion having at least one revised content portion customized in accordance with the at least one selection signal at 630 may include receiving a dynamically customized audio-visual content including an audio-visual core portion having at least one customization aspect adjusted in response to a change in at least one characteristic of the viewing area at 3014. For example, in some implementations, a monitoring device may sense that a less than desired amount of laughter is occurring in the viewing area (e.g. using pattern recognition techniques, etc.), and the viewer may receive a customized content having an adjusted (increased or decreased) comedy level. Alternately, the sensing device may sense that more than a desired level of screaming is occurring within the viewing area, and the viewer may receive a customized content having an adjusted horror level.

In additional implementations, providing at least one selection signal indicative of a viewer preference at 620 may include sensing a change in a number of viewers in a viewing area into which a dynamically-customized audio-visual content is to be displayed at 3006, and receiving a dynamically customized audio-visual content including an audio-visual core portion having at least one revised content portion customized in accordance with the at least one selection signal at 630 may include receiving a dynamically customized audio-visual content including an audio-visual core portion having at least one customization aspect adjusted in response to a change in the number of viewers in the viewing area at 3016. For example, in some implementations, a monitoring device may sense that a viewer's spouse has entered the viewing area (e.g. using facial recognition techniques, body recognition techniques, voice recognition techniques, etc.), and the viewer may receive a customized content having a first viewing profile (e.g. a profile associated with "viewing alone") changed to a second viewing profile (e.g. a profile associated with "viewing with spouse"). Alternately, the sensing device may sense that a viewer's children have departed from the viewing area, and the viewer may receive a customized content having a family-oriented viewing profile changed to an individual-oriented viewing profile.

With continued reference to FIG. 30, in other implementations, providing a consideration for the dynamically-customized audio-visual content at 650 may include providing at least a portion of a consideration based at least partially on at least one of sensing at least one characteristic of at least one viewer, or receiving a dynamically customized audio-visual content including an audio-visual core portion having a viewing profile associated with the viewer adjusted in response to the sensed at least one characteristic of the at least one viewer at 3022. (e.g. providing payment for sensing a viewer's emotion with a Kinect® device, and for automatically changing from a first viewing profile to a second viewing profile that better fits the viewer's emotion). In further implementations, providing a consideration for the dynamically-customized audio-visual content at 650 may include providing at least a portion of a consideration based at least partially on at least one of monitoring a viewing area into which a dynamically-customized audio-visual content is to be displayed, or receiving a dynamically customized audio-visual content including an audio-visual core portion having at least one customization aspect adjusted in response to a change in at least one characteristic of the viewing area at 3024 (e.g. providing payment for a monitoring device indicating that more than a desired level of screaming is occurring within the viewing area, and for receiving customized content having a horror level automatically adjusted).

In additional implementations, providing a consideration for the dynamically-customized audio-visual content at 650 may include providing at least a portion of a consideration based at least partially on at least one of sensing a change in a number of viewers in a viewing area into which a dynamically-customized audio-visual content is to be displayed, or receiving a dynamically customized audio-visual content including an audio-visual core portion having at least one customization aspect adjusted in response to a change in the number of viewers in the viewing area at 3016 (e.g. providing payment for a monitoring device sensing that a viewer's spouse has entered the viewing area, and for receiving customized content automatically adjusted from a "viewing alone" profile to a "viewing with spouse" profile, etc.).

Figure 31:
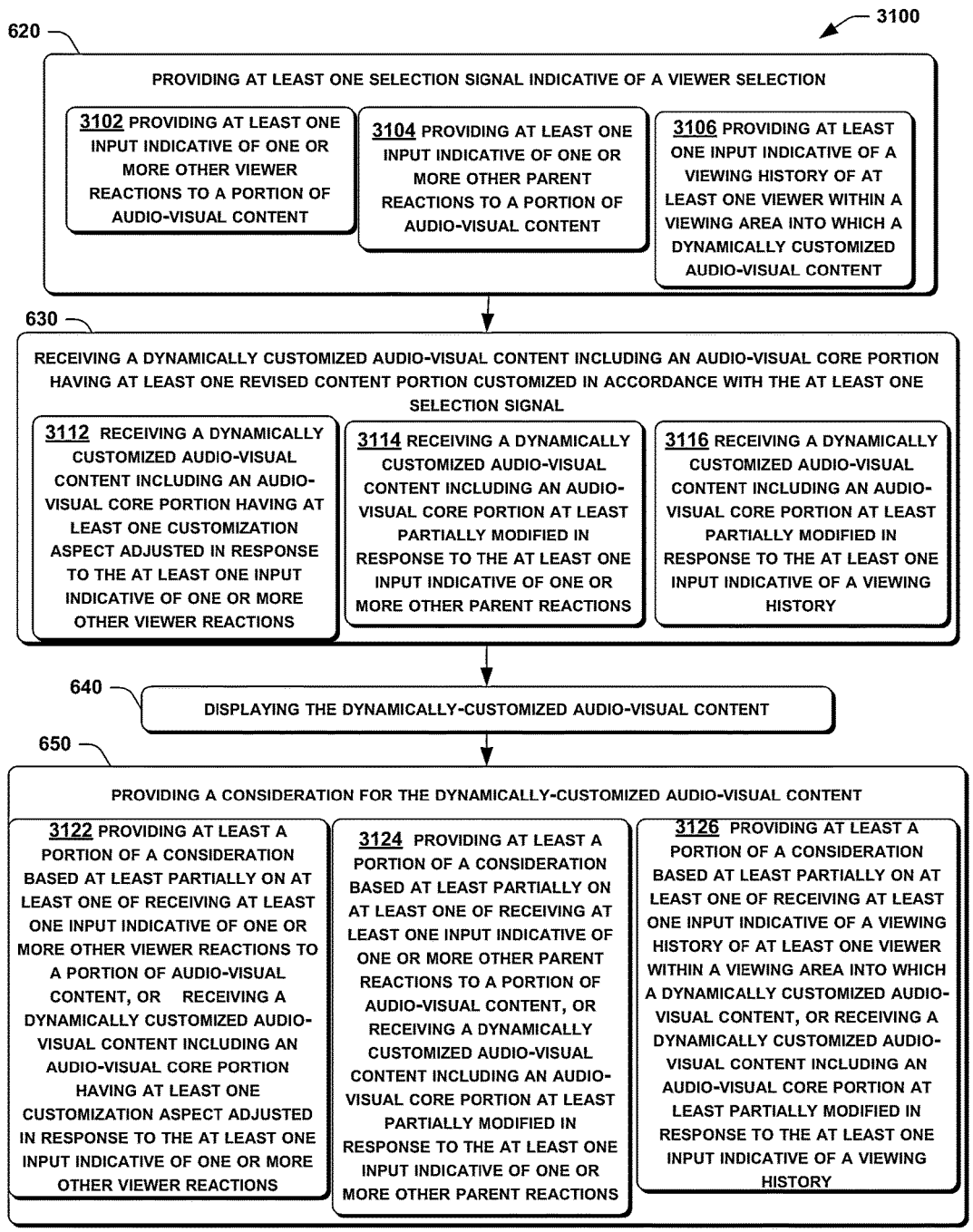

FIG. 31 shows additional embodiments of processes for dynamic customization of audio-visual content in accordance with the present disclosure. More specifically, in some implementations, providing at least one selection signal indicative of a viewer preference at 620 may include providing at least one input indicative of one or more other viewer reactions to a portion of audio-visual content at 3102, and receiving a dynamically customized audio-visual content including an audio-visual core portion having at least one revised content portion customized in accordance with the at least one selection signal at 630 may include receiving a dynamically customized audio-visual content including an audio-visual core portion having at least one customization aspect adjusted in response to the at least one input indicative of one or more other viewer reactions at 3112. For example, in some implementations, an input signal may be received (e.g. from a repository of information on viewer reactions, from a service that assesses viewer reactions, etc.) that indicates that other demographically-similar viewers (e.g. other viewers of same age, other viewers of same gender, other viewers of same ethnic heritage, etc.) reacted negatively to a particular portion of audio-visual content (e.g. a scene, a portion of dialogue, a visual image, etc.), and in response to the at least one input, the viewer receives a customized content having at least one customization aspect automatically adjusted (e.g. deleting a scene, changing a dialogue, changing an actor ethnicity, etc.).

In other implementations, providing at least one selection signal indicative of a viewer preference at 620 may include providing at least one input indicative of one or more other parent reactions to a portion of audio-visual content at 3104, and receiving a dynamically customized audio-visual content including an audio-visual core portion having at least one revised content portion customized in accordance with the at least one selection signal at 630 may include receiving a dynamically customized audio-visual content including an audio-visual core portion at least partially modified in response to the at least one input indicative of one or more other parent reactions at 3114. For example, in some implementations, an input may be received indicating that a majority of parents reacted negatively to a particular portion of audio-visual content (e.g. dialogue that includes profanity, scenes that include violent content, scenes that include adult situations, etc.), and in response to the at least one input, the viewer may receive a customized content having one or more aspects modified (e.g. deleting a scene, changing a dialogue, adjusting a clothing of actors, etc.) in response to the at least one input indicative of one or more other parent reactions.

In further implementations, providing at least one selection signal indicative of a viewer preference at 620 may include providing at least one input indicative of a viewing history of at least one viewer within a viewing area into which a dynamically customized audio-visual content is to be displayed at 3106, and receiving a dynamically customized audio-visual content including an audio-visual core portion having at least one revised content portion customized in accordance with the at least one selection signal at 630 may include receiving a dynamically customized audio-visual content including an audio-visual core portion having a portion of audio-visual content adjusted in response to the at least one input indicative of a viewing history at 3116. For example, in some implementations, an input may be received indicating that a viewer has repeatedly changed a channel whenever a particular portion of audio-visual content has been displayed, and in response to the at least one input, the viewer may receive a customized content having a portion of audio-visual content automatically replaced with a replacement portion of content.

With continued reference to FIG. 31, in some implementations, providing a consideration for the dynamically-customized audio-visual content at 650 may include providing at least a portion of a consideration based at least partially on at least one of providing at least one input indicative of one or more other viewer reactions to a portion of audio-visual content, or receiving a dynamically customized audio-visual content including an audio-visual core portion having at least one customization aspect adjusted in response to the at least one input indicative of one or more other viewer reactions at 3122 (e.g. providing a payment for receiving an input from a service that assesses viewer reactions, and receiving content that has been modified based on other demographically-similar viewers, etc.). In other implementations, providing a consideration for the dynamically-customized audio-visual content at 650 may include providing at least a portion of a consideration based at least partially on at least one of providing at least one input indicative of one or more other parent reactions to a portion of audio-visual content, or receiving a dynamically customized audio-visual content including an audio-visual core portion at least partially modified in response to the at least one input indicative of one or more other parent reactions at 3124 (e.g. providing a payment for receiving an input indicating that a majority of parents reacted negatively to a particular portion of audio-visual content, and receiving content that has one or more aspects modified to improve parental satisfaction, etc.). In further implementations, providing a consideration for the dynamically-customized audio-visual content at 650 may include providing at least a portion of a consideration based at least partially on at least one of providing at least one input indicative of a viewing history of at least one viewer within a viewing area into which a dynamically customized audio-visual content is to be displayed, or receiving a dynamically customized audio-visual content including an audio-visual core portion having a portion of audio-visual content adjusted in response to the at least one input indicative of a viewing history at 3126 (e.g. providing a payment for determining that a viewer has repeatedly changed a channel whenever a particular actor has appeared, and for receiving content having the particular actor automatically replaced with a replacement actor based on the viewer's history).

Figure 32:
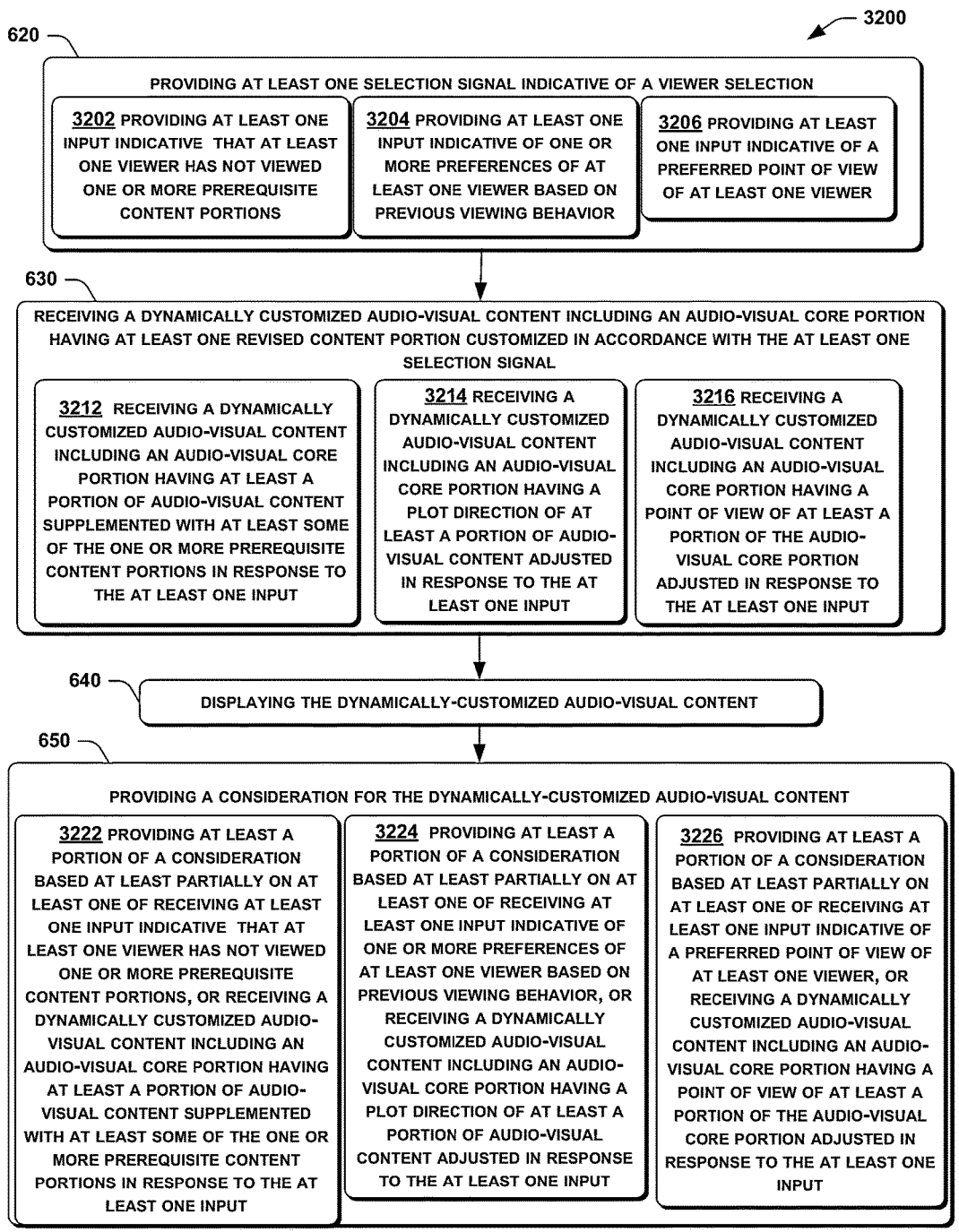

As shown in FIG. 32, in still further implementations, providing at least one selection signal indicative of a viewer preference at 620 may include providing at least one input indicative that at least one viewer has not viewed one or more prerequisite content portions at 3202, and receiving a dynamically customized audio-visual content including an audio-visual core portion having at least one revised content portion customized in accordance with the at least one selection signal at 630 may include receiving a dynamically customized audio-visual content including an audio-visual core portion having at least a portion of audio-visual content supplemented with at least some of the one or more prerequisite content portions in response to the at least one input at 3212. For example, in some implementations, an input may be received indicating that a viewer has missed previous episodes of a series, and in response to the at least one input, and the viewer may receive a customized content wherein the audio-visual core portion is automatically supplemented with one or more scenes that provide essential plot points that the viewer will need to view in order to be brought up to speed for the upcoming episode.

In additional implementations, providing at least one selection signal indicative of a viewer preference at 620 may include providing at least one input indicative of one or more preferences of at least one viewer based on previous viewing behavior at 3204, and receiving a dynamically customized audio-visual content including an audio-visual core portion having at least one revised content portion customized in accordance with the at least one selection signal at 630 may include receiving a dynamically customized audio-visual content including an audio-visual core portion having a plot direction of at least a portion of audio-visual content adjusted in response to the at least one input at 3214. For example, in some implementations, an input may be received indicating that a viewer prefers sad endings over happy endings, and in response to the at least one input, the viewer may receive a customized content wherein the audio-visual core portion is automatically modified to provide a plot direction that ends up with a sad ending rather than a happy ending.

In still other implementations, providing at least one selection signal indicative of a viewer preference at 620 may include providing at least one input indicative of a preferred point of view of at least one viewer at 3206, and receiving a dynamically customized audio-visual content including an audio-visual core portion having at least one revised content portion customized in accordance with the at least one selection signal at 630 may include receiving a dynamically customized audio-visual content including an audio-visual core portion having a point of view of at least a portion of the audio-visual core portion adjusted in response to the at least one input at 3216. For example, in some implementations, a viewer may manually select from a menu of available points of view (e.g. from a first person perspective of one of the characters, from a third party perspective, a top view, side view, etc.), and in response to the at least one input, the viewer receives a customized content having an audio-visual core portion automatically adjusted to show content from the selected perspective (e.g. a fight scene from the perspective of one of the fighters, etc.).

With continued reference to FIG. 32, in some implementations, providing a consideration for the dynamically-customized audio-visual content at 650 may include providing at least a portion of a consideration based at least partially on at least one of providing at least one input indicative that at least one viewer has not viewed one or more prerequisite content portions, or receiving a dynamically customized audio-visual content including an audio-visual core portion having at least a portion of audio-visual content supplemented with at least some of the one or more prerequisite content portions in response to the at least one input at 3222 (e.g. providing payment for receiving an indication that a viewer has missed previous episodes of a series, and for received a customized content having a portion automatically supplemented with one or more scenes that provide essential plot points). In additional implementations, providing a consideration for the dynamically-customized audio-visual content at 650 may include providing at least a portion of a consideration based at least partially on at least one of providing at least one input indicative of one or more preferences of at least one viewer based on previous viewing behavior, or receiving a dynamically customized audio-visual content including an audio-visual core portion having a plot direction of at least a portion of audio-visual content adjusted in response to the at least one input at 3224 (e.g. providing payment for receiving an indication that a viewer prefers sad endings over happy endings, and for receiving content having a plot direction adjusted to provide a sad ending rather than a happy ending). In still other implementations, providing a consideration for the dynamically-customized audio-visual content at 650 may include providing at least a portion of a consideration based at least partially on at least one of providing at least one input indicative of a preferred point of view of at least one viewer, or receiving a dynamically customized audio-visual content including an audio-visual core portion having a point of view of at least a portion of the audio-visual core portion adjusted in response to the at least one input at 3216 (e.g. providing payment for receiving an indication that a viewer prefers viewing fighting scenes from a top view, and for receiving customized content automatically adjusted to provide a perspective of a fight scene accordingly).

Figure 33:
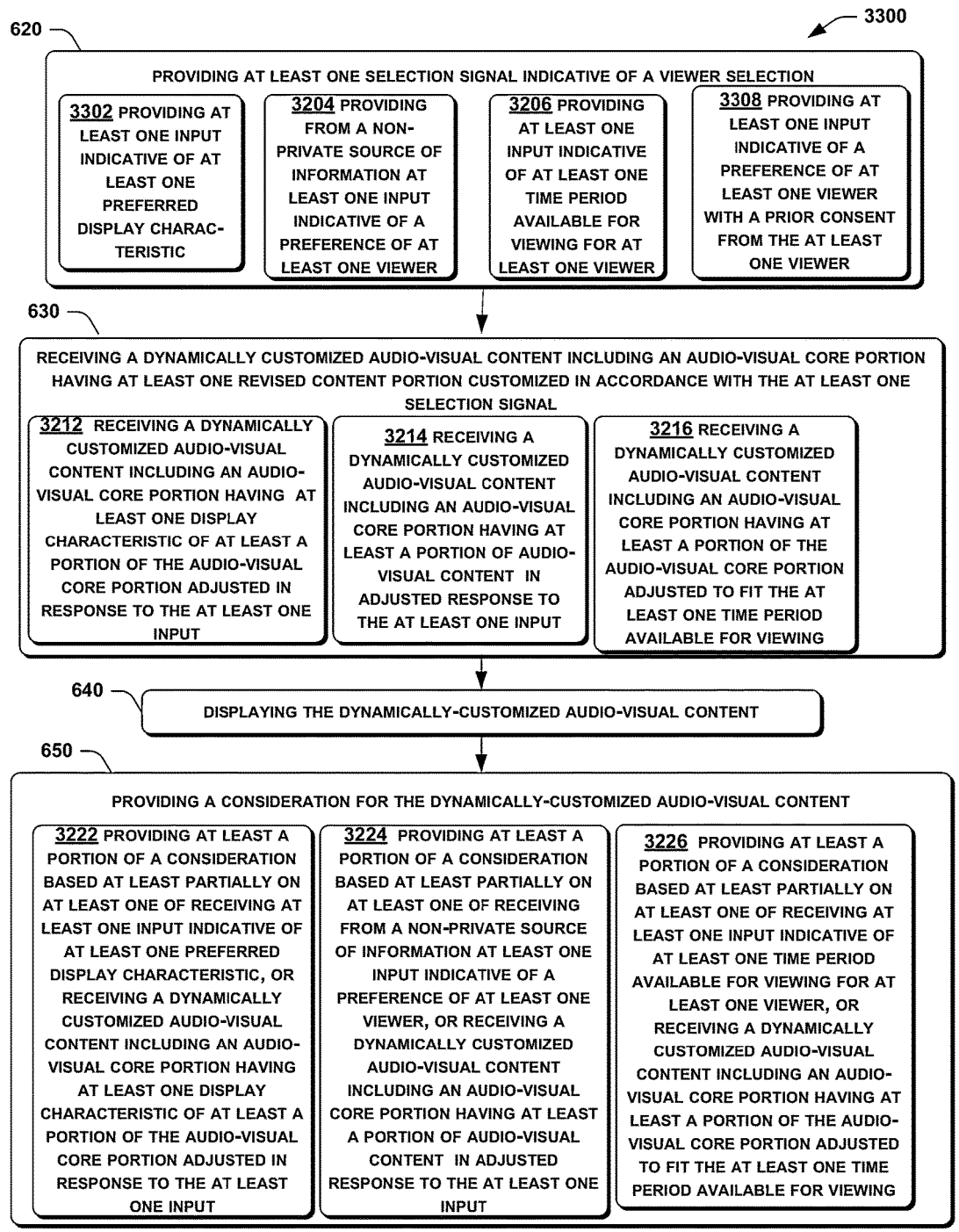

As shown in FIG. 33, in other implementations, providing at least one selection signal indicative of a viewer preference at 620 may include providing at least one input indicative of at least one preferred display characteristic at 3302, and receiving a dynamically customized audio-visual content including an audio-visual core portion having at least one revised content portion customized in accordance with the at least one selection signal at 630 may include receiving a dynamically customized audio-visual content including an audio-visual core portion having at least one display characteristic of at least a portion of the audio-visual core portion adjusted in response to the at least one input at 3312. For example, in some implementations, an input may be provided that indicates a display characteristic suitable to a particular viewing environment (e.g. a brightness, a contrast, a volume level, an outdoor viewing environment, etc.) or suitable to a particular viewing device (e.g. an aspect ratio, a display resolution value, a screen size, etc.), and the viewer may receive a customized content having a portion adjusted to be optimally displayed in accordance with the display characteristic.

In additional implementations, providing at least one selection signal indicative of a viewer preference at 620 may include providing from a non-private source of information at least one input indicative of a preference of at least one viewer at 3204 (e.g. providing an input from a viewer's public blog indicating a preference, receiving an input from a viewer's public information placed on a social networking site indicating a preference, etc.), and receiving a dynamically customized audio-visual content including an audio-visual core portion having at least one revised content portion customized in accordance with the at least one selection signal at 630 may include receiving a dynamically customized audio-visual content including an audio-visual core portion having at least a portion of the audio-visual core portion adjusted in response to the at least one input at 3214.

In yet other implementations, providing at least one selection signal indicative of a viewer preference at 620 may include providing at least one input indicative of a time period available for viewing for at least one viewer at 3206 (e.g. receiving a manual input from a viewer, reading a viewer's calendar or scheduling software, etc.), and receiving a dynamically customized audio-visual content including an audio-visual core portion having at least one revised content portion customized in accordance with the at least one selection signal at 630 may include receiving a dynamically customized audio-visual content including an audio-visual core portion having at least one a portion of the audio-visual core portion adjusted to fit the at least one time period available for viewing at 3216 (e.g. omitting a non-essential portion of the audio-visual core portion, etc.). In still other implementations, providing at least one selection signal indicative of a viewer preference at 620 may include providing at least one input indicative of a preference of at least one viewer with a prior consent from the at least one viewer at 3208 (e.g. providing an input indicating a preference after a viewer "opts in").

With continued reference to FIG. 33, in some implementations, providing a consideration for the dynamically-customized audio-visual content at 650 may include providing at least a portion of a consideration based at least partially on at least one of providing at least one input indicative of at least one preferred display characteristic, or receiving a dynamically customized audio-visual content including an audio-visual core portion having at least one display characteristic of at least a portion of the audio-visual core portion adjusted in response to the at least one input at 3322. In additional implementations, providing a consideration for the dynamically-customized audio-visual content at 650 may include providing at least a portion of a consideration based at least partially on at least one of providing from a non-private source of information at least one input indicative of a preference of at least one viewer, or receiving a dynamically customized audio-visual content including an audio-visual core portion having at least a portion of the audio-visual core portion adjusted in response to the at least one input at 3224. In yet other implementations, providing a consideration for the dynamically-customized audio-visual content at 650 may include providing at least a portion of a consideration based at least partially on at least one of providing at least one input indicative of a time period available for viewing for at least one viewer, or receiving a dynamically customized audio-visual content including an audio-visual core portion having at least one a portion of the audio-visual core portion adjusted to fit the at least one time period available for viewing at 3226.

It should be appreciated that the particular embodiments of processes described herein are merely possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques have been described herein in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning. A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. A system for viewing audio-visual content, comprising:
    circuitry for determining information from a memory of a mobile device associated with a viewer, the information including an item of apparel based on a browsing history of online clothing shopping associated with the viewer;
    circuitry for determining a movement of the viewer within a viewing area proximate to a display device configured to display audio-visual content visible from within the viewing area;
    circuitry for providing at least one selection signal indicative of a viewer preference based at least on the movement of the viewer within the viewing area;
    circuitry for receiving an audio-visual core portion, wherein the audio-visual core portion includes at least a video program portion;
    circuitry for determining a modification of the audio-visual core portion based on the at least one selection signal indicative of the viewer preference; and
    circuitry for modifying the audio-visual core portion to provide a dynamically customized audio-visual content having at least one revised content portion customized in accordance with the at least one selection signal, the circuitry for modifying including at least circuitry for replacing an item of apparel of an actor within the audio-visual core portion with the item of apparel based on the browsing history of online clothing shopping associated with the viewer to create a modified scene depicted within the dynamically customized audio-visual content.

2. The system of claim 1, wherein circuitry for providing at least one selection signal indicative of a viewer preference based at least on the movement of the viewer within the viewing area comprises:
    circuitry for sensing one or more viewers moving into a viewing area; and
    circuitry for providing at least one selection signal based on the one or more viewers sensed moving into the viewing area.

3. The system of claim 1, wherein circuitry for providing at least one selection signal indicative of a viewer preference based at least on the movement of the viewer within the viewing area comprises:
    circuitry for determining at least one supplemental signal from an electronic device associated with a viewer; and
    circuitry for providing at least one selection signal based on the at least one supplemental signal.

4. The system of claim 1, wherein circuitry for determining information from a memory of a mobile device associated with a viewer comprises:
    circuitry for scanning an electronic device associated with a viewer.

5. The system of claim 1, wherein circuitry for determining information from a memory of a mobile device associated with a viewer comprises:
   circuitry for querying an electronic device associated with a viewer.

6. The system of claim 1, further comprising:
   circuitry for providing at least a portion of a consideration based at least partially on at least one of scanning the memory of the mobile device associated with the viewer.

7. The method of claim 1, wherein circuitry for modifying the audio-visual core portion to provide a dynamically customized audio-visual content having at least one revised content portion customized in accordance with the at least one selection signal, the circuitry for modifying including at least circuitry for replacing an item of apparel of an actor within the audio-visual core portion with the item of apparel based on the browsing history of online clothing shopping associated with the viewer to create a modified scene depicted within the dynamically customized audio-visual content comprises:
   at least one of:
      circuitry for modifying a dynamically customized audio-visual content including an audio-visual core portion having at least one actor replaced with at least one replacement actor;
      circuitry for replacing, in an audio-visual core portion, one or more of a facial appearance, a voice, or a body appearance replaced with a corresponding one or more of a replacement facial appearance, a replacement voice, or a replacement body appearance;
      circuitry for replacing, in an audio-visual core portion, at least one consumer product depicted in the audio-visual core portion with at least one replacement consumer product;
      circuitry for replacing, in an audio-visual core portion, at least one of a beverage product, a food product, a vehicle, an article of clothing, an article of jewelry, a musical instrument, an electronic device, a household appliance, an article of furniture, an artwork, an office equipment, or an article of manufacture with a corresponding at least one of a replacement beverage product, a replacement food product, a replacement vehicle, a replacement article of clothing, a replacement article of jewelry, a replacement musical instrument, a replacement electronic device, a replacement household appliance, a replacement article of furniture, a replacement artwork, a replacement office equipment, or a replacement article of manufacture; or
      circuitry for replacing, in an audio-visual core portion, at least one of a setting aspect, an environmental aspect, or a background aspect of the audio-visual core portion replaced with a corresponding at least one of a replacement setting aspect, a replacement environmental aspect, or a replacement background aspect.

8. The system of claim 1, wherein circuitry for providing at least one selection signal indicative of a viewer preference based at least on the movement of the viewer within the viewing area comprises:
   circuitry for providing at least one selection signal indicative of entry of the viewer into the viewing area.

9. The system of claim 1, wherein circuitry for providing at least one selection signal indicative of a viewer preference based at least on the movement of the viewer within the viewing area comprises:
   circuitry for providing at least one selection signal including a modification activation signal based on the movement of the viewer into the viewing area.

10. The system of claim 1, wherein circuitry for providing at least one selection signal indicative of a viewer preference based at least on the movement of the viewer within the viewing area comprises:
    circuitry for providing an activation signal based on the movement of the viewer within the viewing area.

11. The system of claim 1, wherein circuitry for modifying the audio-visual core portion to provide a dynamically customized audio-visual content having at least one revised content portion customized in accordance with the at least one selection signal comprises:
    circuitry for replacing one or more spoken portions of the audio-visual core portion with one or more replacement spoken portions; and
    circuitry for replacing one or more facial movements corresponding to the one or more spoken portions of the audio-visual core portion with one or more replacement facial movements corresponding to the one or more replacement spoken portions.

12. The system of claim 11, wherein circuitry for replacing one or more spoken portions of the audio-visual core portion with one or more replacement spoken portions comprises:
    circuitry for replacing one or more words spoken in a first language with one or more replacement words spoken in a second language; and
    wherein circuitry for replacing one or more facial movements corresponding to the one or more spoken portions of the audio-visual core portion with one or more replacement facial movements corresponding to the one or more replacement spoken portions comprises:
    circuitry for replacing one or more facial movements corresponding to the one or more words spoken in the first language with one or more replacement facial movements corresponding to the one or more words spoken in the second language.

13. The system of claim 1, further comprising:
    circuitry for receiving at least a portion of a consideration based at least partially on the circuitry for modifying the audio-visual core portion to provide the dynamically customized audio-visual content.

14. The system of claim 1, wherein circuitry for modifying the audio-visual core portion to provide a dynamically customized audio-visual content having at least one revised content portion customized in accordance with the at least one selection signal comprises:
    circuitry for modifying the audio-visual core portion to provide a dynamically customized audio-visual content including an audio-visual core portion having one or more audible portions replaced with one or more replacement audible portions; and
    circuitry for modifying the audio-visual core portion to provide a dynamically customized audio-visual content including an audio-visual core portion having one or more body movements corresponding to the one or more audible portions replaced with one or more replacement body movements corresponding to the one or more replacement audible portions.

15. The system of claim 1, wherein circuitry for modifying the audio-visual core portion to provide a dynamically customized audio-visual content having at least one revised content portion customized in accordance with the at least one selection signal comprises:

circuitry for modifying the audio-visual core portion to provide a dynamically customized audio-visual content including an audio-visual core portion having one or more background noises replaced with one or more replacement background noises.

16. The system of claim 1, wherein circuitry for modifying the audio-visual core portion to provide a dynamically customized audio-visual content having at least one revised content portion customized in accordance with the at least one selection signal comprises:
   circuitry for modifying the audio-visual core portion to provide a dynamically customized audio-visual content including an audio-visual core portion having one or more background noises replaced with one or more replacement background noises; and
   circuitry for modifying the audio-visual core portion to provide a dynamically customized audio-visual content including an audio-visual core portion having one or more background visual components replaced with one or more replacement background visual components.

17. The system of claim 1, wherein circuitry for providing at least one selection signal indicative of a viewer preference based at least on the movement of the viewer within the viewing area comprises:
   circuitry for monitoring at least one characteristic of at least one viewer; and
   wherein circuitry for modifying the audio-visual core portion to provide a dynamically customized audio-visual content having at least one revised content portion customized in accordance with the at least one selection signal comprises:
   circuitry for modifying the audio-visual core portion to provide a dynamically customized audio-visual content having at least one customization aspect adjusted in response to the at least one characteristic of the at least one viewer.

18. The system of claim 1, wherein circuitry for providing at least one selection signal indicative of a viewer preference based at least on the movement of the viewer within the viewing area comprises:
   circuitry for sensing at least one characteristic of at least one viewer; and
   wherein circuitry for modifying the audio-visual core portion to provide a dynamically customized audio-visual content having at least one revised content portion customized in accordance with the at least one selection signal comprises:
   circuitry for modifying the audio-visual core portion to provide a dynamically customized audio-visual content having a viewing profile associated with the viewer adjusted in response to the sensed at least one characteristic of the at least one viewer.

19. The system of claim 1, wherein circuitry for providing at least one selection signal indicative of a viewer preference based at least on the movement of the viewer within the viewing area comprises:
   circuitry for monitoring a viewing area into which a dynamically-customized audio-visual content is to be displayed; and
   wherein circuitry for modifying the audio-visual core portion to provide a dynamically customized audio-visual content having at least one revised content portion customized in accordance with the at least one selection signal comprises:
   circuitry for modifying the audio-visual core portion to provide a dynamically customized audio-visual content having at least one customization aspect adjusted in response to a change in at least one characteristic of the viewing area.

20. The system of claim 1, wherein circuitry for providing at least one selection signal indicative of a viewer preference based at least on the movement of the viewer within the viewing area comprises:
   circuitry for sensing a change in a number of viewers in a viewing area into which a dynamically-customized audio-visual content is to be displayed; and
   wherein circuitry for modifying the audio-visual core portion to provide a dynamically customized audio-visual content having at least one revised content portion customized in accordance with the at least one selection signal comprises:
   circuitry for modifying the audio-visual core portion to provide a dynamically customized audio-visual content having at least one customization aspect adjusted in response to a change in the number of viewers in the viewing area.

21. The system of claim 1, wherein circuitry for providing at least one selection signal indicative of a viewer preference based at least on the movement of the viewer within the viewing area comprises:
   circuitry for providing at least one input indicative of one or more other viewer reactions to a portion of audio-visual content; and
   wherein circuitry for modifying the audio-visual core portion to provide a dynamically customized audio-visual content having at least one revised content portion customized in accordance with the at least one selection signal comprises:
   circuitry for modifying the audio-visual core portion to provide a dynamically customized audio-visual content having at least one customization aspect adjusted in response to the at least one input indicative of one or more other viewer reactions.

22. The system of claim 1, wherein circuitry for providing at least one selection signal indicative of a viewer preference based at least on the movement of the viewer within the viewing area comprises:
   circuitry for providing at least one input indicative of one or more other parent reactions to a portion of audio-visual content; and
   wherein circuitry for modifying the audio-visual core portion to provide a dynamically customized audio-visual content at least one revised content portion customized in accordance with the at least one selection signal comprises:
   circuitry for modifying the audio-visual core portion to provide a dynamically customized audio-visual content at least partially modified in response to the at least one input indicative of one or more other parent reactions.

23. The system of claim 1, wherein circuitry for providing at least one selection signal indicative of a viewer preference based at least on the movement of the viewer within the viewing area comprises:
   circuitry for providing at least one input indicative of a viewing history of at least one viewer within a viewing area into which a dynamically customized audio-visual content is to be displayed; and
   wherein circuitry for modifying the audio-visual core portion to provide a dynamically customized audio-visual content having at least one revised content portion customized in accordance with the at least one selection signal comprises:

circuitry for modifying the audio-visual core portion to provide a dynamically customized audio-visual content having a portion of audio-visual content adjusted in response to the at least one input indicative of a viewing history.

24. The system of claim 1, wherein circuitry for providing at least one selection signal indicative of a viewer preference based at least on the movement of the viewer within the viewing area comprises:
circuitry for providing at least one selection signal indicative of a viewer preference based on accessing at least one of a purchase record or a web-browsing record stored on a memory of a communication device associated with a viewer.

25. The system of claim 1, wherein circuitry for providing at least one selection signal indicative of a viewer preference based at least on the movement of the viewer within the viewing area comprises:
circuitry for providing at least one selection signal indicative of a viewer preference based on accessing an image stored on a memory of a communication device associated with a viewer.

26. The system of claim 25, wherein circuitry for modifying the audio-visual core portion to provide a dynamically customized audio-visual content having at least one revised content portion customized in accordance with the at least one selection signal, the circuitry for modifying including at least circuitry for replacing an item of apparel of an actor within the audio-visual core portion with the item of apparel based on the browsing history of online clothing shopping associated with the viewer to create a modified scene depicted within the dynamically customized audio-visual content comprises:
circuitry for modifying the audio-visual core portion to provide a dynamically customized audio-visual content having at least one revised content portion customized in accordance with the at least one selection signal, the circuitry for modifying including at least circuitry for replacing a selected portion of a scene within the audio-visual core portion with at least part of an image from the browsing history of online clothing shopping to create a modified scene depicted within the dynamically customized audio-visual content.

27. The system of claim 26, further comprising:
circuitry for providing a consideration from the viewer to another party based at least partially on the circuitry for modifying including at least circuitry for replacing the selected portion of the scene within the audio-visual core portion with at least part of the image to create the modified scene depicted within the dynamically customized audio-visual content.

28. The system of claim 1, wherein circuitry for determining information from a memory of a mobile device associated with a viewer, the information including an item of apparel based on a browsing history of online clothing shopping associated with the viewer comprises:
circuitry for determining information from a memory of a mobile device associated with a viewer, the information indicative of a purchase record determined from the memory of the mobile device associated with the viewer.

29. The system of claim 28, wherein circuitry for providing at least one selection signal indicative of a viewer preference based at least on the movement of the viewer within the viewing area comprises:
circuitry for providing at least one selection signal indicative of a viewer preference based at least on the movement of the viewer within the viewing area and the information indicative of the purchase record determined from the memory of the mobile device associated with the viewer.

30. The system of claim 1, wherein circuitry for determining information from a memory of a mobile device associated with a viewer comprises:
circuitry for determining information from a memory of a mobile device associated with a viewer, the information indicative of a history of one or more geographic locations determined from the memory of the mobile device associated with the viewer.

31. The system of claim 30, wherein circuitry for providing at least one selection signal indicative of a viewer preference based at least on the movement of the viewer within the viewing area comprises:
circuitry for providing at least one selection signal indicative of a viewer preference based at least on the movement of the viewer within the viewing area and the information indicative of the history of one or more geographic locations determined from the memory of the mobile device associated with the viewer.

32. The system of claim 1, wherein circuitry for determining a movement of the viewer within a viewing area proximate to a display device configured to display audio-visual content visible from within the viewing area comprises:
circuitry for monitoring the viewing area proximate to the display device to determine a change of position of the viewer.

33. The system of claim 1, wherein circuitry for determining a movement of the viewer within a viewing area proximate to a display device configured to display audio-visual content visible from within the viewing area comprises:
circuitry for monitoring the viewing area proximate to the display device to determine a change of location of the viewer.

34. The system of claim 1, wherein circuitry for determining information from a memory of a mobile device associated with a viewer comprises:
circuitry for determining information from a memory of a mobile device associated with a viewer, the information including positioning system information;
and wherein circuitry for providing at least one selection signal indicative of a viewer preference based at least on the movement of the viewer within the viewing area comprises:
circuitry for providing at least one selection signal indicative of a viewer preference based at least on the positioning system information.

35. The system of claim 1, wherein circuitry for determining information from a memory of a mobile device associated with a viewer comprises:
circuitry for determining information from a memory of a mobile device associated with a viewer, the information including information from at least one of calendar or scheduling software;
and wherein circuitry for providing at least one selection signal indicative of a viewer preference based at least on the movement of the viewer within the viewing area comprises:
circuitry for determining a modification of the audio-visual core portion based on a time period available for viewing based on the information from at least one of calendar or scheduling software.

36. The system of claim 1, wherein circuitry for determining information from a memory of a mobile device associated with a viewer comprises:
 circuitry for determining information from a memory of a mobile device associated with a viewer, the information including at least one of calendar information or schedule information indicative of a time period available for viewing;
 and wherein circuitry for modifying the audio-visual core portion to provide a dynamically customized audio-visual content having at least one revised content portion customized in accordance with the at least one selection signal comprises:
 circuitry for determining a modification of the audio-visual core portion based at least partially on the time period available for viewing.

37. The system of claim 1, wherein circuitry for determining information from a memory of a mobile device associated with a viewer comprises:
 circuitry for determining information from a memory of a mobile device associated with a viewer, the information including at least consent information indicative of a consent of the viewer;
 and wherein circuitry for replacing an item of apparel of an actor within the audio-visual core portion with the item of apparel based on the browsing history of online clothing shopping associated with the viewer to create a modified scene depicted within the dynamically customized audio-visual content comprises:
 circuitry for replacing, based on the consent information indicative of the consent of the viewer, an item of apparel of an actor within the audio-visual core portion with the item of apparel based on the browsing history of online clothing shopping associated with the viewer to create a modified scene depicted within the dynamically customized audio-visual content.

38. The system of claim 1, wherein circuitry for replacing an item of apparel of an actor within the audio-visual core portion with the item of apparel based on the browsing history of online clothing shopping associated with the viewer to create a modified scene depicted within the dynamically customized audio-visual content comprises:
 circuitry for replacing an item of apparel and one or more other aspects of an actor within the scene within the audio-visual core portion with the item of apparel based at least on the browsing history of online clothing shopping associated with the viewer to create a modified scene depicted within the dynamically customized audio-visual content.

39. The system of claim 1, wherein circuitry for determining a movement of the viewer within a viewing area proximate to a display device configured to display audio-visual content visible from within the viewing area comprises:
 circuitry for determining a movement of the viewer within a fixed viewing area relative to a fixed display device, the fixed display device configured to display audio-visual content visible within the fixed viewing area.

40. A system for providing audio-visual content, comprising:
 means for determining information from a memory of a mobile device associated with a viewer, the information including an item of apparel based on a browsing history of online clothing shopping associated with the viewer;
 means for determining a movement of the viewer within a viewing area proximate to a display device configured to display audio-visual content visible from within the viewing area;
 means for providing at least one selection signal indicative of a viewer preference based at least on the movement of the viewer within the viewing area;
 means for receiving an audio-visual core portion, wherein the audio-visual core portion includes at least a video program portion;
 means for determining a modification of the audio-visual core portion based on the at least one selection signal indicative of the viewer preference; and
 means for modifying the audio-visual core portion to provide a dynamically customized audio-visual content having at least one revised content portion customized in accordance with the at least one selection signal, the means for modifying including at least means for replacing an item of apparel of an actor within the audio-visual core portion with the item of apparel based on the browsing history of online clothing shopping associated with the viewer to create a modified scene depicted within the dynamically customized audio-visual content.

41. One or more non-transitory computer-readable media bearing instructions that, when executed, perform a method of providing audio-visual content, the method comprising:
 determining information from a memory of a mobile device associated with a viewer, the information including an item of apparel based on the browsing history of online clothing shopping associated with the viewer;
 determining a movement of the viewer within a viewing area proximate to a display device configured to display audio-visual content visible from within the viewing area;
 providing at least one selection signal indicative of a viewer preference based at least on the movement of the viewer within the viewing area;
 receiving an audio-visual core portion, wherein the audio-visual core portion includes at least a video program portion;
 determining a modification of the audio-visual core portion based on the at least one selection signal indicative of the viewer preference; and
 modifying the audio-visual core portion to provide a dynamically customized audio-visual content having at least one revised content portion customized in accordance with the at least one selection signal, the modifying including at least replacing an item of apparel of an actor within the audio-visual core portion with the item of apparel based on the browsing history of online clothing shopping associated with the viewer to create a modified scene depicted within the dynamically customized audio-visual content.

* * * * *